(12) United States Patent
Machida

(10) Patent No.: US 7,497,777 B2
(45) Date of Patent: Mar. 3, 2009

(54) GAMING MACHINE AND COMPUTER-READABLE PROGRAM PRODUCT

(75) Inventor: Matsuzo Machida, Tokyo (JP)

(73) Assignee: Aruze Corp., Tokyo (JP)

( * ) Notice: Subject to any disclaimer, the term of this patent is extended or adjusted under 35 U.S.C. 154(b) by 958 days.

(21) Appl. No.: 10/869,875

(22) Filed: Jun. 18, 2004

(65) Prior Publication Data

US 2004/0259634 A1   Dec. 23, 2004

(30) Foreign Application Priority Data

Jun. 19, 2003   (JP)   ............................ P2003-175623

(51) Int. Cl.
*G06F 17/00* (2006.01)
(52) U.S. Cl. ........................................................ 463/9
(58) Field of Classification Search ............. 463/40–42, 463/9; 705/1
See application file for complete search history.

(56) References Cited

U.S. PATENT DOCUMENTS

| | | | |
|---|---|---|---|
| 4,738,451 A * | 4/1988 | Logg .............................. | 463/2 |
| 5,390,937 A * | 2/1995 | Sakaguchi et al. ............. | 463/7 |
| 6,375,571 B1 | 4/2002 | Ohnuma et al. | |
| 6,398,650 B1 * | 6/2002 | Horigami et al. .............. | 463/43 |
| 6,585,599 B1 * | 7/2003 | Horigami et al. .............. | 463/43 |
| 6,723,822 B2 * | 4/2004 | Shirai et al. .................. | 528/195 |
| 6,807,521 B1 * | 10/2004 | Kurosawa et al. ............. | 703/22 |
| 6,860,807 B2 * | 3/2005 | Tsuchida ........................ | 463/7 |
| 6,884,169 B2 * | 4/2005 | Tsuchida et al. .............. | 463/31 |
| 7,001,271 B2 * | 2/2006 | Nakazawa et al. ............. | 463/7 |
| 7,033,275 B1 * | 4/2006 | Endo et al. ..................... | 463/33 |
| 7,223,174 B2 * | 5/2007 | Machida ........................ | 463/43 |
| 7,309,288 B2 * | 12/2007 | Machida ........................ | 463/43 |

(Continued)

FOREIGN PATENT DOCUMENTS

JP   2000-113206   4/2000

(Continued)

OTHER PUBLICATIONS

Chinese Office Action with English language Translation dated Mar. 24, 2006.

(Continued)

*Primary Examiner*—Ronald Laneau
(74) *Attorney, Agent, or Firm*—McGinn IP Law Group, PLLC

(57) ABSTRACT

In a machine main unit 1, the execution order of actions of all characters is calculated and the calculated execution order is displayed on a screen. The execution order of actions of the characters is calculated based on stored skill parameters and possessed item parameters. Further, if the action of an ally character is executed in response to entry operation, when a predetermined coordination condition for a different ally character from the ally character whose action is executed is satisfied, the action of the ally character is executed and the action of the different ally character is executed without following the action execution order.

22 Claims, 61 Drawing Sheets

U.S. PATENT DOCUMENTS

| | | | |
|---|---|---|---|
| 2002/0142817 A1* | 10/2002 | Nakazawa et al. | 463/7 |
| 2002/0142833 A1* | 10/2002 | Tsuchida et al. | 463/30 |
| 2004/0176163 A1* | 9/2004 | Ishihata et al. | 463/30 |
| 2004/0259613 A1* | 12/2004 | Machida | 463/1 |
| 2004/0259617 A1* | 12/2004 | Machida | 463/5 |
| 2004/0259636 A1* | 12/2004 | Machida | 463/30 |
| 2005/0014543 A1* | 1/2005 | Itoi et al. | 463/8 |

FOREIGN PATENT DOCUMENTS

| | | |
|---|---|---|
| JP | 2001-029655 | 2/2001 |
| JP | 2002-200334 | 7/2002 |
| JP | 2002-292141 | 10/2002 |

OTHER PUBLICATIONS

Korean Office Action dated Nov. 18, 2005, with partial English translation.

Chinese Office Action dated Nov. 17, 2006 with Englsih translation.

Japanese Office Action dated Dec. 18, 2007, with English language translation.

* cited by examiner

FIG. 7A

INDIVIDUAL SKILLS OF ALLY CHARACTER A

| LV (CHARACTER LEVEL) | HP (HIT POINTS) | MP (SPELL POINTS) | SP (SANITY POINTS) | STR (PHYSICAL OFFENSIVE POWER) | VIT (PHYSICAL DEFENSIVE POWER) | AGL (AGILITY) | INT (SPELL OFFENSIVE POWER) | POW (SPELL DEFENSIVE POWER) | LUC (LUCK) |
|---|---|---|---|---|---|---|---|---|---|
| 1 | 200 | 10 | 21 | 20 | 18 | 20 | 12 | 16 | 15 |
| ... | ... | ... | ... | ... | ... | ... | ... | ... | ... |
| 20 | 2776 | 176 | 40 | 43 | 40 | 43 | 31 | 35 | 36 |
| ... | ... | ... | ... | ... | ... | ... | ... | ... | ... |
| 50 | 6844 | 437 | 70 | 79 | 74 | 78 | 62 | 65 | 69 |
| ... | ... | ... | ... | ... | ... | ... | ... | ... | ... |

FIG. 7B

INDIVIDUAL SKILLS OF ALLY CHARACTER B

| LV (CHARACTER LEVEL) | HP (HIT POINTS) | MP (SPELL POINTS) | SP (SANITY POINTS) | STR (PHYSICAL OFFENSIVE POWER) | VIT (PHYSICAL DEFENSIVE POWER) | AGL (AGILITY) | INT (SPELL OFFENSIVE POWER) | POW (SPELL DEFENSIVE POWER) | LUC (LUCK) |
|---|---|---|---|---|---|---|---|---|---|
| 1 | 100 | 20 | 4 | 8 | 9 | 16 | 21 | 20 | 16 |
| ... | ... | ... | ... | ... | ... | ... | ... | ... | ... |
| 20 | 1936 | 275 | 9 | 27 | 27 | 35 | 41 | 39 | 37 |
| ... | ... | ... | ... | ... | ... | ... | ... | ... | ... |
| 50 | 4834 | 678 | 16 | 58 | 56 | 65 | 72 | 70 | 71 |
| ... | ... | ... | ... | ... | ... | ... | ... | ... | ... |

FIG. 8

| ACTION TYPE | EXECUTION COMMAND CORRECTION VALUE |
|---|---|
| DEFAULT | 3 |
| PHYSICAL ATTACK | 3 |
| SPELL (AID) | 2.5 |
| SPELL (RECOVERY) | 3 |
| SPELL (SMALL ATTACK) | 3 |
| SPELL (MEDIUM ATTACK) | 3.5 |
| SPELL (LARGE ATTACK) | 4 |
| PROPER TECHNIQUE | 4.5 |
| ITEM (RECOVERY) | 3 |
| ITEM (AID) | 2.5 |
| DEFENSE (USUAL) | 2 |
| DEFENCE (HOLD ON) | 2.5 |
| ESCAPE | 3 (AT FAILURE TIME) |

FIG. 13A

| CHARACTER | TURN INTERVAL TIME |
|---|---|
| ALLY CHARACTER A | AA1 |
| ALLY CHARACTER B | AB1 |
| ALLY CHARACTER C | AC1 |
| ALLY CHARACTER D | AD1 |
| ENEMY CHARACTER A | BA1 |
| ENEMY CHARACTER B | BB1 |
| ENEMY CHARACTER C | BC1 |

FIG. 13B

| CHARACTER | TURN INTERVAL TIME |
|---|---|
| ALLY CHARACTER A | AA2 |
| ALLY CHARACTER B | AB1 |
| ALLY CHARACTER C | AC1 |
| ALLY CHARACTER D | AD1 |
| ENEMY CHARACTER A | BA1 |
| ENEMY CHARACTER B | BB1 |
| ENEMY CHARACTER C | BC1 |

FIG. 13C

| CHARACTER | TURN INTERVAL TIME |
|---|---|
| ALLY CHARACTER A | AA2 |
| ALLY CHARACTER B | AB2 |
| ALLY CHARACTER C | AC1 |
| ALLY CHARACTER D | AD1 |
| ENEMY CHARACTER A | BA1 |
| ENEMY CHARACTER B | BB1 |
| ENEMY CHARACTER C | BC1 |

| CHARACTER | POSITION INFORMATION | | |
|---|---|---|---|
| | X | Y | Z |
| ALLY CHARACTER A | XA1 | YA1 | ZA1 |
| ALLY CHARACTER B | XA2 | YA2 | ZA2 |
| ALLY CHARACTER C | XA3 | YA3 | ZA3 |
| ALLY CHARACTER D | XA4 | YA4 | ZA4 |
| ENEMY CHARACTER A | XB1 | YB1 | ZB1 |
| ENEMY CHARACTER B | XB2 | YB2 | ZB2 |
| ENEMY CHARACTER C | XB3 | YB3 | ZB3 |

SCREEN AT COMMAND DETERMINATION TIME
(JUDGMENT RING DISPLAY)

SCREEN ON WHICH JUDGMENT RING IS BROKEN TO PIECES

DISPLAY SCREEN EXAMPLE AT BATTLE TIME
ACTION START SCREEN

DISPLAY SCREEN EXAMPLE AT BATTLE TIME
ACTION TERMINATION SCREEN

FIG. 39

| CHARACTER | ATTACK | ATTACK SKILL | FIRST TIMING AREA [°] | | SECOND TIMING AREA [°] | | THIRD TIMING AREA [°] | |
|---|---|---|---|---|---|---|---|---|
| | | | TOP | TERMINATION 120% | TOP | TERMINATION 120% | TOP | TERMINATION 120% |
| ALLY CHARACTER A | SOFT HIT | 6 | 45 | 135 30 | 180 | 247 23 | 292 | 337 15 |
| | NORMAL HIT | 28 | 45 | 115 23 | 180 | 231 17 | 292 | 325 11 |
| | HARD HIT | 50 | 45 | 100 18 | 180 | 219 13 | 292 | 316 8 |
| ALLY CHARACTER B | SOFT HIT | 3 | 50 | 125 25 | 157 | 205 16 | 247 | 282 12 |
| | NORMAL HIT | 20 | 50 | 105 18 | 157 | 193 12 | 247 | 273 9 |
| | HARD HIT | 37 | 50 | 90 13 | 157 | 177 7 | 247 | 261 5 |
| ALLY CHARACTER C | SOFT HIT | 21 | 22 | 90 23 | 202 | 260 19 | 270 | 310 13 |
| | NORMAL HIT | 38 | 22 | 70 16 | 202 | 240 14 | 270 | 298 9 |
| | HARD HIT | 42 | 22 | 55 11 | 202 | 233 10 | 270 | 289 6 |

FIG. 40

(SPECIAL TABLE)

| ALLY CHARACTER | SPECIAL SKILL | SKILL VALUE | FIRST TIMING AREA [°] ||| SECOND TIMING AREA [°] ||| THIRD TIMING AREA [°] |||
|---|---|---|---|---|---|---|---|---|---|---|---|
| | | | START ANGLE | END ANGLE | 120% AREA | START ANGLE | END ANGLE | 120% AREA | START ANGLE | END ANGLE | 120% AREA |
| A | ATTACK SPELL 1 | 99 | 45 | 180 | 20 | | | | | | |
| A | ATTACK SPELL 2 | 18 | 60 | 165 | 12 | 220 | 265 | 8 | | | |
| A | ATTACK SPELL 3 | 34 | 30 | 85 | 10 | 195 | 230 | 13 | 285 | 310 | 3 |
| B | RECOVERY SPELL 1 | 19 | 45 | 315 | 31 | | | | | | |
| B | RECOVERY SPELL 2 | 38 | 60 | 180 | 18 | 270 | 350 | 12 | | | |
| B | RECOVERY SPELL 3 | 50 | 45 | 120 | 12 | 135 | 186 | 8 | 270 | 310 | 5 |
| C | | | | | | | | | | | |

FIG. 41

(ITEM TABLE)

| ALLY CHARACTER | USED ITEM | USED ITEM INDIVIDUAL SKILL | FIRST TIMING AREA [°] | | | SECOND TIMING AREA [°] | | | THIRD TIMING AREA [°] | | |
|---|---|---|---|---|---|---|---|---|---|---|---|
| | | | START ANGLE | END ANGLE | 120% AREA | START ANGLE | END ANGLE | 120% AREA | START ANGLE | END ANGLE | 120% AREA |
| | ITEM A | 100 | 45 | 315 | 34 | | | | | | |
| COMMON | ITEM B | 500 | 135 | 225 | 11 | | | | | | |
| | ITEM C | COMPLETE RECOVERY | 45 | 130 | 7 | 215 | 285 | 10 | | | |

FIG. 42

| ATTACK TIME | ASSIGNMENT VALUE |
|---|---|
| FIRST | 0.2 |
| SECOND | 0.3 |
| THIRD | 0.5 |

OPPOSITE CHARACTER DAMAGE AMOUNT = ASSIGNMENT VALUE × SP REMAINING AMOUNT CORRECTION VALUE × CHARACTER INDIVIDUAL SKILL × ATTACK SKILL × JUDGMENT RING CORRECTION VALUE

AT PHYSICAL ATTACK TIME (AT COMMAND DETERMINATION TIME)

AT PHYSICAL ATTACK TIME (AFTER COMMAND DETERMINATION)

FIG. 45A

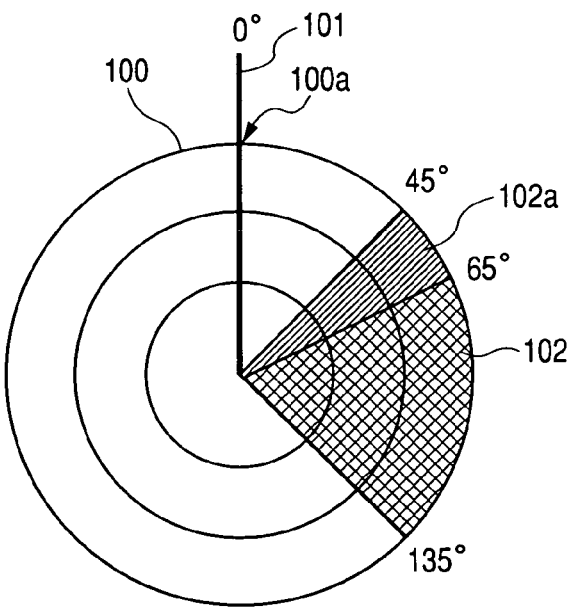

FIG. 45B

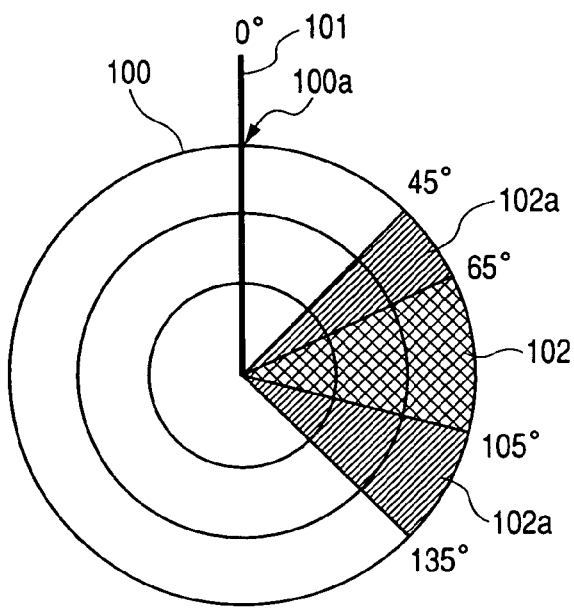

FIG. 46A

OPPOSITE CHARACTER DAMAGE AMOUNT WHEN ATTACK SPELL IS USED
= ASSIGNMENT VALUE x CHARACTER INDIVIDUAL SKILL x SKILL VALUE
OF USED SPECIAL SKILL x JUDGMENT RING CORRECTION VALUE

FIG. 46B

RECOVERY VALUE WHEN RECOVERY SPELL IS USED
= ASSIGNMENT VALUE x SKILL VALUE OF USED SPECIAL
SKILL x JUDGMENT RING CORRECTION VALUE

| SPECIAL SKILL USE TIME | ASSIGNMENT VALUE |
|---|---|
| FIRST | 0.2 |
| SECOND | 0.3 |
| THIRD | 0.5 |

FIG. 47

JUDGMENT RING CORRECTION PARAMETER TABLE

| TYPE | COMPONENT | TIMING AREA RANGE | | ROTATION SPEED | | SIZE | | NUMBER OF REVOLUTIONS | |
|---|---|---|---|---|---|---|---|---|---|
| | | INDIVIDUAL | ALL | INDIVIDUAL | ALL | INDIVIDUAL | ALL | INDIVIDUAL | ALL |
| ITEM | ITEM D | DOUBLE | | | | | | | |
| | ITEM E | | DOUBLE | | | | | | |
| | ITEM F | | | 1/2 | | | | | |
| | ITEM G | | | | 1/2 | | | | |
| | ITEM H | DOUBLE | | | | | | | |
| | ITEM I | | | IRREGULAR (HOWEVER, OFFENSIVE POWER IS TRIPLED) | | | | | |
| | ITEM J | ALL (ANYWHERE) | | | | | | | |
| | ITEM K | | | | | | | MAXIMUM OF SEVEN REVOLUTIONS AS LONG AS PLAYER SUCCEEDS | |
| | ITEM L | | | | | | | EFFECT OF ITEM + INCREASE IN OFFENSIVE POWER WITH INCREASE IN NUMBER OF REVOLUTIONS | |
| | ITEM M | NO EFFECTIVE AREA. RANDOM NUMBER IS ASSIGNED AT OPERATION TIMING AND THE NUMBER OF ATTACKING CHARACTERS (0 TO 4) AND OFFENSIVE POWER (ONE TO FOUR TIMES) ARE DETERMINED | | | | | | | |
| ENEMY SPELL | ENEMY SPELL A | 1/2 | | | | | | | |
| | ENEMY SPELL B | | | DOUBLE | | | | | |
| | ENEMY SPELL C | | | | | 1/2 | | | |
| | ENEMY SPELL D | | 1/2 | | | | DOUBLE | | |
| | ENEMY SPELL E | | | IRREGULAR | | DOUBLE | | | |
| | ENEMY SPELL F | EFFECTIVE AREA, ROTATION SPEED, AND SIZE ARE DETERMINED AT RANDOM IN THE RANGE OF 0.5 TO 2 (ALL) | | | | | | | |
| EVENT TYPE | CENTER BOSS A | | | | DOUBLE | | | | |
| | CENTER BOSS B | | 1/2 | | | | | | |
| | CENTER BOSS C | | 1/2 | | IRREGULAR | | | | |
| | RUSS BOSS | | 1/2 | | | | | | |

FIG. 51

| CHARACTER | SPECIFIC ATTACK | ATTACK TYPE | ATTACK TARGET RANGE | DAMAGE DISPLAY MODE OF TARGET CHARACTER | DAMAGE DISPLAY MODE AFTER ATTACK | MAXIMUM NUMBER OF HITS |
|---|---|---|---|---|---|---|
| ALLY CHARACTER A | SPECIFIC ATTACK A1 | SPELL | LARGE CIRCLE | ANTIAIRCRAFT MODE | BLOW IN AIR | 8 |
| | SPECIFIC ATTACK A2 | SPELL | MEDIUM CIRCLE | GROUND MODE | FLOAT | 10 |
| | SPECIFIC ATTACK A3 | FUSION | LARGE STRAIGHT LINE | ALL MODES | DOWN | 13 |
| | SPECIFIC ATTACK A4 | FUSION | LARGE THROUGH SHAPE | SCATTER MODE | FLOAT | 16 |
| | SPECIFIC ATTACK A5 | FUSION | WHOLE | ALL MODES | ACTION IMPOSSIBLE | 20 |
| | SPECIFIC ATTACK A6 | FUSION | SINGLE UNIT | ANTIAIRCRAFT MODE | BLOW IN AIR | 12 |

FIG. 79A

| CHARACTER | TURN INTERVAL TIME |
|---|---|
| ALLY CHARACTER A | AA1 |
| ALLY CHARACTER B | AB1 |
| ALLY CHARACTER C | AC1 |
| ALLY CHARACTER D | AD1 |
| ENEMY CHARACTER A | BA1 |
| ENEMY CHARACTER B | BB1 |
| ENEMY CHARACTER C | BC1 |

FIG. 79B

| CHARACTER | TURN INTERVAL TIME |
|---|---|
| ALLY CHARACTER A | AA2 |
| ALLY CHARACTER B | AB2=AB1-AA1 |
| ALLY CHARACTER C | AC2=AC1-AA1 |
| ALLY CHARACTER D | AD2=AD1-AA1 |
| ENEMY CHARACTER A | BA2=BA1-AA1 |
| ENEMY CHARACTER B | BB2=BB1-AA1 |
| ENEMY CHARACTER C | BC2=BC1-AA1 |

FIG. 79C

| CHARACTER | TURN INTERVAL TIME |
|---|---|
| ALLY CHARACTER A | AA3=AA2-AB2 |
| ALLY CHARACTER B | AB3 |
| ALLY CHARACTER C | AC3=AC2-AB2 |
| ALLY CHARACTER D | AD3=AD2-AB2 |
| ENEMY CHARACTER A | BA3=BA2-AB2 |
| ENEMY CHARACTER B | BB3=BB2-AB2 |
| ENEMY CHARACTER C | BC3=BC2-AB2 |

FIG. 80A

| ATTACK TARGET RANGE | SHAPE INFORMATION |
|---|---|
| | RADIUS |
| LARGE CIRCLE | R11 |
| MEDIUM CIRCLE | R12 |
| SMALL CIRCLE | R13 |

FIG. 80B

| ATTACK TARGET RANGE | SHAPE INFORMATION | |
|---|---|---|
| | RADIUS | ANGLE |
| LARGE SECTOR | R21 | D1 |
| MEDIUM SECTOR | R22 | D2 |
| SMALL SECTOR | R23 | D3 |

FIG. 80C

| ATTACK TARGET RANGE | SHAPE INFORMATION |
|---|---|
| | WIDTH |
| LARGE STRAIGHT LINE | W1 |
| MEDIUM STRAIGHT LINE | W2 |
| SMALL STRAIGHT LINE | W3 |

FIG. 80D

| ATTACK TARGET RANGE | SHAPE INFORMATION | |
|---|---|---|
| | RADIUS | WIDTH |
| LARGE THROUGH SHAPE | R21 | W1 |
| MEDIUM THROUGH SHAPE | R22 | W2 |
| SMALL THROUGH SHAPE | R23 | W3 |

GAMING MACHINE AND COMPUTER-READABLE PROGRAM PRODUCT

CROSS-REFERENCE TO THE RELATED APPLICATION(S)

This application is based upon and claims a priority from prior Japanese Patent Application No. 2003-175623 filed on Jun. 19, 2003, the entire contents of which are incorporated herein by reference. This application is related to co-pending U.S. applications claiming priorities on JP-2003-175618, JP-2003-175620, JP-2003-175622, JP-2003-175064, JP-2003-175065, JP-2003-175066, JP-2003-175136 and JP-2003-175137, and filed on even date herewith. The co-pending applications are expressly incorporated herein by reference.

BACKGROUND OF THE INVENTION

1. Field of the Invention

The present invention relates to a gaming program, a computer-readable record medium recording the gaming program, and a gaming machine, and in particular to a gaming program, a computer-readable record medium recording the gaming program, and a gaming machine for displaying a plurality of characters on a display screen and allowing a player to select the action of the character, thereby advancing a game.

2. Description of the Related Art

Hitherto, various games have been provided for a player to enter commands, etc., through operation unit such as a controller to handle a character in the game in a virtual world in the game on a screen of a computer, a television, etc., and advance a preset story. Such a game is generally called "RPG" (Role Playing Game).

The following RPG is generally known: A battle scene in which a character handled by a player, which will be hereinafter referred to as the ally character, and an enemy character controlled by a computer fight a battle is included and the player beats the enemy character in the battle, thereby acquiring an experiment value or virtual money, and proceeds the story whiling raising the character level.

In the battle scene in this kind of RPG, the attack made by the ally character is uniquely determined by the battle skill responsive to the level of the ally character, the attack power responsive to the possessed items and the like (such as arms and spells). The action of the character after command selection is automatically processed by the computer in accordance with the action control algorithm of the character contained in the game program based on the selected command. (For example, refer to JP-A-2002-200334.) On the other hand, the display mode after attack in the attacked character is also determined in response to the algorithm. It is a common practice to determine the attack order in response to the agility skill responsive to the level and the possessed items (arms, spell, etc.,).

SUMMARY OF THE INVENTION

However, in the gaming machine described above, the battle scene proceeds without displaying the action execution order containing attacks and thus the real pleasure of devising a stratagem is lost and it is feared that the interest in the game may be unable to be augmented.

It is therefore an object of the invention to provide a gaming program, a computer-readable record medium recording the gaming program, and a gaming machine for making it possible to display the action execution order, thereby augmenting the interest in a game.

According to a first aspect of the invention, there is provided a gaming machine for allowing a player to enter an action command of an ally character to proceed a game, the gaming machine including: an operation unit that allows the player to enter the action command; a display control section that displays a plurality of characters including at least the one ally character and at least one enemy character on a display for displaying the progress of the game and displaying a battle between the ally character and the enemy character; and an execution order calculation section that calculates the execution order of actions of the plurality of characters in the battle, wherein the display control section displays the execution order calculated by the execution order calculation section on the display.

According to a second aspect of the invention, there is provided a computer-readable program product for storing a gaming program for causing a computer to execute steps including: allowing a player to enter an action command of an ally character to proceed a game; displaying a plurality of characters including at least one ally character and at least one enemy character on a display for displaying the progress of the game and displaying a battle between the ally character and the enemy character; calculating the execution order of actions of the plurality of characters at the battle time; and displaying the calculated execution order on the display.

BRIEF DESCRIPTION OF THE DRAWINGS

These and other objects and advantages of the present invention will be more fully apparent from the following detailed description taken in conjunction with the accompanying drawings, in which:

FIGS. 7A and 7B are drawings to show the character individual skills of ally characters A and B;

FIG. 8 is a drawing to show execution command correction values;

FIGS. 13A to 13C are drawings to show turn interval values;

FIG. 39 is a drawing to show an arm table;

FIG. 40 is a drawing to show a special table;

FIG. 41 is a drawing to show an item table;

FIG. 42 is a drawing to show a calculation expression for calculating the damage amount to an enemy character (opposite character damage amount);

FIGS. 45A and 45B are drawings to show different examples of 120% areas;

FIG. 46A is a drawing to show a calculation expression for calculating the opposite character damage amount when attack spell is used and FIG. 46B is a drawing to show a calculation expression for calculating the recovery value when recovery spell is used;

FIG. 47 is a drawing to show a judgment ring correction parameter table;

FIG. 51 is a drawing to show the types of actions for changing a damage display mode;

FIGS. 79A through 79C are drawings to show turn interval values;

FIGS. 80A through 80D are drawings to show the shapes of attack target ranges;

DETAILED DESCRIPTION OF THE PREFERRED EMBODIMENTS

Referring now to the accompanying drawings, there is shown a preferred embodiment of the invention.

Configuration of gaming machine

Figure 1:
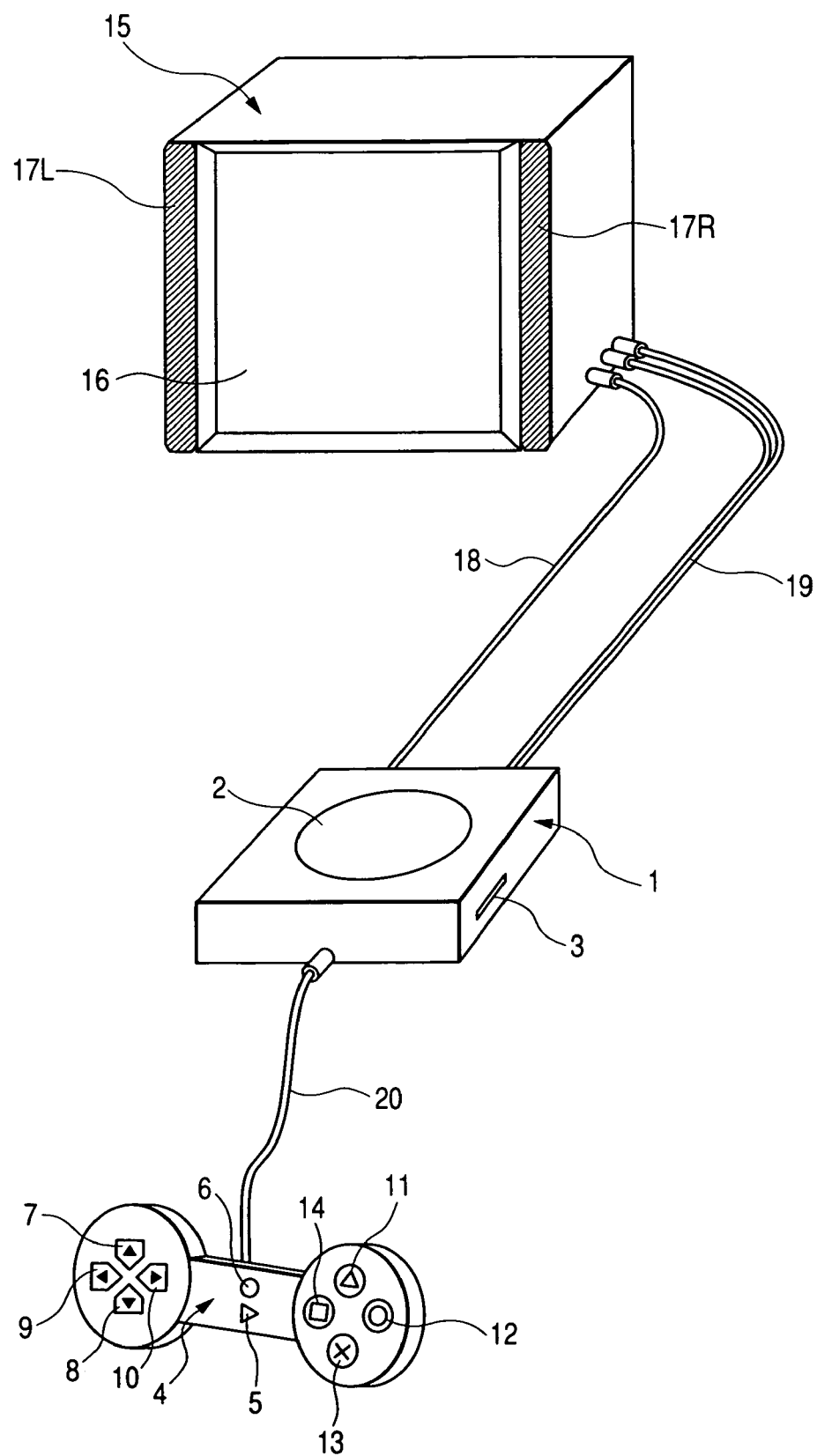
FIG. 1 is a drawing to show the general configuration of a gaming machine incorporating the invention.

FIG. 1 shows the general configuration of a gaming machine incorporating the invention. The gaming machine is made up of a machine main unit 1, a controller 4 as operation unit that can be operated by a player for outputting a control command to the machine main unit 1 in response to operation of a player, and a display 15 for displaying an image based on an image signal from the machine main unit 1. In the gaming machine, a game is executed as various images of a plurality of characters including ally characters and enemy characters and the like are displayed on a display surface (screen) 16 of the display 15 such as a CRT.

A game executed in the gaming machine is executed as a gaming program recorded on an external record medium separate from the main unit 1 is read. In addition to a CD-ROM or a DVD-ROM, an FD (flexible disk) or any other record medium can be used as the external record medium recording the gaming program. In the embodiment, a DVD-ROM is used as the external record medium. A cover 2 that can be opened and closed is provided in the top center of the main unit 1. As the cover 2 is opened, a DVD-ROM 31 (FIG. 2) can be placed in a DVD-ROM drive 29 (FIG. 2) as a record medium drive provided inside the main unit 1.

The controller 4 includes various input parts for outputting a control command to a CPU 21 (FIG. 2) in the main unit 1 in response to operation of the player. The controller 4 is provided in the left portion with an up button 7, a down button 8, a left button 9, and a right button 10 mainly operated by the player to move a character in a game or move an option of a menu as the input parts. The controller 4 is provided in the right portion with a Δ button 11, a O button 12, a X button 13, and a □ button 14 mainly operated by the player to determine or cancel various items. The controller 4 is provided in the center with a selection button 6 at the top and a start button 5 at the bottom.

The display 15 has input terminals of a video signal and an audio signal, which are connected to a video output terminal and an audio output terminal of the main unit 1 by terminal cables 18 and 19. Used as the display 15 is an existing television having in one piece the screen 16 that can display image data output from an image output section 25 (FIG. 2) described later and speakers 17L and 17R that can output audio data output from an audio output section 27 (FIG. 2) described later. The main unit 1 and the controller 4 are connected by a signal cable 20 as shown in FIG. 1.

Figure 2:
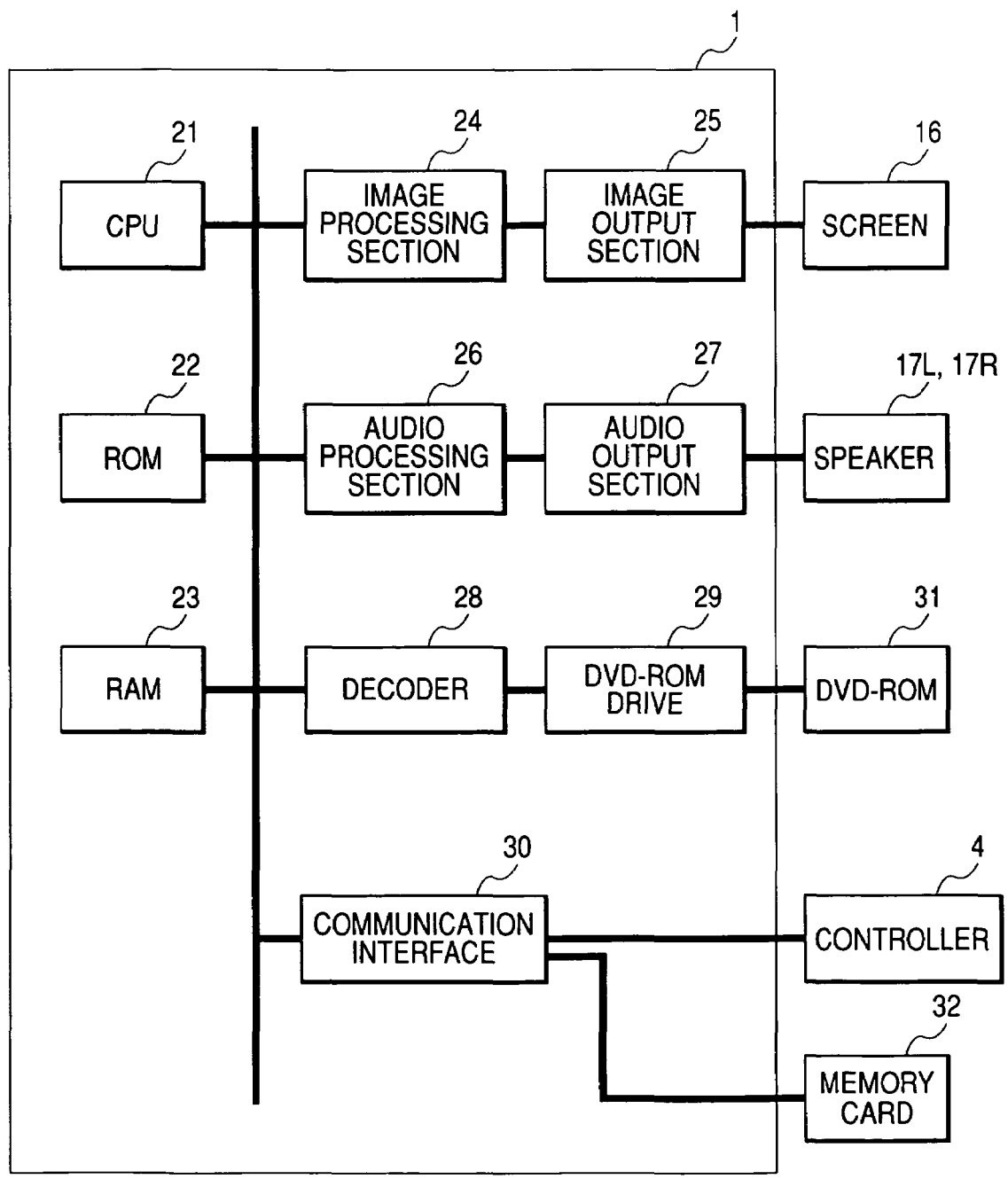
FIG. 2 is a block diagram to show the system configuration of the gaming machine in FIG. 1.

The main unit 1 is provided on one side with a memory slot 3 as an insertion slot of a memory card 32 (FIG. 2). The memory card 32 is a storage medium for temporarily recording game data in a case such as when the player interrupts the game. The data recorded on the memory card 32 is read through a communication interface 30 (FIG. 2) described later having a card reader function.

Electric Configuration

FIG. 2 shows the system configuration of the gaming machine. The main unit 1 includes the CPU 21 as control section, ROM 22 and RAM 23 as storage section, an image processing section 24, the image output section 25, an audio processing section 26, the audio output section 27, a decoder 28, the DVD-ROM drive 29, and the communication interface 30.

The DVD-ROM 31 can be attached to and detached from the DVD-ROM drive 29 and the gaming program in the DVD-ROM 31 placed in the DVD-ROM drive 29 is read by the CPU 21 in accordance with a basic operation program of an OS (operating system), stored in the ROM 22. The read gaming program is converted into predetermined signals by the decoder 28 for storage in the RAM 23.

The gaming program stored in the RAM 23 is executed by the CPU 21 in accordance with the basic operation program or an input signal from the controller 4. Image data and audio data are read from the DVD-ROM 31 in response to the executed gaming program. The image data is sent to the image processing section 24 and the audio data is sent to the audio processing section 26.

The image processing section 24 converts the received image data into an image signal and supplies the image signal to the screen 16 through the image output section 25. The audio processing section 26 converts the received audio data into an audio signal and supplies the audio signal to the speakers 17L and 17R through the audio output section 27.

The communication interface 30 enables the controller 4 and the memory card 32 to be connected detachably to the main unit 1. Through the communication interface 30, data is read from and written into the memory card 32 and a signal from the controller 4 is sent to the sections including the CPU 21.

Next, specific examples of processing executed by the CPU 21 based on the gaming program recorded on the DVD-ROM 31 and the game content displayed on the screen 16 as the processing is executed will be discussed.

Main Game Processing

When power of the machine main unit 1 is on, when the DVD-ROM 31 is placed in the DVD-ROM drive 29, "opening demonstration" is displayed on the screen 16. The "opening demonstration" is effect display for telling the player about the start of a game. After the "opening demonstration" is displayed for a predetermined time, a "title screen" drawing a game title large is displayed and "main game processing" shown in FIG. 4 is started.

Figure 3A:
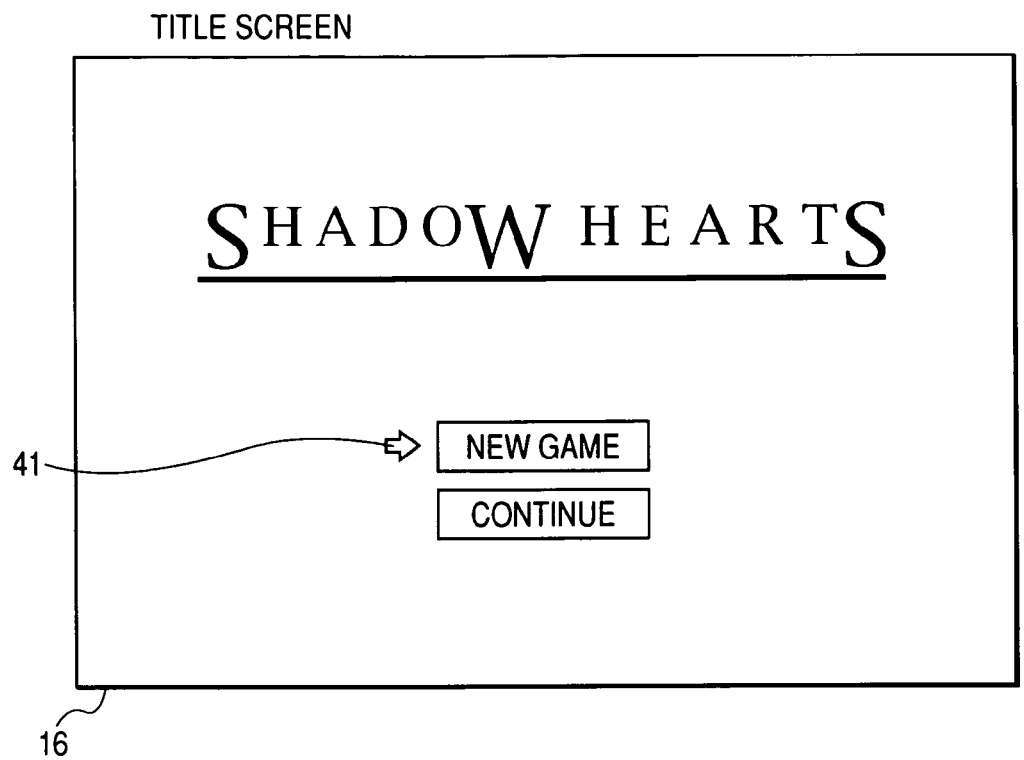
FIGS. 3A and 3B show display examples of a title screen and a world map.

FIG. 3A shows an example of the "title screen." Here, the character string of the game title, SHADOW HEARTS, is displayed and two options (NEW GAME and CONTINUE) are displayed below the game title. A cursor 41 is displayed at the left position of the option of either NEW GAME or CONTINUE and as the player operates the up button 7 or the down button 8, the position of the cursor 41 is changed. When the player operates the O button 12, the option pointed to by the cursor 41 for selection is selected.

Figure 3B:
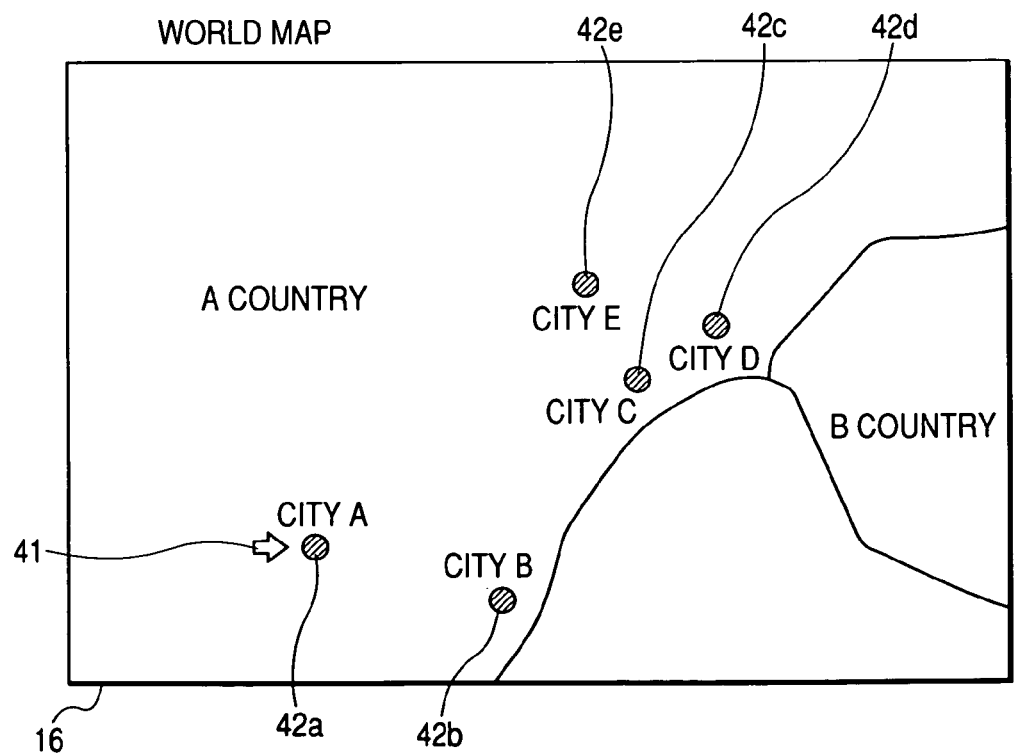
Figure 4:
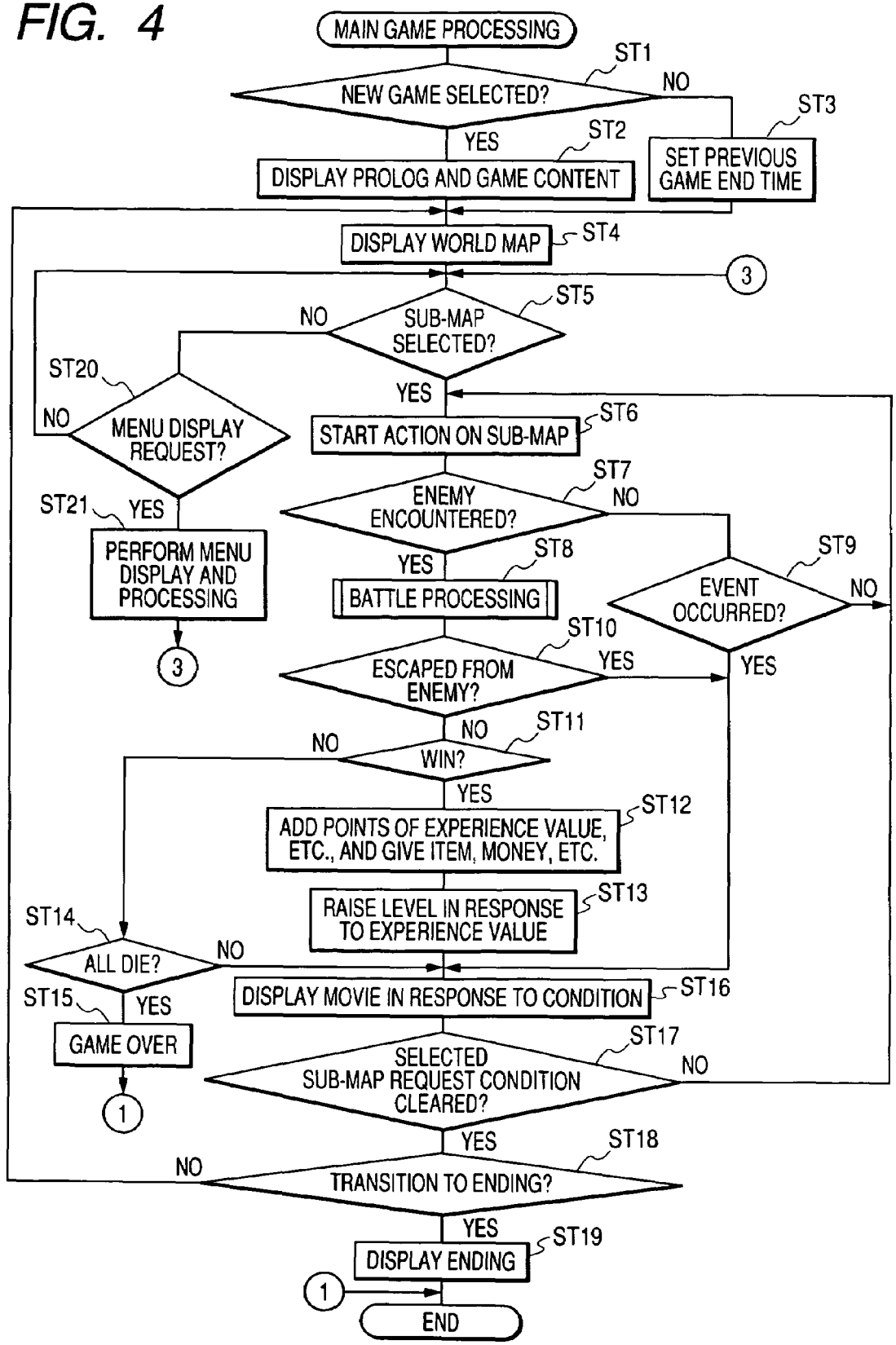
FIG. 4 is a flowchart to show a procedure of ally game processing.

In the "main game processing" shown in FIG. 4, first, which of the two options is selected on the title screen is determined (ST1). If it is determined that NEW GAME is selected (YES at ST1), a prolog and the game content are displayed (ST2) and then a "world map" shown in FIG. 3B is displayed (ST4). On the other hand, if it is determined that CONTINUE is selected (NO at ST1), the situation at the previous game end time is set to restore the state of the game (ST3), and then the "world map" is displayed without displaying the prolog or the game content (ST4).

As the game according to the embodiment, a main character of an ally character which acts based on operation of the player and an enemy character which acts based on the gaming program appear and a game developed centering on the battle between the characters is realized on the screen 16. In the embodiment, four main characters, namely, a main character A 111, a main character B 112, a main character C 113 and a main character D 114 appear and the game proceeds in the party unit made up of the four main characters. Various types of status are set for each character. The experience value, money, arms, skill, and the like added by the number of gaming times, the number of times an enemy character has been beaten, etc, are defined as the status.

FIG. 3B shows an example of "world map." The main cities of "A country" as the stage of the game story are displayed on the "world map" and options indicated by five city names (CITY A 42a, CITY B 42b, CITY C 42c, CITY D 42d, and CITY E 42e) are displayed. They are options to make a transition to a provided "sub-map." As the player operates the up button 7 or the down button 8, the cursor 41 indicating each option moves and as the player operates the O button 12, one option is selected. When one "sub-map" is thus selected, the "world map" makes a transition to the screen corresponding to the "sub-map" and the player can play various games set in response to the "sub-map." Specifically, the visual scene in each city is prerender-displayed as a background image conforming to scene development and while the main characters move therein, various events are conquered and the story proceeds.

When the player operates the O button 14 on the "world map," a "menu screen" is displayed, enabling the player to make various settings, etc., on the "menu screen."

Referring again to FIG. 4, when any of the options displayed on the "world map" is selected (YES at ST5), a start screen of the "sub-map" responsive to the selected option is displayed and the party of the ally characters starts action on the "sub-map" (ST6). On the other hand, when the determination at ST5 is NO, whether or not the player operates the ☐ button 14 on the "world map" for making a "menu screen" display request is determined (ST20). When the determination at ST20 is YES, the "menu screen" is displayed and various types of setting processing are performed in response to operation of the player (ST21). On the other hand, when the determination at ST20 is NO, the process again goes to ST5. The action on the "sub-map" is for the ally character to walk, talk to a pedestrian, do shopping, etc. The player can also display the "menu screen" by operating the ☐ button 14 on the "sub-map" and various types of operation are made possible. For example, as the player selects a TOOL command, TOOL command processing is executed and the skill of an ally character can be recovered; as the player selects a TRADE command, trade processing is executed and it is made possible to sell a possessed item.

Then, when the main character party starting action on the "sub-map" encounters an enemy character (YES at ST7), "battle processing" is started (ST8). When the "battle processing" is started, a transition is made to a "battle scene" where a battle is fought between the main character party and the enemy character. The "battle processing" is described later. On the other hand, when the main character party does not encounter an enemy character (NO at ST7), when some event occurs (YES at ST9), the process proceeds to ST16 and a movie responsive to the event is displayed; when no event occurs (NO at ST9), the process returns to ST6.

In the "battle scene" executed by performing the "battle processing, " when the main character party succeeds in escaping from the enemy character (YES at ST10), the process proceeds to ST16 and a movie responsive to the situation is displayed. On the other hand, when the main character party fails in escaping from the enemy character or the main character party fights a battle with the enemy character (NO at ST10), subsequently whether or not the main character party wins the enemy character in the battle in the "battle scene" is determined (ST11). When the determination is YES, namely, when the main character party wins the enemy character, points of the experience value, etc., are added and an item and money are given to each character of the party in response to the type of enemy character and the battle substance (ST12). The level of each character is raised in response to the experience value of the character (ST13). Then, a movie responsive to the situation is displayed (ST16). When the determination at ST11 is NO, namely, when the main character party cannot win the enemy character, subsequently whether all characters of the main character party die is determined (ST14). When the determination is NO, the process proceeds to ST16. When the determination at ST14 is YES, the game is over (ST15) and the main game processing is terminated.

After a movie is displayed at ST16, if the sub-map request condition has been cleared (YES at ST17), subsequently whether or not a transition is to be made to the ending is determined (ST18). If the determination at ST18 is YES, a predetermined ending is displayed (ST19) and the "main game processing" is terminated. On the other hand, if the determination at ST18 is NO, the process again goes to ST4.

Battle Processing

The "battle processing" will be discussed with FIG. 5.

Figure 5:
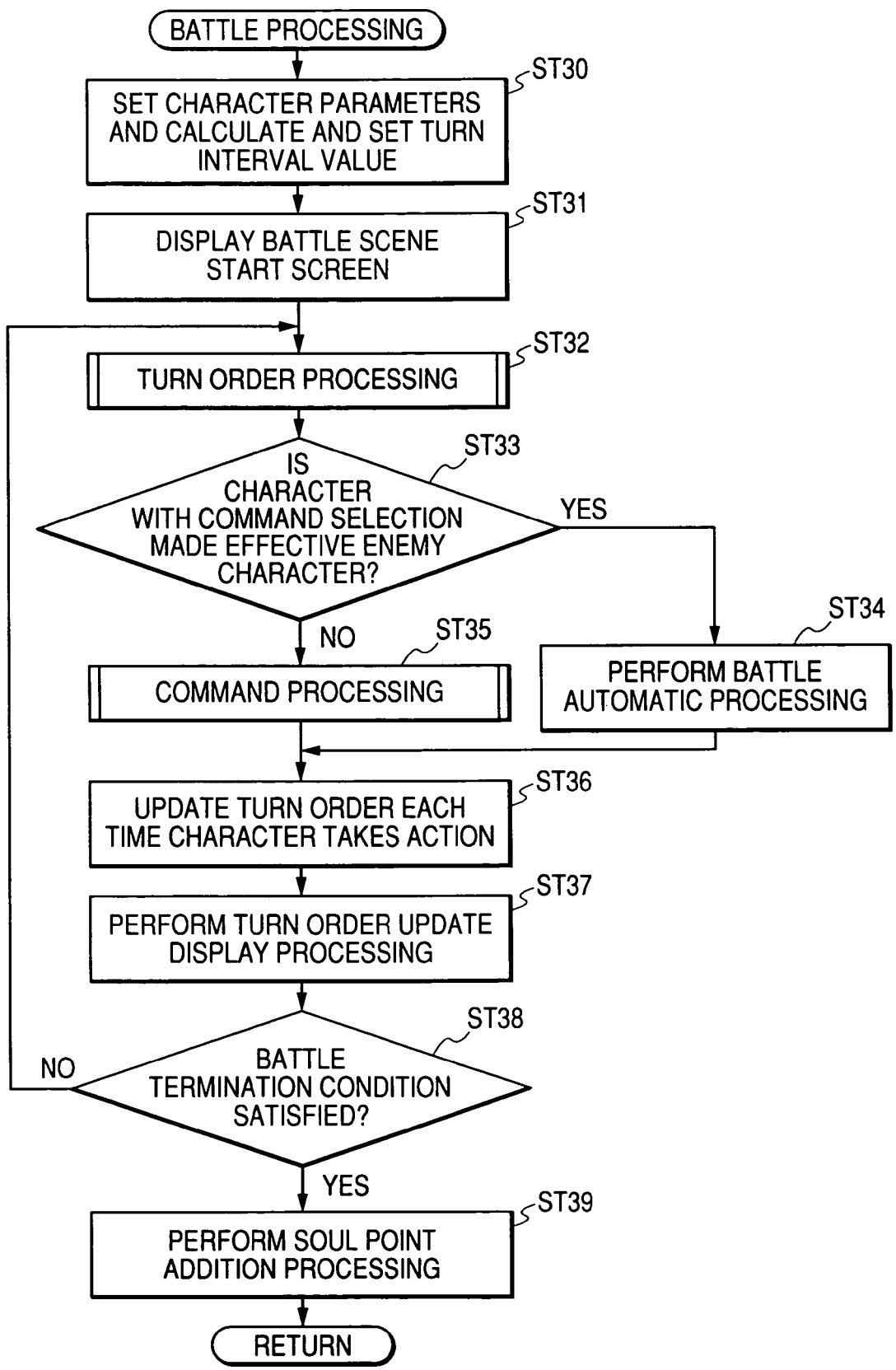
FIG. 5 is a flowchart to show a procedure of battle processing.
Figure 6:
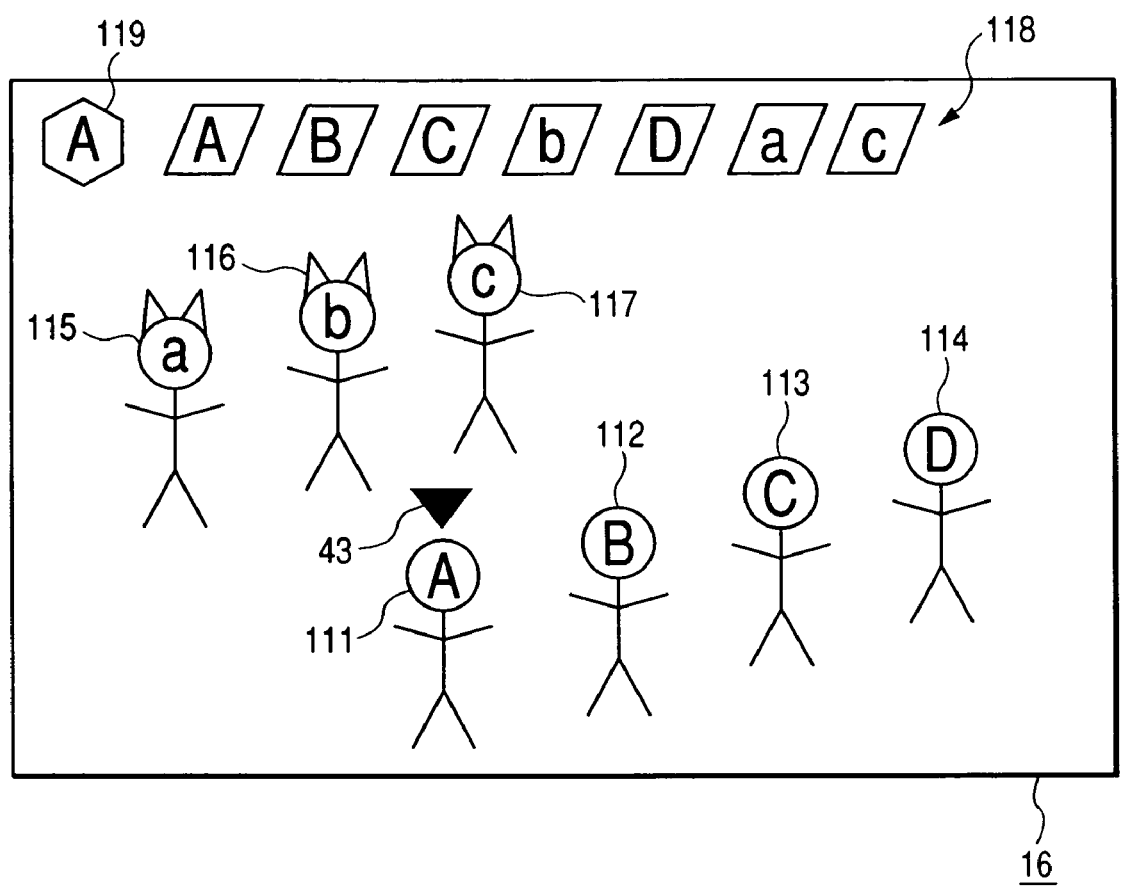
FIG. 6 is a drawing to show a battle scene start screen.

As shown in FIG. 5, first, parameters concerning characters (character parameters) are set and the turn interval value is calculated and set (ST30). At ST30, the CPU 21 sets the character parameters in a predetermined area of the RAM 23 from a predetermined area of the DVD-ROM 31. The characters correspond to a plurality of characters including ally and enemy characters made to appear in a "battle scene" as shown in FIG. 6.

Character Individual Skills

As a specific example of the character parameters, the character individual skills will be discussed with FIG. 7. FIG. 7 is a schematic representation to show the character individual skills of the ally characters A 111 and B 112.

The character individual skills shown in FIG. 7 are stored for each of the characters appearing in the game. The types of character individual skills include physical attack power (STR), physical defence power (VIT), agility (AGL), magic (spell) attack power (INT), spell defence power (POW), and luck (LUC) in addition to HP, MP, and SP described above. Each of them is represented by a numeric value and a different value is set depending on the type of character although the character level is the same.

The character individual skills are set in response to the character level (LV). This character level changes in response to the experience value cumulatively stored in response to the experience of battle, etc., in the game. Particularly for HP, MP, and SP, the maximum HP, the maximum MP, and the maximum SP corresponding to the character individual skills and the actual HP, MP, and SP changing in the game are stored. Of course, AGL and LUC also change with a special item or a special technique, as described later.

The character individual skills are loaded into the RAM 23. The character individual skills change in response to the arm, protector, item, etc., with which the character is equipped. They also change in response to the worked spell and the used item by the character. The CPU 21 for loading the character individual skill table into the RAM 23 corresponds to character parameter storage section for storing the skill parameters and the possessed item parameters for each character. The DVD-ROM 31 in which the character individual skill table is stored also corresponds to character parameter storage section in which the skill parameters and the possessed item parameters are stored for each character.

Thus, the CPU 21 reads the character parameters such as the character individual skills stored in the RAM 23 from the RAM 23.

Turn Interval Value

The turn interval value is calculated for each of the characters including ally and enemy characters. The CPU 21 reads the agility (AGL) and the luck (LUC) set for each of the characters and an execution command correction value (described later). The agility (AGL) and the luck (LUC) are set in response to the level of the character and are updated based on spell, special technique, special item, as described above.

The execution command correction value will be discussed with FIG. 8. FIG. 8 is a schematic representation to show the execution command correction value.

The execution command correction values are set in a one-to-one correspondence with the previously executed action types in "battle scene" as shown in FIG. 8. The execution command correction values are stored in the DVD-ROM 31 and are loaded by the CPU 21 into a predetermined area of the RAM 23.

Further, as a specific turn interval value calculation method, turn interval value=[{108.9−AGL+(LUC/10)}×28/108.9+4]×[execution command correction value]. Since the processing is executed when a "battle scene" is started, the default value 3 is used as the execution command correction value. Of course, another calculation method may be adopted and table control may be performed.

The CPU 21 sets the turn interval value calculated for each of the characters made to appear in a "battle scene" in a predetermined area of the RAM 23. The CPU 21 for executing the processing corresponds to execution order calculation section for calculating the execution order of actions of all characters. The execution order calculation section has a function of calculating the execution order of actions of all characters based on the skill parameters and the possessed item parameters stored by the character parameter storage section. Upon completion of the processing, the process proceeds to ST31.

At ST31, a "battle scene" start screen as shown in FIG. 6 is displayed. On the start screen, the ally character party (ally character A 111, ally character B 112, ally character C 113, and ally character D 114) is displayed toward the player. Although described later in detail, the attack order is assigned to the characters on the screen and a battle image among the characters is displayed (the game is advanced on the screen) Three enemy characters (enemy character A 115, enemy character B 116, and enemy character C 117) are displayed facing the ally characters at the positions corresponding to the ally characters. Although not shown in FIG. 6, information concerning the status of each ally character is displayed in the lower right portion of the start screen. A turn order 118 of executing the actions of the ally and enemy characters is displayed on the top of the start screen. The turn order displayed as in FIG. 6 indicates execution of the action of each character in order from left to right. A hexagon mark 119 is displayed at the right end of the turn order, indicating the character to execute action. Further, when an action command is selected, a temporary turn order is displayed as in FIG. 11, etc., (for example, the mark indicating the ally character D 114 is displayed at the right end as the temporary turn order after execution of the ally character D 114).

Specifically, hit points (HP), magic points (MP), and sanity points (SP) are predetermined for each ally character, and the remaining numbers of points (current number of points/initial number of points) are displayed on the start screen.

As HP remains, the ally character can execute various commands of attack, item use, etc., and when HP becomes zero, the corresponding ally character becomes inactive. MP enables the corresponding ally character to use a special skill of spell, etc., and when MP becomes zero, the ally character becomes unable to use the special skill. SP enables the corresponding ally character to hold its sanity. When SP becomes zero, the ally character loses its sanity and enters an abnormal status. When the ally character enters the abnormal status, command manipulation for the ally character becomes ineffective and the ally character runs away so as to take abnormal action in such a manner that it makes an attack on any character regardless of whether the character is an enemy or an ally.

The turn order is displayed based on the turn order set at ST30, as described later. In the embodiment, after all characters appearing in the "battle scene" execute actions, again the turn order for all characters to execute actions is determined.

At ST32, "turn order processing" is performed to manage the order in which the ally characters and enemy characters can take action of attack, etc. In the processing, the CPU 21 manages the turn order of the character for which command selection is made effective based on the turn interval value calculated from the skills concerning each character, etc. The CPU 21 displays an image indicating the turn order on the screen 16. The "turn order processing" is described later in detail.

Figure 16:
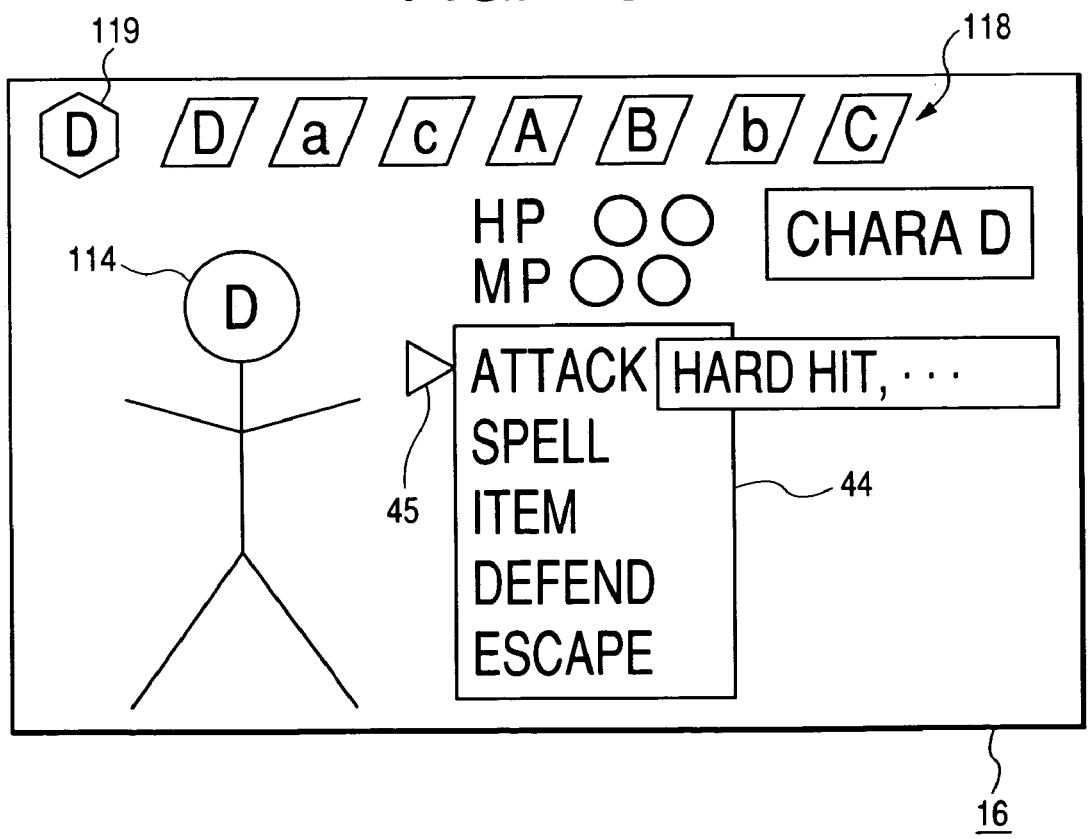
FIG. 16 is a drawing to show an action selection screen.

The CPU 21 displays a selection mark 43 above the head of the ally character for which command selection is made effective on the screen 16, as shown in FIG. 6. After the display, subsequently the ally character with the selection mark 43 displayed above the head (in this case, the ally character D 114) is zoomed up, and a "command selection screen" as shown in FIG. 16 is displayed. When the "turn order processing" is exited, the process returns to ST33.

At ST33, whether or not the character for which command selection is made effective in the "turn order processing" (the character whose turn has come around) is an enemy character is determined. If the determination at ST33 is YES, automatic processing is performed in accordance with the gaming program so that the enemy character makes an attack on the ally character (ST34).

On the other hand, if it is determined at ST33 that the character for which command selection is made effective is the ally character, subsequently "command processing" of accepting command selection of the player is performed (ST35). In the processing, a command is selected in response to player's entry operation through the controller 4, and the action is determined based on the selected command. This means that the action for any of the characters is determined in response to player's entry operation through the controller 4. The CPU 21 for executing the processing corresponds to action determination section for determining the action of any of the characters in response to player's entry operation through operation unit.

The CPU 21 displays a command menu 44 containing options of commands to determine the action of the ally character D 114 on the screen 16, as shown in FIG. 16. The CPU 21 moves a selection cursor 45 displayed at the left of the command menu 44 as the player operates the up button 7 or the down button 8 of the controller 4. When the player operates the O button 12, the command with the selection cursor 45 displayed at the left position is selected and the action of the main character D 114 is determined. Five commands of attack, spell, ITEM, DEFEND, and ESCAPE are displayed on the command menu 44 in FIG. 16.

Effect display responsive to the determined action is produced. For example, when the player selects an attack, spell, or special technique command (ACTION command described later), display processing such that action is taken against the target character as the target of the ally character or the enemy character, etc., is executed. When a command for combination (COMBINATION command described later) is selected, display processing of moving the ally character, etc., is executed. In the "command processing," "judgment processing" for making possible technical intervention according to the operation timing of the player is also performed. The "command processing" is described later in detail. When the "command processing" is exited, the process returns to ST36.

At ST36, the turn order is updated each time the character takes action. In the processing, the CPU 21 stores the character taking action in a predetermined area of the RAM 23 and updates the turn order of the character taking action. Accordingly, when the "turn order processing" is again performed, the turn orders are compared and the characters for which command selection is made effective to cause the characters to take action are determined. When all characters execute action, the characters executing action are stored as if they did not any action. Upon completion of ST36, the process proceeds to ST37.

At ST37, turn order update display processing is executed. In the processing, the CPU 21 updates and displays the turn order for executing action in the next turn based on the turn order updated at ST37. Upon completion of ST37, the process proceeds to ST38.

At ST38, whether or not the "battle processing" termination condition is satisfied is determined. When the determination at ST38 is NO, the process returns to ST32; when the determination is YES, "soul point addition processing" is executed (ST39) and the "battle processing" is exited. The "battle processing" exit condition is any of the fact that the enemy characters appearing on the battle screen suffer a crushing defeat, the fact that the player selects an "ESCAPE" command and the main character party succeeds in escaping from the enemy characters, the fact that the ally character party suffers a crushing defeat, or the fact that such an event for terminating the battle occurs.

Turn Order Processing

The "turn order processing" will be discussed with FIG. 9.

Figure 9:
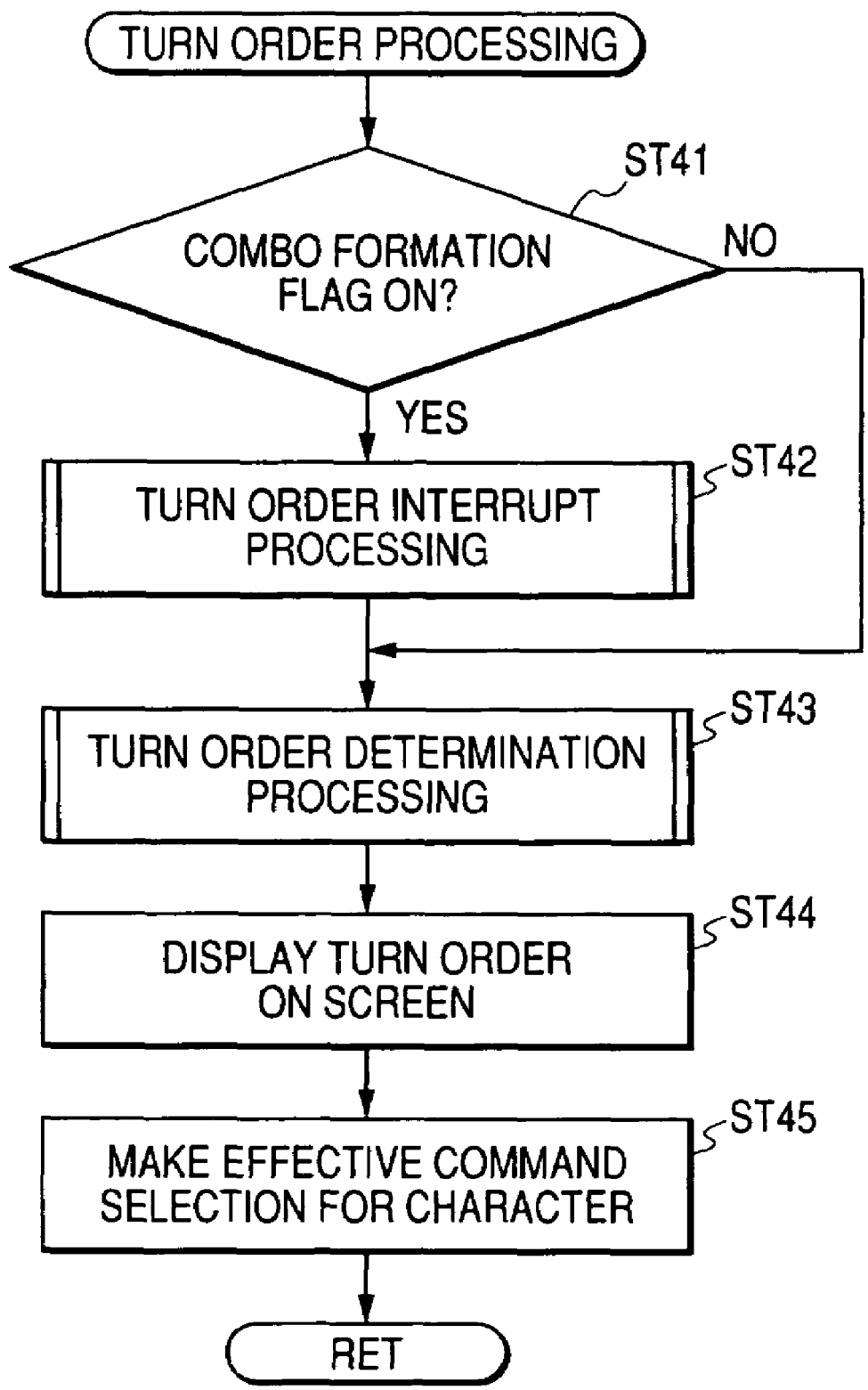
FIG. 9 is a flowchart to show a procedure of turn order processing.

As shown in FIG. 9, first, whether or not a combo formation flag is ON is determined (ST41). In the processing, the CPU 21 reads the combo formation flag stored in a predetermined area of the RAM 23 by executing ST253, ST254, etc., (described later). If the CPU 21 determines that the combo formation flag is ON, the process proceeds to ST42. On the other hand, if the CPU 21 does not determine that the combo formation flag is ON, the process proceeds to ST43.

At ST42, "turn order interrupt processing" is executed. In the processing, the CPU 21 determines the turn order to cause the characters to execute combo action preferentially. The "turn order interrupt processing" is described later in detail. When the processing is exited, the process returns to ST43.

At ST43, "turn order determination processing" is executed. In the processing, the CPU 21 determines the turn order based on the turn order determined at ST42 and the turn interval value of each character. The "turn order determination processing" is described later in detail. When the processing is exited, the process returns to ST44.

At ST44, the turn order is displayed on the screen. In the processing, the CPU 21 displays the turn order determined at ST43 on the screen 16 as shown in FIG. 6. The CPU 21 for executing the processing corresponds to order display control section for displaying the execution order calculated by the execution order calculation section on the screen. Upon completion of ST44, the process proceeds to ST45.

At ST45, command selection for the character is made effective. In the processing, the CPU21 makes effective command selection for the character caused to execute action based on the turn order determined at ST43. Upon completion of ST45, the subroutine is exited.

Turn Order Interrupt Processing

Figure 10:
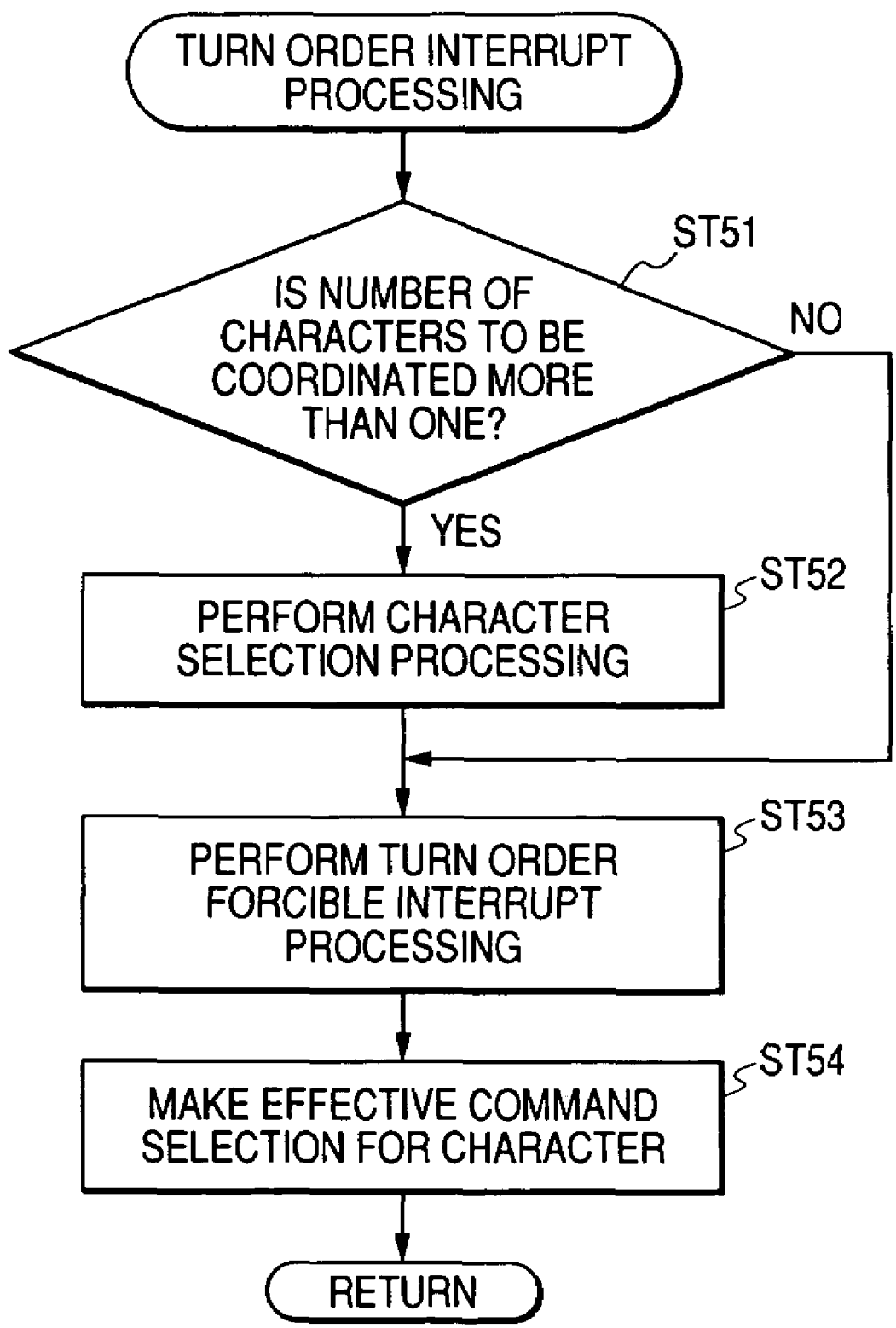
FIG. 10 is a flowchart to show a procedure of turn order interrupt processing.

The "turn order interrupt processing" will be discussed with FIG. 10.

First, whether or not the number of characters to be coordinated is more than one is determined (ST51). Whether or not a character exists in a combination attack effective range 120 (for example, within 1 m in diameter (in the game) with the ally character in collection as the center) is determined by direct measurement each time. In the processing, the CPU 21 reads the data indicating the characters to be coordinated from the RAM 23 and determines whether or not the number of characters to be coordinated is one or more. If the CPU determines that the number of characters to be coordinated is more than one, the process proceeds to ST52. On the other hand, if the CPU does not determine that the number of characters to be coordinated is more than one, the process proceeds to ST53. The ally character as the reference (center) of the combination attack effective range 120 may be the first ally character or may be the ally character executing combo (action) just before.

At ST52, character selection processing is executed. In the processing, the CPU 21 displays a combination character selection image shown in FIG. 11. The CPU 21 determines the ally characters for making combination attack in response to an entry operation signal in the controller 4. Upon completion of ST52, the process proceeds to ST53.

At ST53, turn order forcible interrupt processing is executed. In the processing, the CPU 21 determines the turn order of the ally characters for making combination attack so that the turn order is forcibly made preferential. The CPU 21 for executing the processing corresponds to action execution section. When the action of an ally character is executed in response to player's entry operation through the operation unit, when a predetermined combination condition (combo condition) for a different ally character from the ally character whose action is executed is satisfied, the action execution section executes the action of the ally character and executes the action of the different ally character without following the action execution order.

The CPU 21 makes effective command selection for the character determined so as to be forcibly made preferential (ST54). Accordingly, command selection for the ally characters for making combination attack is forcibly made effective independently of the turn interval value, so that the player can devise a stratagem of a battle involving combination attack. Upon completion of ST54, the subroutine is exited.

Turn Order Determination Processing

The "turn order determination processing" will be discussed with FIG. 12.

Figure 12:
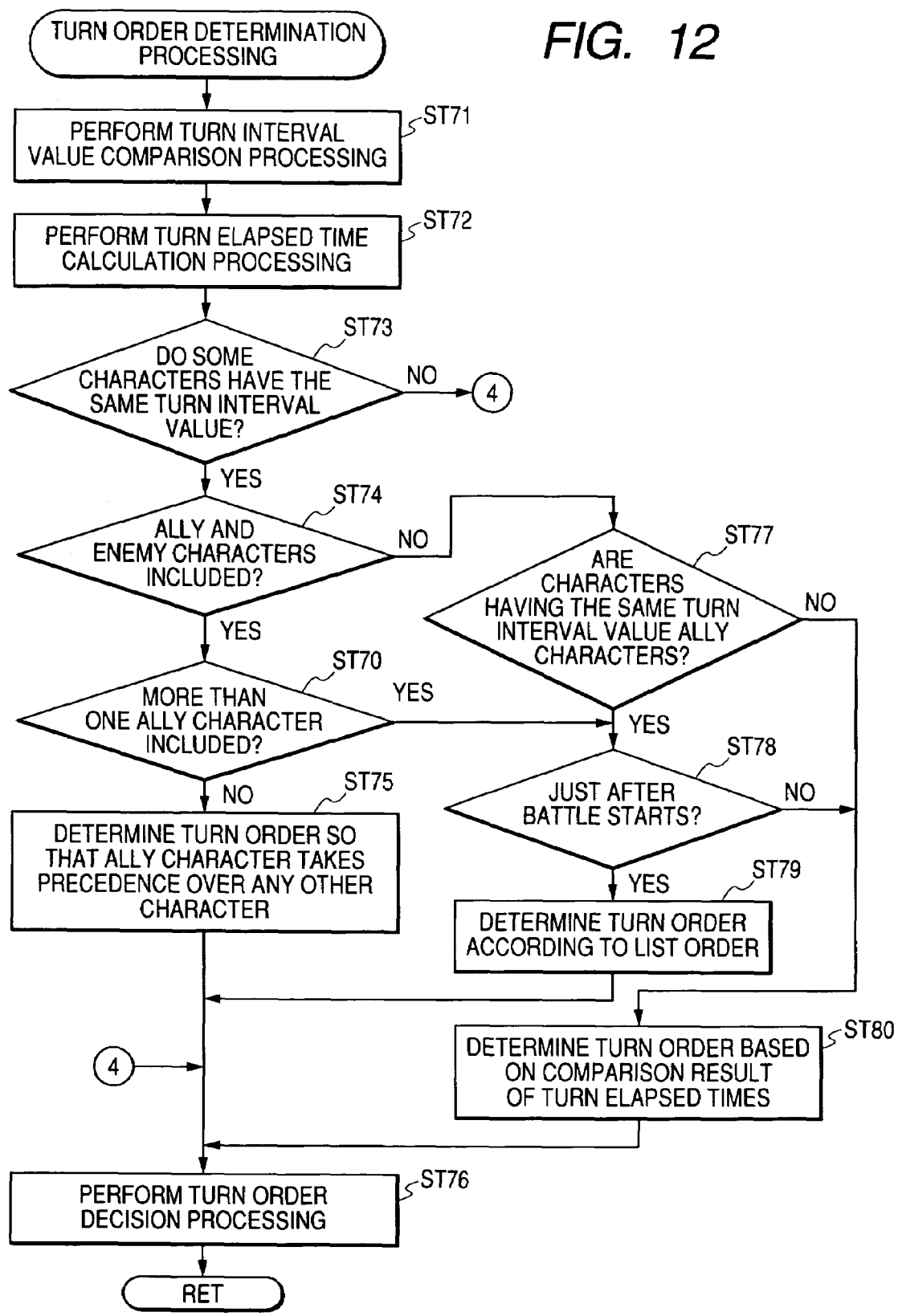
FIG. 12 is a flowchart to show a procedure of turn order determination processing.

As shown in FIG. 12, first, turn interval value comparison processing is executed (ST71). In the processing, the CPU 21 reads the turn interval values stored in the predetermined area of the RAM 23, and compares the turn interval values. The characters for which action command selection is made effective are set in the ascending order of the turn interval values. The CPU 21 for executing the processing corresponds to the execution order calculation section for calculating the execution order of actions of all characters. The execution order calculation section has the function of calculating the execution order of actions of all characters based on the skill parameters and the possessed item parameters stored by the character parameter storage section. Upon completion of the processing, the process proceeds to ST72.

At ST72, turn elapsed time calculation processing is executed. In the processing, the CPU 21 calculates the turn elapsed time, the elapsed time from execution of action in the preceding turn to the next turn coming around, for each character based on the comparison result at ST71. Upon completion of the processing, the process proceeds to ST73.

At ST73, whether or not some characters have the same turn interval value is determined. In the processing, the CPU 21 determines whether or not some characters have the same turn interval value based on the comparison result at ST71. At the determination time, the character type (ally or enemy character) does not matter. If the CPU 21 determines that some characters have the same turn interval value, the process proceeds to ST74. On the other hand, if the CPU 21 does not determine that some characters have the same turn interval value, the process proceeds to ST76.

At ST74, whether or not the characters having the same turn interval value include ally and enemy characters is determined. In the processing, the CPU 21 determines whether or not the characters determined to have the same turn interval value at ST73 include ally and enemy characters. If the CPU 21 determines that the characters include ally and enemy characters, the process proceeds to ST70. At ST70, whether or not the more than one ally characters have the same turn interval value is determined. If it is determined that more than one ally characters having the same turn interval value is included, the process proceeds to ST78; if it is not determined that more than one ally characters having the same turn interval value is included, the turn order is determined so that the ally character takes precedence over any other character (ST75), and the process proceeds to ST76. On the other hand, if the CPU 21 does not determine at ST74 that the characters include ally and enemy characters, the process proceeds to ST77.

At ST77, whether or not the characters having the same turn interval value are ally characters is determined. In the processing, the CPU 21 determines whether or not the characters determined to have the same turn interval value at ST73 are ally characters. If the CPU 21 determines that the characters having the same turn interval value are ally characters, the process proceeds to ST78. On the other hand, if the CPU 21 does not determine that the characters having the same turn interval value are ally characters, the CPU 21 compares the turn elapsed times calculated at ST72 and determines the turn order so that the character having the longer turn elapsed time takes precedence over any other character based on the comparison result (ST80), and the process proceeds to ST76.

At ST78, whether or not the timing is just after the battle starts is determined. In the processing, if the CPU 21 determines that the timing is just after the battle starts, the CPU 21 determines the turn order according to the list order (ST79), and the process proceeds to ST76. On the other hand, if the CPU 21 does not determine that the timing is just after the battle starts, the CPU 21 compares the turn elapsed times calculated at ST72 and determines the turn order so that the character having the longer turn elapsed time takes precedence over any other character based on the comparison result (ST80), and the process proceeds to ST76.

At ST76, turn order decision processing is executed. In the processing, the CPU 21 decides the turn order so that the characters take action in the ascending order of the turn interval values based on the comparison result at ST71, and stores the turn order in a predetermined area of the RAM 23. The CPU 21 selects the character for executing action based on the turn order and makes effective action command selection in the selected character.

A specific example will be discussed with FIGS. 13A to 13C. FIGS. 13A to 13C are schematic representations to show the turn interval values set for each character. FIGS. 13A to 13C show the turn interval values in a battle scene wherein the ally character A 111, the ally character B 112, the ally character C 113, and the ally character D 114 appear as the ally characters and the enemy character A 115, the enemy character B 116, and the enemy character C 117 appear as the enemy characters.

As described above, the turn interval value is calculated for each of the characters and is stored in the predetermined area of the RAM 23 as shown in FIGS. 13A. AA1 is stored as the first turn interval value in the ally character A 111. AB1 is stored as the first turn interval value in the ally character B 112. AC1 is stored as the first turn interval value in the ally character C 113. AD1 is stored as the first turn interval value in the ally character D 114. BA1, is stored as the first turn interval value in the enemy character A 115. BB1, is stored as the first turn interval value in the enemy character B 116. BC1, is stored as the first turn interval value in the enemy character C 117. AA2 is stored as the second turn interval value in the ally character A 111, as described above.

When the turn interval values set for the characters have the relation that AA1<AB1<BC1<BA1=AD1<BB1<AC1, action is executed in the following order: The ally character A 111 with the turn interval value AA1, the ally character B 112 with the turn interval value AB1, the enemy character C 117 with the turn interval value BC1, the ally character D 114 with the turn interval value AD1, the enemy character A 115 with the turn interval value BA1, the enemy character B 116 with the turn interval value BB1, and the ally character C 113 with the turn interval value AC1. An order image to execute action in this order is displayed on the screen 16.

When the action of the ally character A 111 is executed according to the order, the turn interval value is calculated based on the action type (execution command correction value) and is stored as shown in FIGS. 13B. AA2 is stored as the second turn interval value in the ally character A 111.

Subsequently, to determine the second character for executing action, the turn interval value AA2 is recognized as the second turn interval value and thus the turn interval values of the ally character B 112, the ally character C 113, the ally character D 114, the enemy character A 115, the enemy character B 116, and the enemy character C 117 are compared. Since AB1 is the minimum, the ally character B 112 is selected. Accordingly, the second action in the ally character A 111 is not executed before all other characters execute action. When the action of the ally character B 112 is executed, the turn interval value is calculated based on the action type and is stored as shown in FIGS. 13A. AB2 is stored as the second turn interval value in the ally character B 112. A comparison is also made between AA2 and AB2, the next action execution order is determined, and the turn order responsive to the order is displayed.

As such processing is repeated, after action of the ally character C 113 with the maximum turn interval value is executed, it is recognized that action of all characters terminates, and all turn interval values indicating the second action are compared.

When the characters having the same turn interval value exist, the CPU 21 decides the turn order based on the turn order determined at any of ST75, ST79, or ST80 and stores the turn order in the predetermined area of the RAM 23. Since the turn order is stored in the predetermined area of the RAM 23 at ST36, action command selection is not made effective for any character already executing action until all other characters execute action. Upon completion of the processing, the subroutine is exited.

Command Processing

The "command processing" will be discussed with FIG. 14.

Figure 14:
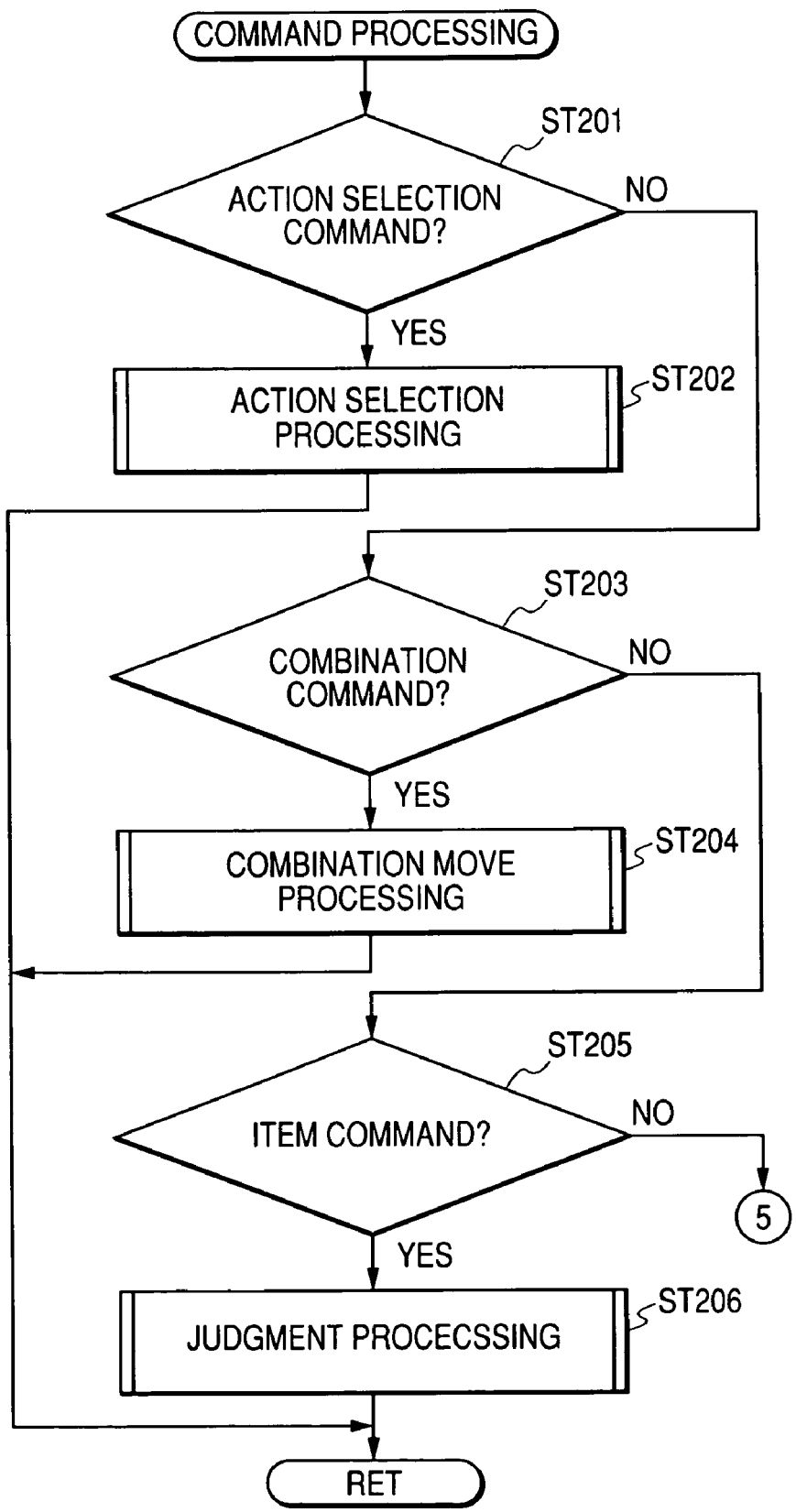
FIG. 14 is a flowchart to show a procedure of command processing.

As shown in FIG. 14, first, whether or not the command is an ACTION SELECTION command is determined (ST201). In the processing, the CPU 21 determines whether or not the command is an ACTION SELECTION command in response to an input signal, etc., from the controller 4. The ACTION SELECTION command mentioned here includes the above-described ATTACK command and a spell command and also contains a SPECIAL TECHNIQUE command such as a FUSION command. If the CPU 21 determines that the command is an ACTION SELECTION command, the CPU 21 executes "action selection processing" of physical attack, spell, specific technique, etc., (ST202) and exits the subroutine. The "action selection processing" is described later in detail. On the other hand, if the CPU 21 does not determine that the command is an ACTION SELECTION command, the process proceeds to ST203.

At ST203, whether or not the command is a COMBINATION SELECTION command is determined. In the processing, the CPU 21 determines whether or not the command is a COMBINATION SELECTION command in response to an input signal, etc., from the controller 4. If the CPU 21 determines that the command is a COMBINATION SELECTION command, the CPU 21 executes "combination move processing" of moving a character to make combination attack (ST204) and exits the subroutine. The "combination move processing" is described later in detail. On the other hand, if the CPU 21 does not determine that the command is a COMBINATION SELECTION command, the process proceeds to ST205.

At ST205, whether or not the command is an ITEM command is determined. In the processing, the CPU 21 determines whether or not the command is an ITEM command in response to an input signal, etc., from the controller 4. If the CPU 21 determines that the command is an ITEM command, the process proceeds to ST206. On the other hand, if the CPU 21 does not determine that the command is an ITEM command, the process proceeds to ST207 in FIG. 15.

At ST206, "judgment processing" is executed. In the processing, the CPU 21 determines the action type and executes action responsive to the determined action type. The "judgment processing" is described later in detail. Upon completion of the processing, the subroutine is exited.

Figure 15:
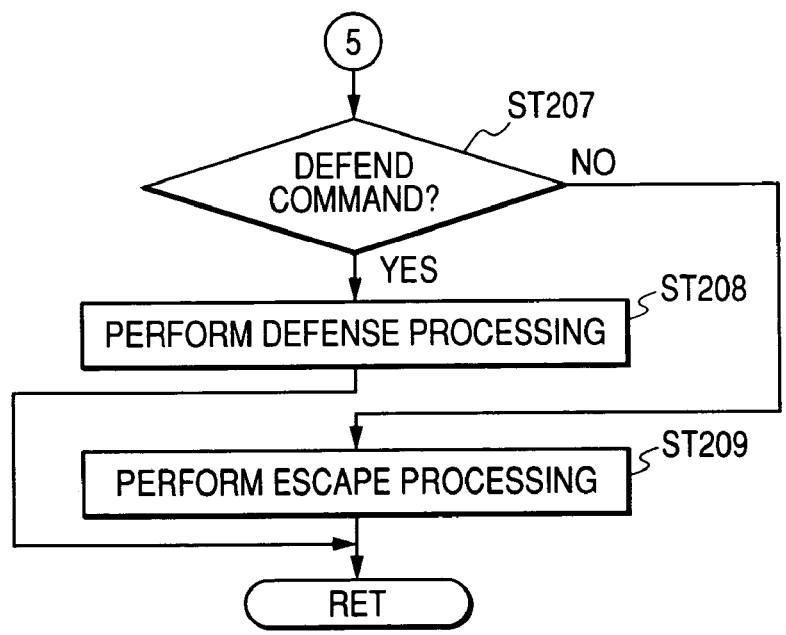
FIG. 15 is a flowchart following FIG. 14.

Subsequently, at ST207 in FIG. 15, the CPU 21 determines whether or not the command is a DEFEND command. If the CPU 21 determines that the command is a DEFEND command, the CPU 21 executes defense processing (ST208) and exits the subroutine. On the other hand, if the CPU 21 does not determine that the command is a DEFEND command, the CPU 21 executes escape processing (ST209). Upon completion of the processing, the subroutine is exited.

Combination Move Processing

Figure 17:
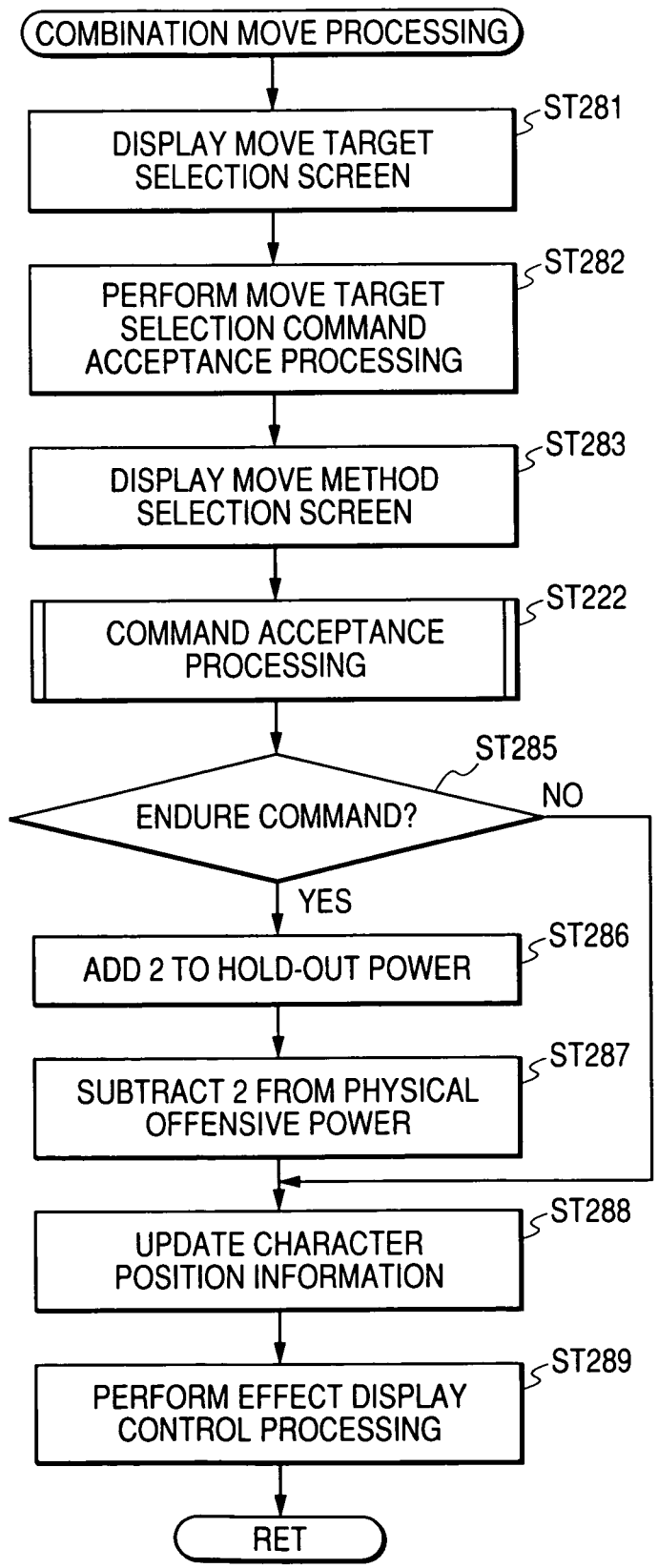
FIG. 17 is a flowchart to show a procedure of combination move processing.

The "combination move processing" will be discussed with FIG. 17.

Figure 18:
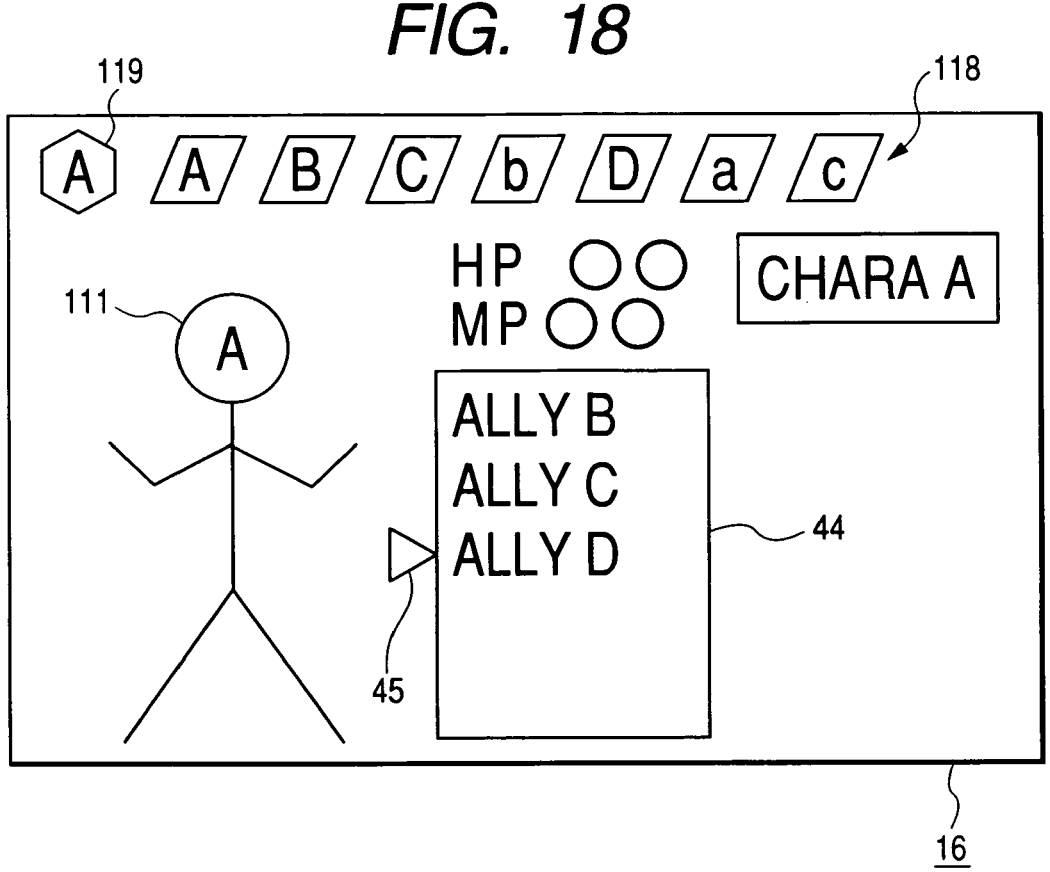
FIG. 18 is a drawing to show a move target selection screen.

The "combination move" is action to make the later combination attack. As shown in FIG. 17, first, move target selection screen display processing is executed (ST281). In the processing, the CPU 21 displays a move target selection screen as shown in FIG. 18. Upon completion of the processing, the process proceeds to ST282.

At ST282, move target selection command acceptance processing is executed. In the processing, the CPU 21 determines the move target in response to an entry operation signal supplied from the controller 4. For example, when an entry operation signal for selecting the ally character D is supplied from the controller 4 as shown in FIG. 18, the CPU 21 determines action for moving to the proximity of the ally character D 114, specifically the combination attack effective range 120 (within 1 m in diameter with the ally character D as the center), and stores the action in a predetermined area of the RAM 23. Upon completion of the processing, the process proceeds to ST283.

Figure 19:
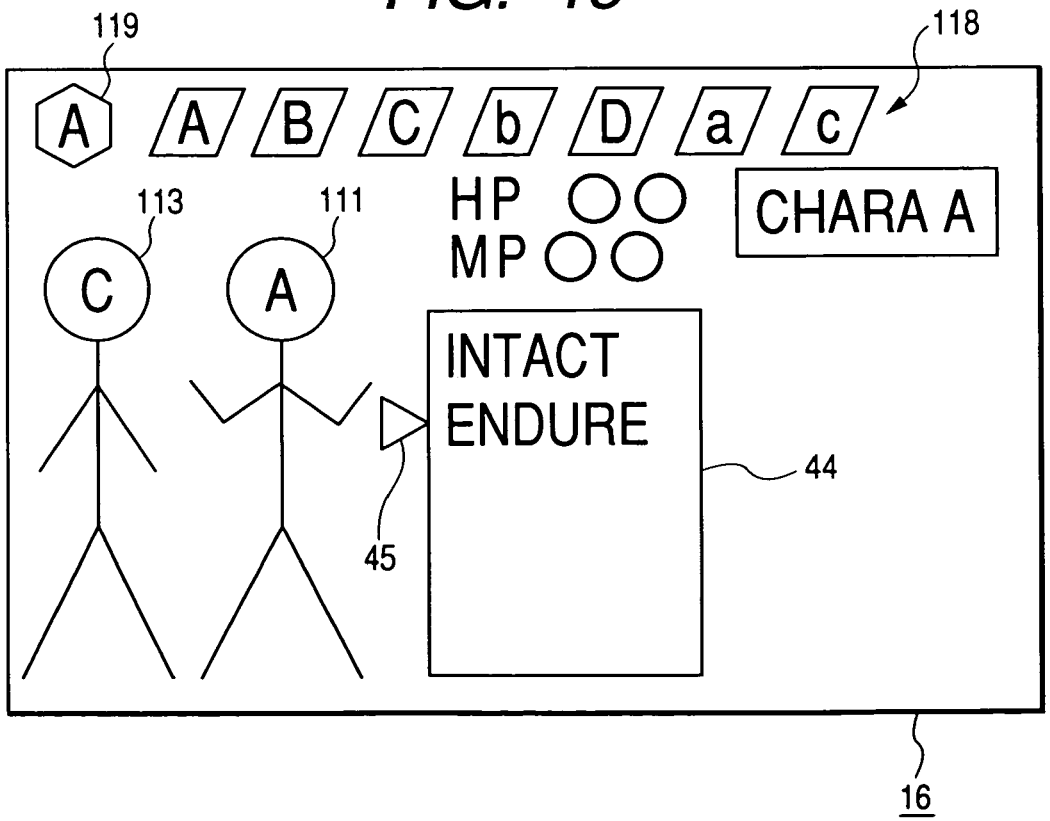
FIG. 19 is a drawing to show a move method selection screen.

At ST283, move method selection screen display processing is executed (ST283). In the processing, the CPU 21 displays a move method selection screen as shown in FIG. 19. Upon completion of the processing, the process proceeds to ST222.

At ST222, "command acceptance processing" is executed. In the processing, the CPU 21 determines the move method in response to an entry operation signal supplied from the controller 4. For example, when an entry operation signal for selecting ENDURE is supplied from the controller 4 as shown in FIG. 19, the CPU 21 determines action as ENDURE move method after move, and stores the action in a predetermined area of the RAM 23. The "command acceptance processing" is described later in detail. Upon completion of the processing, the process is returned to ST285.

At ST285, whether or not the command is an ENDURE command is determined. In the processing, if the CPU 21 determines at ST285 that the command is an ENDURE command, the process proceeds to ST286. On the other hand, if the CPU 21 does not determine at ST285 that the command is an ENDURE command, the process proceeds to ST288.

At ST286, value "2" is added to hold-out power. In the processing, the CPU 21 reads the hold-out power stored in a predetermined area of the RAM 23 and then adds 2 to the read hold-out power and stores the result as the hold-out power, thereby incrementing the hold-out power by 2 for update. Upon completion of ST286, the process proceeds to ST287.

At ST287, value "2" is subtracted from the physical attack power. In the processing, the CPU 21 reads the physical attack power stored in a predetermined area of the RAM 23 and then subtracts 2 from the read physical attack power and stores the result as the physical attack power, thereby decrementing the physical attack power by 2 for update. Upon completion of ST287, the process proceeds to ST288.

Figures 20, 21:
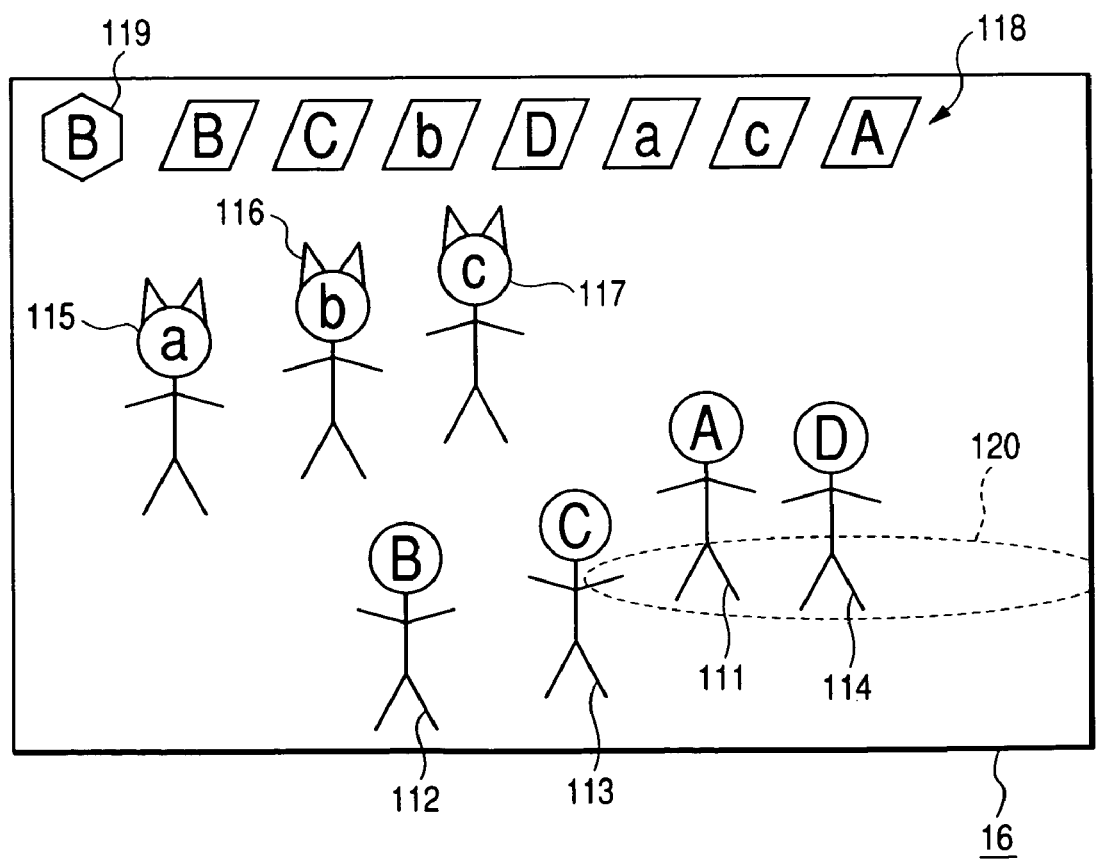
FIG. 20 is a drawing to show move information.
FIG. 21 is a drawing to show an effect image for moving each character.

At ST288, character position information is updated. In the processing, the CPU 21 updates and stores position information set for each character as shown in FIG. 20 in response to the move target determined at ST282. The position information in FIG. 20 is indicated by the three position coordinates of X, Y, and Z. This means that the position information is stored as three-dimensional information. Upon completion of ST288, the process proceeds to ST289.

At ST289, effect image display processing is executed. In the processing, the CPU 21 displays an effect image for moving the characters on the screen 16 as shown in FIG. 21 in response to the move target and the move method determined at ST282 and ST222. Upon completion of the processing, the subroutine is exited.

In the embodiment, the position information of only the ally character for which the move action command is selected is updated and stored, thereby producing display so as to move only the ally character for which the move action command is selected, but another action may be adopted. For example, the position information of all ally characters may be updated and stored so as to move to the proximity of the move target character, thereby producing display so as to move all ally characters.

Screen Display Description in Combination Move Processing

The screens provided on the screen 16 as the "combination move processing" is thus executed will be discussed with FIGS. 18, 19, and 21 to 26. A description is given by taking a "battle scene" wherein the four ally characters (111 to 114) and the three enemy characters (115 to 117) appear as an example.

Figure 22:
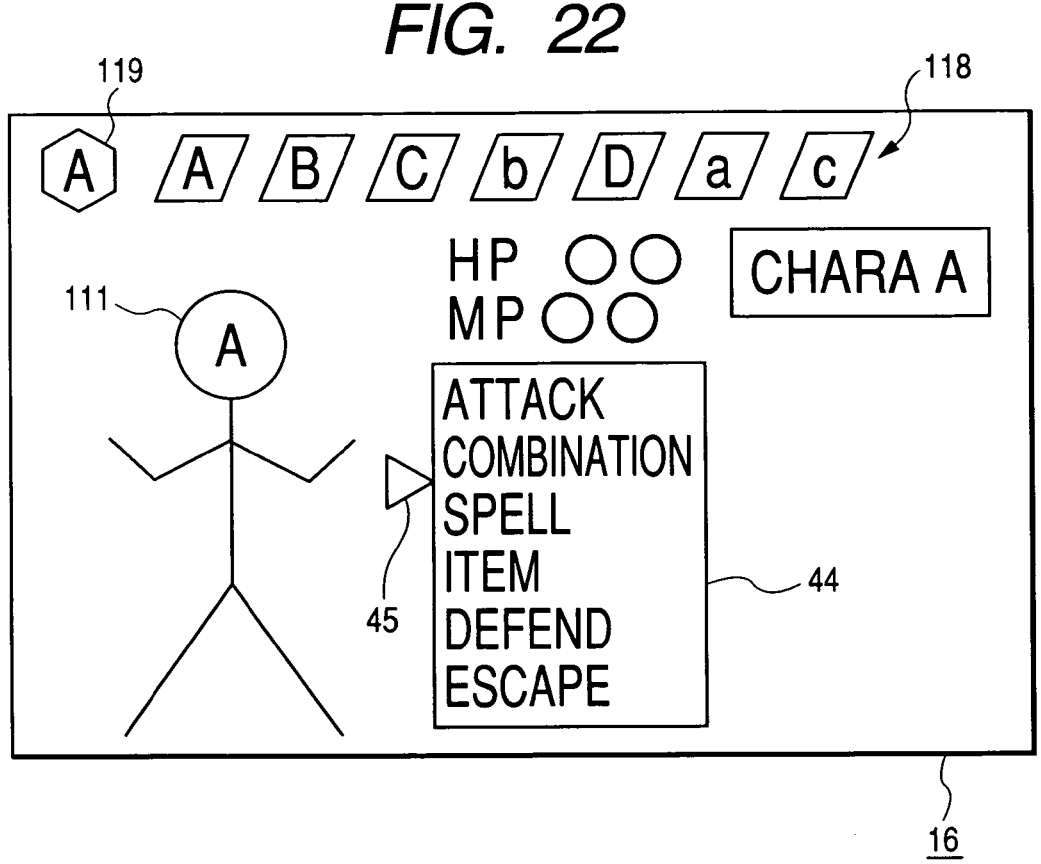
FIG. 22 is a drawing to show an action selection screen.
Figure 23:
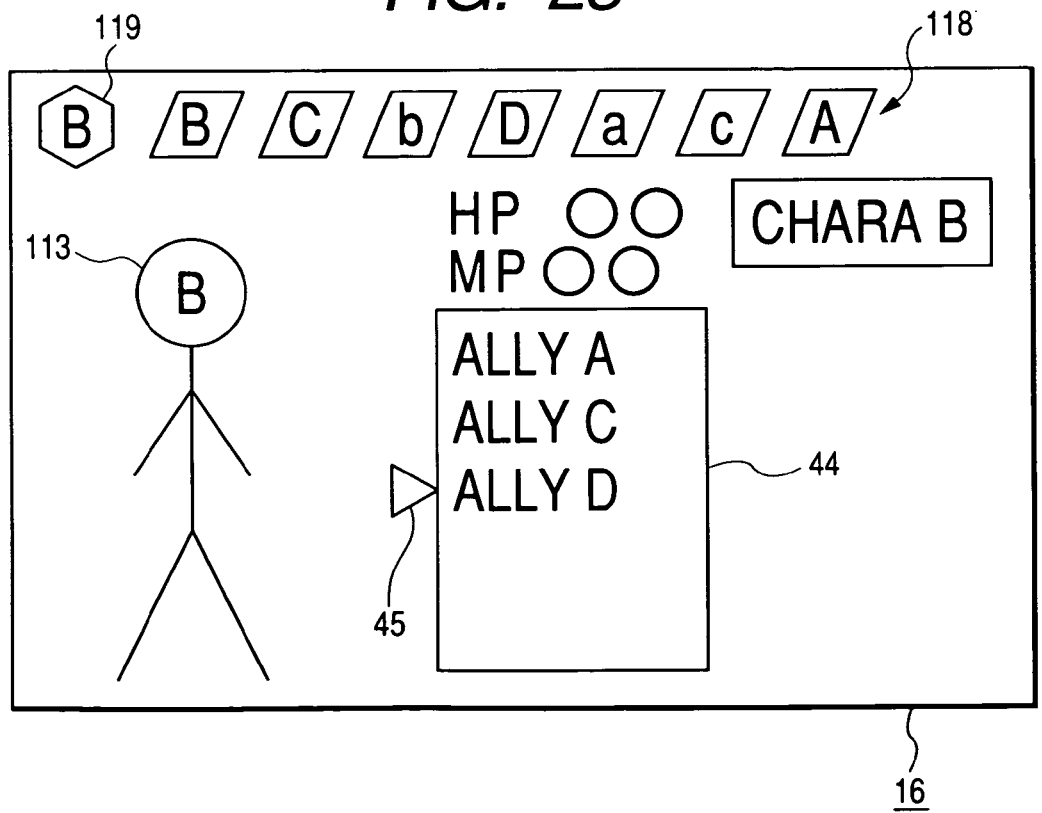
FIG. 23 is a drawing to show a move target selection screen.
Figure 24:
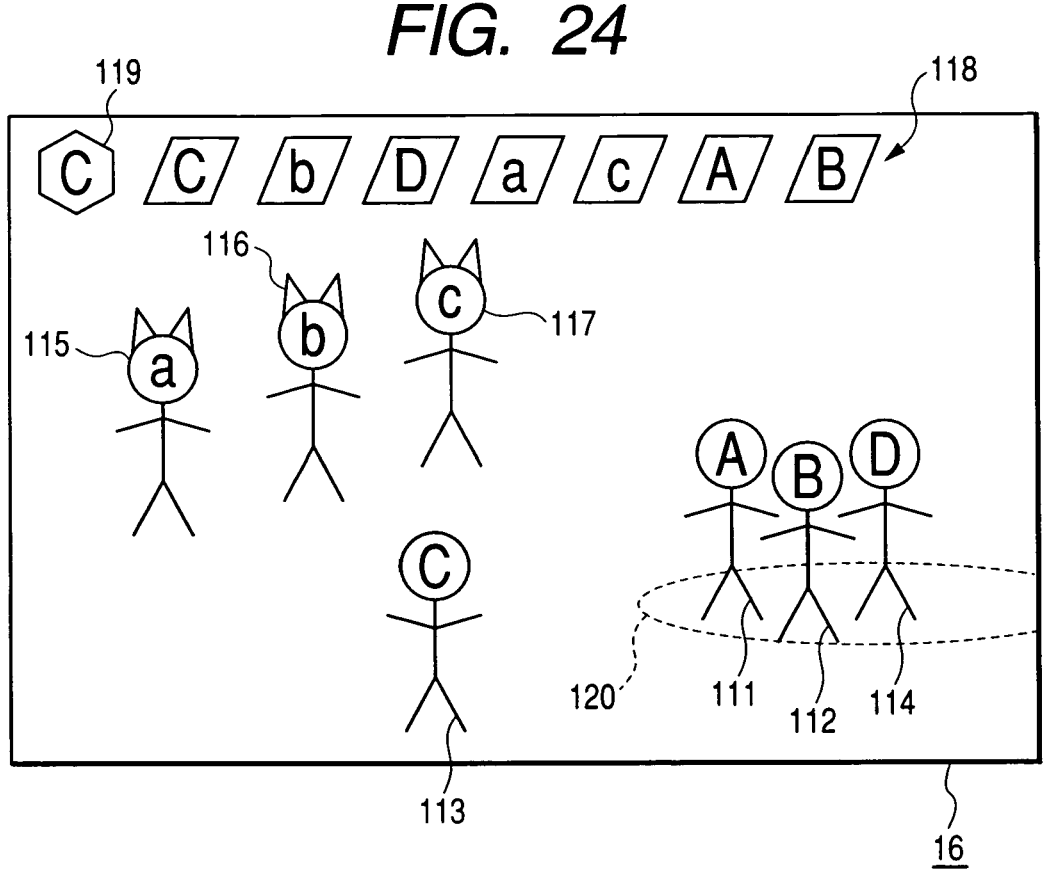
FIG. 24 is a drawing to show an effect image for moving each character.
Figure 25:
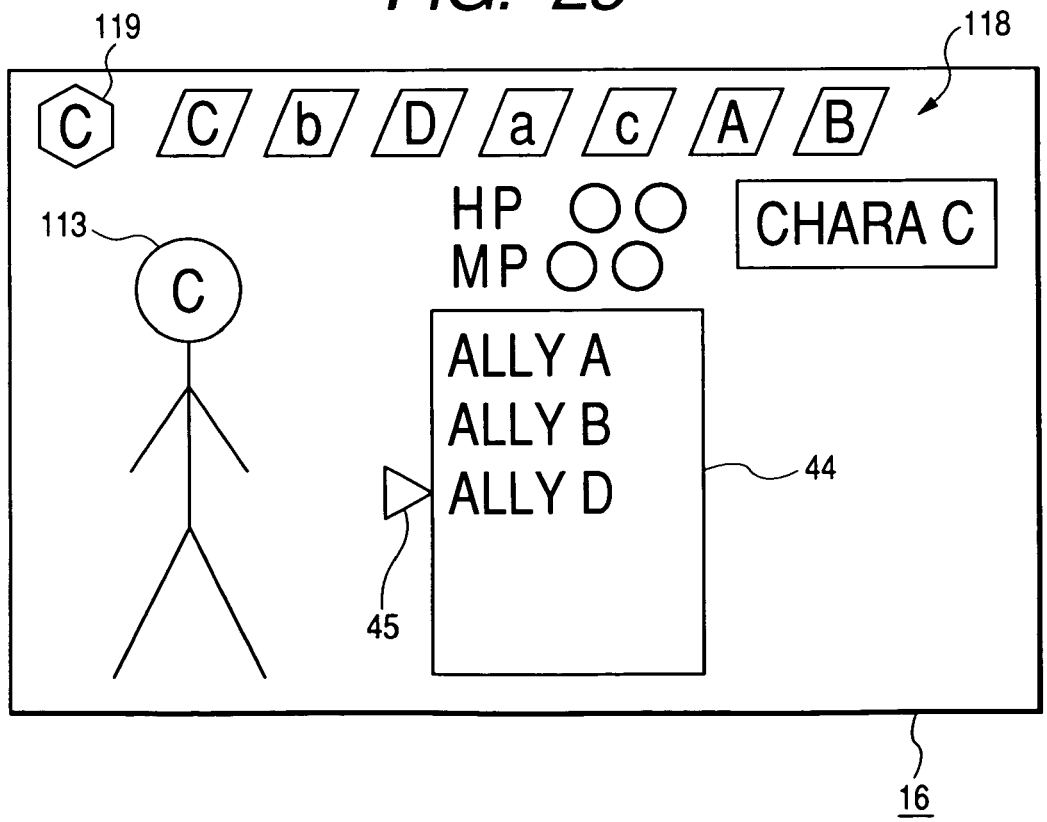
FIG. 25 is a drawing to show a move target selection screen.
Figure 26:
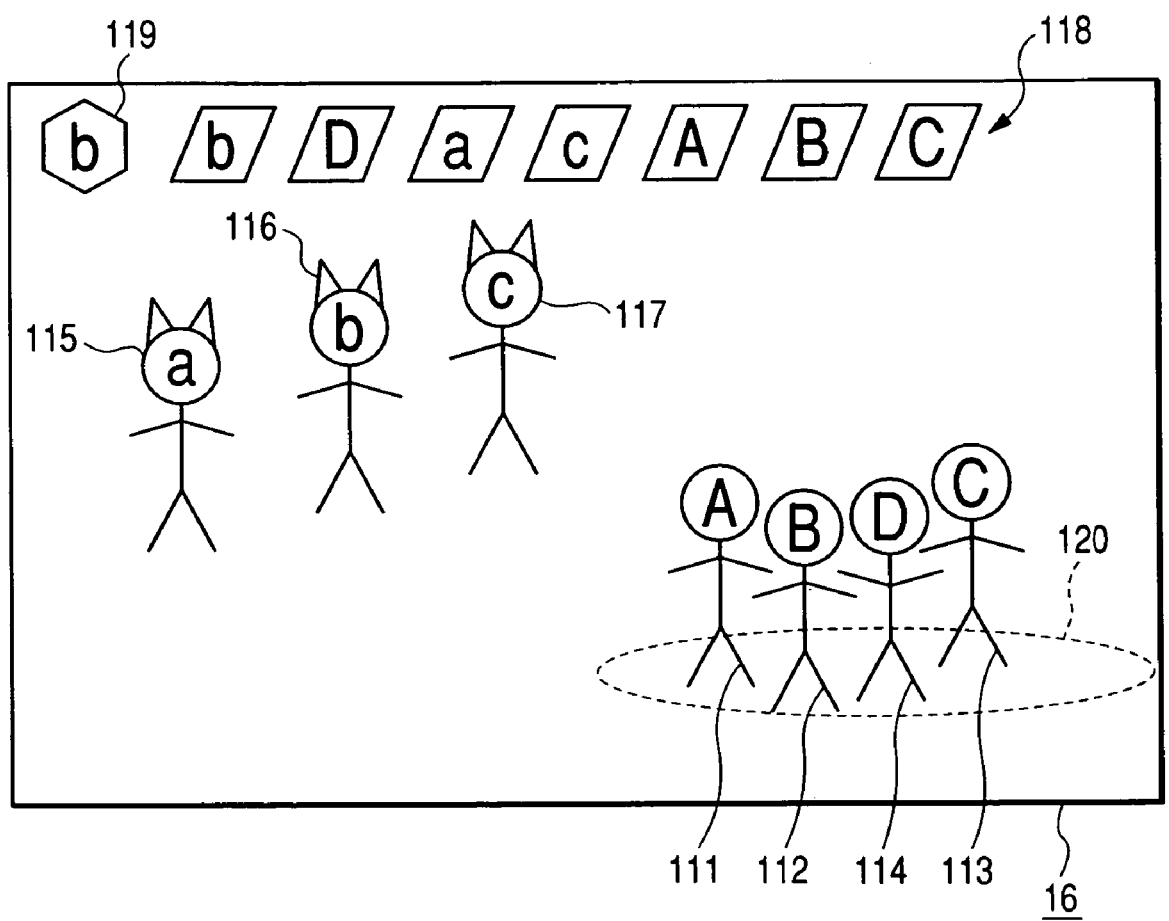
FIG. 26 is a drawing to show an effect image for moving each character.

As shown in FIG. 22, an action command selection screen for the ally character A 111 is displayed. When the player selects a COMBINATION command by the controller 4, the move method is determined and the move target selection screen shown in FIG. 18 is displayed. Subsequently, when the player selects a CHARACTER D command by the controller 4 on the move target selection screen, the move target is determined and the move method selection screen shown in FIG. 19 is displayed. When the player selects an ENDURE command by the controller 4 on the move method selection screen, the ally character A 111 is displayed so as to move to the proximity of the ally character D 114, specifically the combination attack effective range 120 (within 1 m in diameter with the ally character D as the center), as shown in FIG. 21. The ally character B 112 is also displayed so as to move to the inside of the combination attack effective range 120 with the ally character D 114 as the center as shown in FIG. 24 based on command operation in COMBINATION shown in FIG. 23. Further, the ally character C 113 is also displayed so as to move to the inside of the combination attack effective range 120 with the ally character D 114 as the center as shown in FIG. 26 based on command operation in COMBINATION shown in FIG. 25. Thus, the ally character A 111, the ally character B 112, and the ally character C 113 are displayed so as to move to the inside of the combination attack effective range 120 with the ally character D 114 as the center.

Judgment Processing

The "judgment processing" will be discussed with FIG. 27.

To begin with, the CPU 21 displays an action selection screen as shown in FIG. 16 on the screen 16 (ST221) and executes "command acceptance processing" (ST222). In the processing, the CPU 21 determines the action to be executed in response to an entry operation signal supplied from the controller 4. Specifically, the type of attack, spell, or specific technique is determined. For example, when the player selects an ACTION SELECTION command, the type of hit is determined. The type of hit is soft hit, normal hit, hard hit, etc. The CPU 21 also displays the temporary turn order corresponding to the selected command. That is, the turn order when the selected command is executed is forecasted and is displayed. The "command acceptance processing" is described later in detail. Upon completion of the processing, the process proceeds to ST223.

Figure 28:
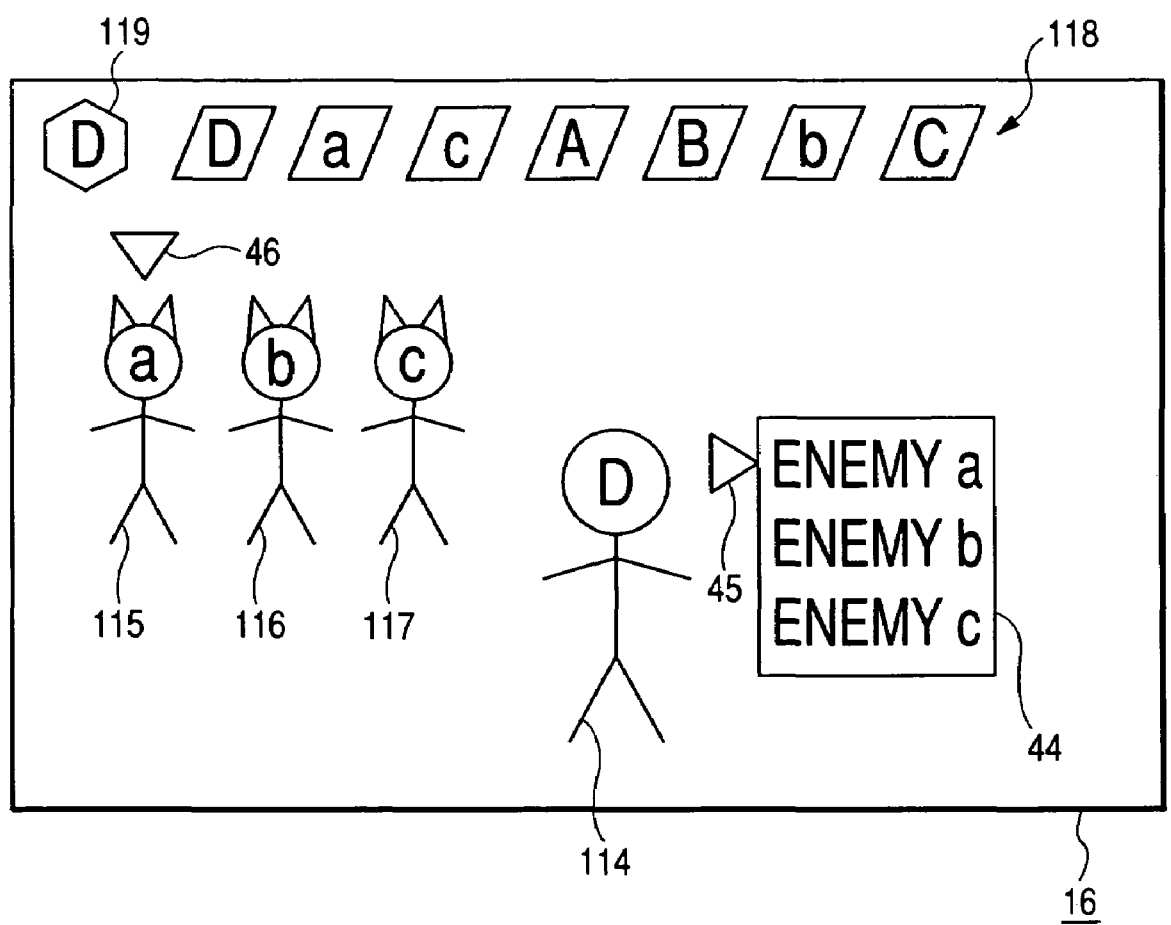
FIG. 28 is a drawing to show an action target selection screen.

At ST223, the CPU 21 displays an action target selection screen as shown in FIG. 28 on the screen 16 (ST223), and executes action target selection command acceptance processing (ST224). In the processing, the CPU 21 determines the character (target character) to which the action taken based on the selected command at ST222 (attack, use of attack spell, use of recovery spell, use of specific technique, use of item, etc.,) is applied in response to an entry operation signal supplied from the controller 4, and stores the target character in a predetermined area of the RAM 23.

In the processing, "attack target range display processing" described later is called, and the attack target range and the attack target character are displayed. The target character is selected as follows: A selection mark 46 displayed on the action target selection screen is moved as the player operates the up button 7 or the down button 8 of the controller. When the player operates the O button 12, the character with the selection mark 46 displayed above the head is determined to be the target character. The above-described character position information indicates the center of the character and is also used for control concerning the attack target range. The position information indicating the center of the character may be used, but may be formed so as to indicate the occupation range of the character. For example, when the occupation range of the character is within the attack target range, the character may be adopted as the attack target character. FIG. 28 shows the case where the selection mark 46 is displayed above the head of the enemy character A 115 and the enemy character A 115 is determined to be the target character. The CPU 21 for executing the processing corresponds to reference character determination section for determining the reference character used as the attack range reference to the attack selected in response to player's entry operation through the operation unit. Upon completion of the processing, the process proceeds to ST225.

At ST225, "judgment ring determination processing" is executed. In the processing, the CPU 21 determines the display mode of a judgment ring 100 (FIG. 30) and a rotation bar 101 in response to the skills concerning the character for taking action. The "judgment ring determination processing" is described later in detail. When the processing is exited, the process is returned to ST226.

At ST226, "judgment ring decision processing" is executed. In the processing, the CPU 21 determines the action of attack, etc., in response to player's entry operation through the controller 4. The "judgment ring decision processing" is described later in detail. When the processing is exited, the process is returned to ST227.

At ST227, "consecutive attack set processing" is executed. In the processing, the CPU 21 increases the effect on the action of the attack, etc., if a consecutive attack condition is satisfied. The "consecutive attack set processing" is described later in detail. When the processing is exited, the process is returned to ST228.

At ST228, HP, MP, and SP are updated. In the processing, the CPU 21 updates the values of HP, MP, and SP based on the damage amount or the recovery value calculated in the "judgment ring decision processing," "consecutive attack set processing." Here, HP and MP are incremented or decremented and SP is decremented in response to the damage amount, the recovery value, etc. SP is decremented by one each time ST228 is executed. That is, it is decremented by one every turn of the character. Upon completion of the processing, the process proceeds to ST229.

The SP decrement value may be determined in response to the damage amount, the recovery value, etc. For example, a value proportional to the damage amount, the recovery value, etc., (for example, the value of one-tenth of the damage amount, the recovery value, etc.,) is determined to be the SP decrement value.

The time interval between the instant at which command selection becomes effective and the instant at which the judgment ring 100 (FIG. 30) is displayed (the number of seconds) may be determined to be the SP decrement value. In this case, the time required for command selection of the player is set as the SP decrement value. Thus, if command selection of the player is rapid, the SP decrement value may be small, but it takes time in selecting a command, the value as much as the taken time is subtracted from the SP.

At ST229, whether or not a parameter update condition based on a special item or a special technique is satisfied is determined. In the processing, when a special item was used or a special technique was executed at ST222, ST224, ST225, ST226, the CPU 21 determines whether or not the parameter update condition based on the special item or the special technique is satisfied. When a special item was used or a special technique was executed at ST222, ST224, ST225, ST226, when the effect of the used special item or the executed special technique becomes ineffective, the CPU 21 also determines whether or not the parameter update condition based on the special item or the special technique is satisfied. If the CPU 21 determines that the parameter update condition based on the special item or the special technique is satisfied, the process proceeds to ST230. On the other hand, if the CPU 21 does not determine that the parameter update condition based on the special item or the special technique is satisfied, the process proceeds to ST231.

At ST230, the individual skill parameters of AGL, LUC, etc., are updated. In the processing, the CPU 21 updates and stores the individual skill parameters of AGL, LUC, etc., based on the used special item or the executed special technique at ST222, ST224, ST225, ST226. When a special item was used or a special technique was executed at ST222, ST224, ST225, ST226, when the effect of the used special item or the executed special technique becomes ineffective, the CPU 21 also updates and stores the individual skill parameters of AGL, LUC, etc., based on the special item or the special technique. Upon completion of the processing, the process proceeds to ST231.

At ST231, the status is updated. In the processing, the CPU 21 updates the status of the character in response to the action executed according to the "judgment ring decision processing." In the update processing, when the status of the character is updated to the "abnormal status," the character enters the abnormal status different from a normal status. The "abnormal status" varies depending on the type of attack item, spell, etc. For example, "poison" abnormal status is an abnormal status in which the physical strength of the character is automatically decreased every turn for the main character to take action upon reception of spell from the enemy or upon reception of attack of a predetermined item. "petrifaction" abnormal status is an abnormal status in which the character is fixed like a stone and it becomes impossible to enter a command upon reception of spell from the enemy or upon reception of attack of a predetermined item. Upon completion of the processing, the process proceeds to ST232.

At ST232, effect image display processing is executed. In the processing, the CPU 21 displays an effect image to take predetermined action (attack, working spell, executing a special technique, using an item, etc.,) in characters in response to the action executed according to the "judgment ring decision processing." The CPU 21 also displays a parameter image of HP, MP, SP, etc., on the screen 16 based on the updated parameters. Upon completion of the processing, the subroutine is exited.

Command Acceptance Processing

The "command acceptance processing" will be discussed with FIG. 29.

Figure 29:
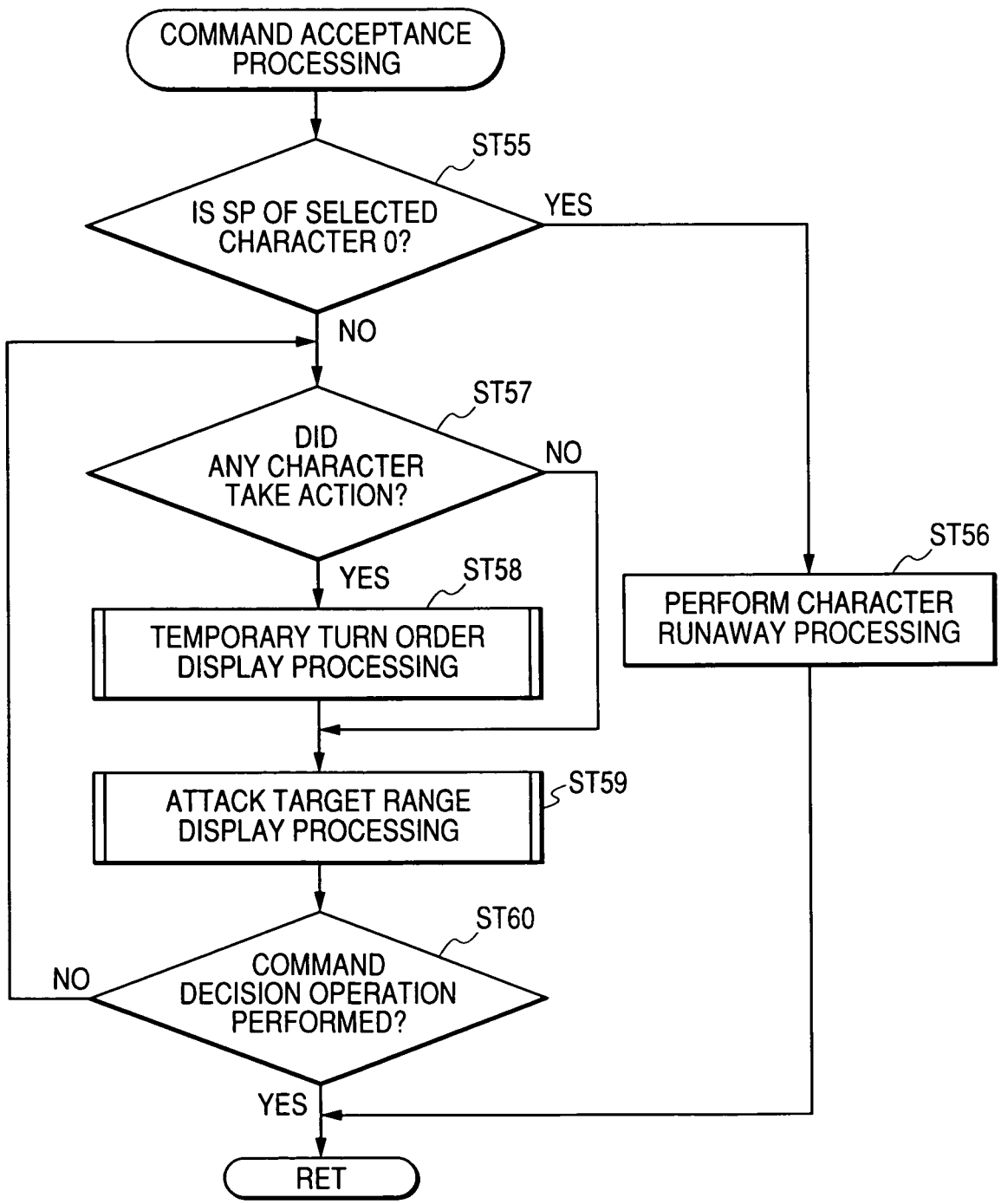
FIG. 29 is a flowchart to show a procedure of command acceptance processing.

As shown in FIG. 29, first, whether or not the SP of the selected character is 0 is determined (ST55). In the processing, when the character for which command selection is made effective is an ally character in the "turn order processing," the CPU 21 determines whether or not the SP of the ally character is 0. If the CPU 21 determines that the SP of the selected character is 0, the process proceeds to ST56. On the other hand, if the CPU 21 does not determine that the SP of the selected character is 0, the process proceeds to ST57.

At ST56, character runaway processing is executed. In the processing, the CPU 21 selects the type of command for determining the type of action (attack, use of attack spell, use of recovery spell, etc.,) at random. The CPU 21 selects a character to which the action is applied at random regardless of whether the character is an enemy or an ally. That is, the command operation for the selected ally character becomes ineffective and action is selected at random regardless of whether the character is an enemy or an ally. Upon completion of the processing, the subroutine is exited.

In the embodiment, once the runaway state is entered, no commands are accepted; however, only some commands may be accepted on a predetermined condition. For example, although only the ITEM command is accepted, which character the selected "item" is to be used for is unknown or one FIGHT command is accepted every three turns. The main character runs away when SP=0 and the character may be restored to the normal state after the expiration of a time interval rather than continuing to run away.

At ST57, whether or not any character took action is determined. In the processing, if the CPU 21 determines that any character took action, the process proceeds to ST58. On the other hand, if the CPU 21 does not determine that any character took action, the process proceeds to ST59.

At ST58, "temporary turn order display processing" is executed. In the processing, the CPU 21 displays the temporary turn order responsive to the selected command on the screen 16. The "temporary turn order display processing" is described later in detail. When the processing is exited, the process is returned to ST59.

At ST59, "attack target range display processing" is executed. In the processing, the CPU 21 displays the attack target range responsive to the selected command on the screen 16. The "attack target range display processing" is described later in detail. When the processing is exited, the process is returned to ST60.

At ST60, whether or not command decision operation is performed is determined. In the processing, if the CPU 21 determines that the player performs command decision operation in response to an entry operation signal supplied from the controller 4, the subroutine is exited. On the other hand, if the CPU 21 does not determine that the player performs command decision operation in response to an entry operation signal supplied from the controller 4, the process again goes to ST57.

Temporary Turn Order Display Processing

The "temporary turn order display processing" will be discussed with FIG. 81.

Figure 81:
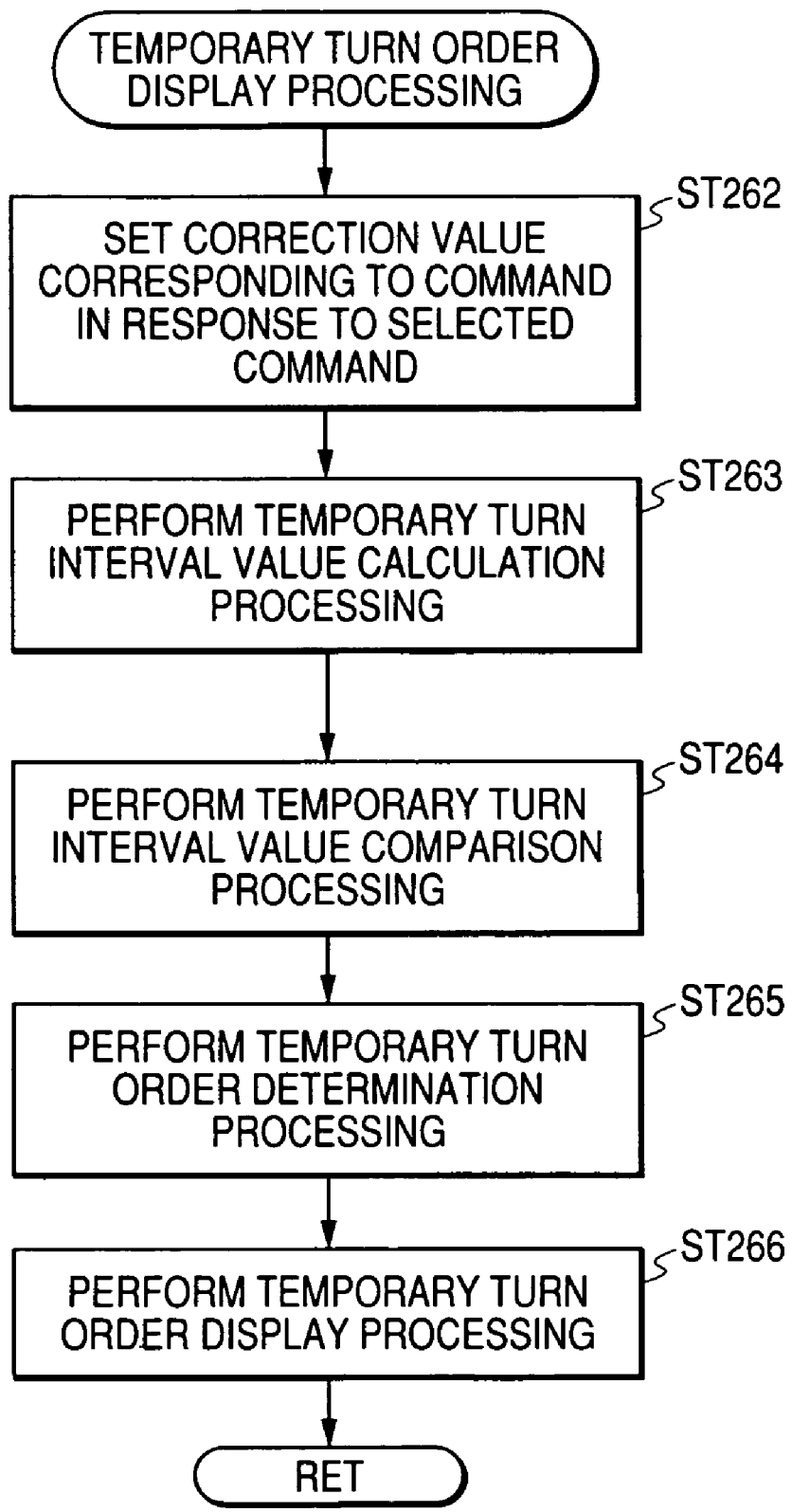
FIG. 81 is a flowchart to show a procedure of temporary turn order display processing.

As shown in FIG. 81, first, the execution command correction value is set in response to the selected command (ST262). In the processing, the CPU 21 reads the execution command correction value in execution of the selected command is executed from the DVD-ROM 31 or the predetermined area of the RAM 23 into which the execution command correction value is loaded from the DVD-ROM 31 for storage. Upon completion of the processing, the process proceeds to ST263.

At ST263, temporary turn interval value calculation processing is executed. In the processing, the CPU 21 calculates the turn interval value in execution of the selected command as the temporary turn interval value based on the execution command correction value, etc., read at ST262. Upon completion of the processing, the process proceeds to ST264.

At ST264, temporary turn interval value comparison processing is executed. In the processing, the CPU 21 compares the turn interval values in execution of the selected command based on the temporary turn interval value calculated at ST263. The turn interval values are compared between the characters already taking action in the same turn. Upon completion of the processing, the process proceeds to ST265.

At ST265, temporary turn order determination processing is executed. In the processing, the CPU 21 stores the turn order in execution of the selected command in a predetermined area of the RAM 23 as the temporary turn order based on the comparison result at ST264. The CPU 21 for executing ST264 and ST265 corresponds to execution order temporary calculation section for temporarily calculating the action execution order in all characters in response to the selected (specified) command. Upon completion of the processing, the process proceeds to ST266.

Figure 84:
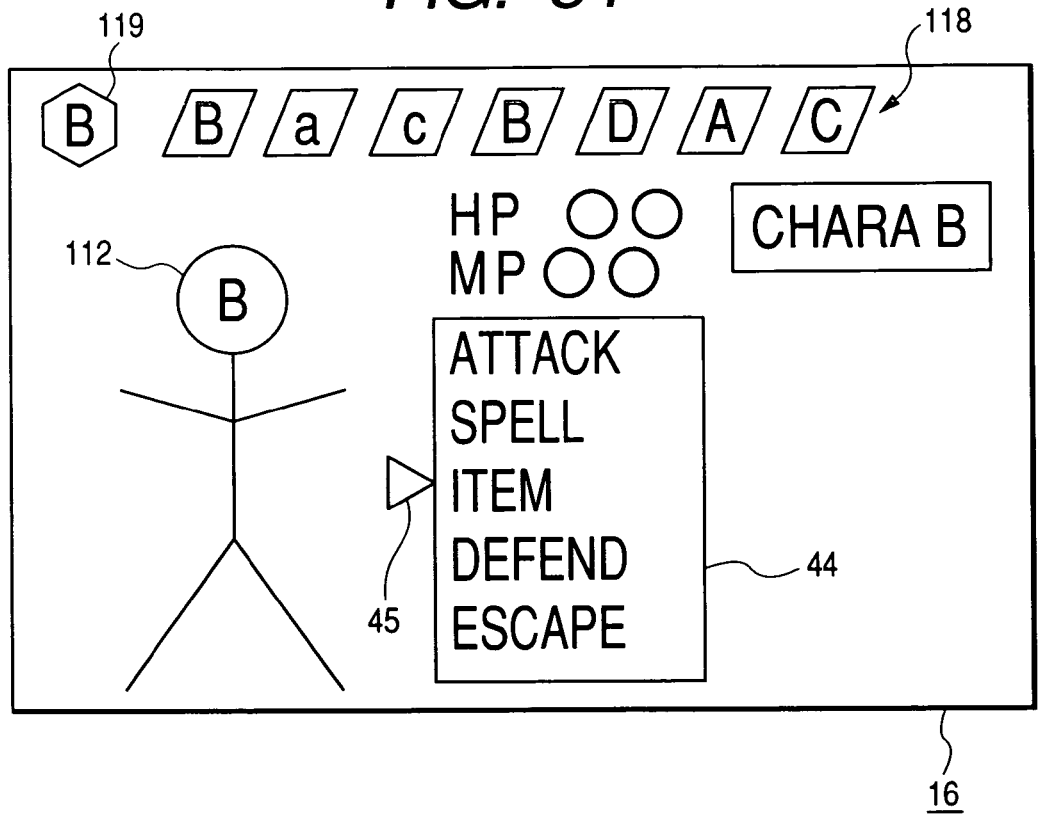
FIG. 84 is a drawing to show an action selection screen.
Figure 85:
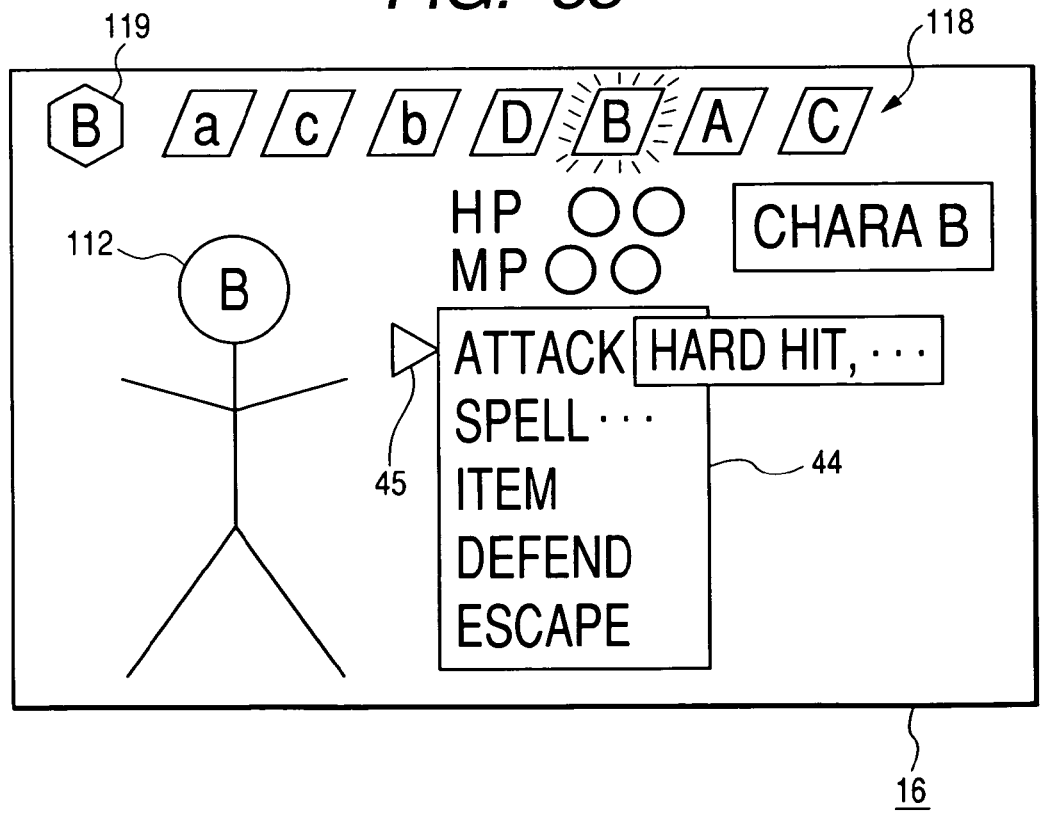
FIG. 85 is a drawing to show an action selection screen.
Figure 86:
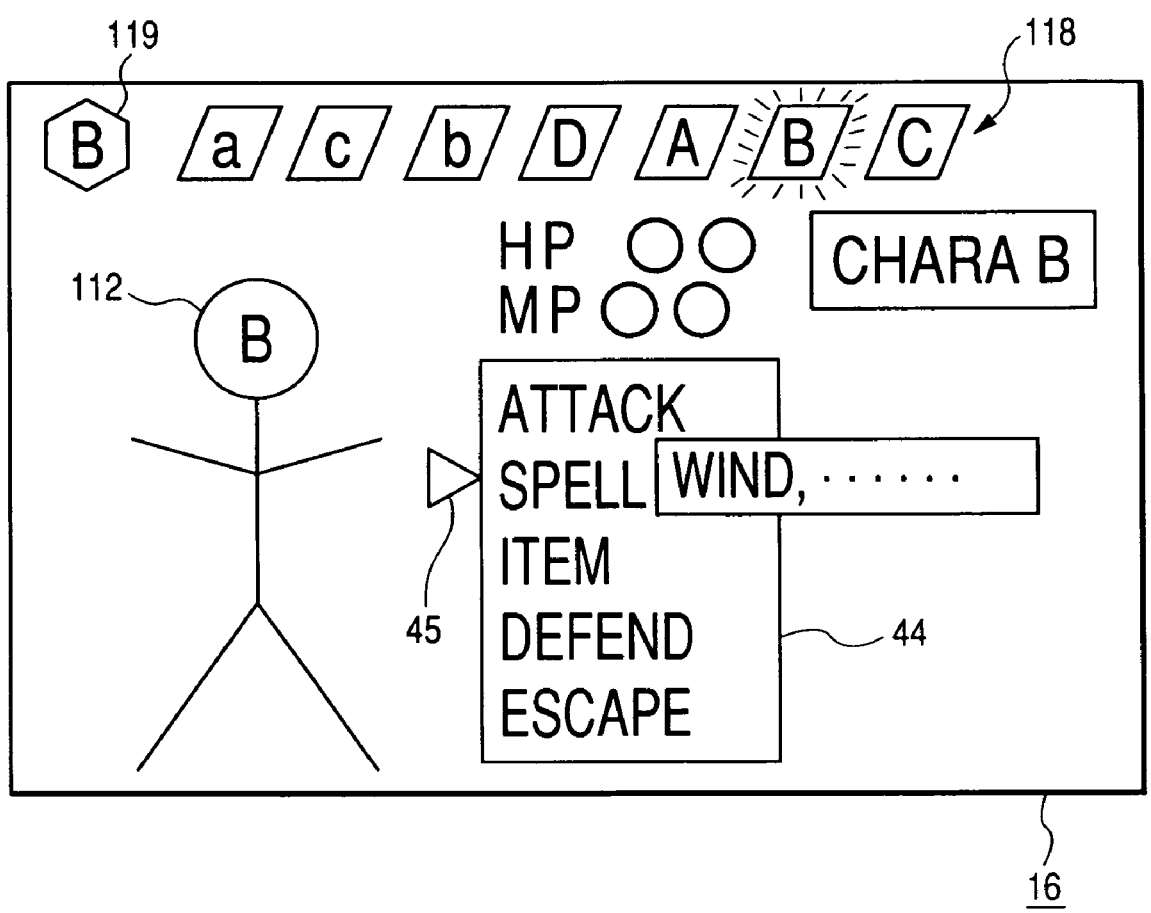
FIG. 86 is a drawing to show an action selection screen.

At ST266, temporary turn order display processing is executed. In the processing, the CPU 21 displays an image based on the turn order stored in the predetermined area of the RAM 23 at ST265 on the screen 16 as the temporary turn order image in execution of the selected command. A specific example will be discussed with FIGS. 84 to 86. Command selection display for the ally character B 112 is produced on the display 16 shown in FIG. 84. The current turn of the ally character A 111, the ally character C 113, and the ally character D 114 already terminates. The selection cursor 45 points to ITEM and the player does not yet select specific action. In this case, the present turn order 118 is displayed on the top of the screen 16. When HARD HIT of ATTACK command is selected as shown in FIG. 85 in response to player's entry operation through the controller 4, the temporary turn order after action is executed is displayed. For example, the turn order in which the action turn of the ally character B 112 comes around following the ally character D 114 and preceding the ally character A 111 is displayed. In this case, the current turn of the ally character A 111, the ally character C 113, and the ally character D 114 already terminates and thus the turn order 118 in the next turn is displayed in response to action selection of the ally character B 112, so that the player can forecast the turn order and can devise a stratagem. When WIND of SPELL command is selected as shown in FIG. 86 in response to player's entry operation through the controller 4, the temporary turn order after action is executed is also displayed. For example, the turn order in which the action turn of the ally character B 112 comes around following the ally character A 111 and preceding the ally character C 113 is displayed. Thus, the turn order in execution of the selected command (temporary turn order) is displayed on the screen 16; in other words, for each selected command, the turn order corresponding to the command is displayed, so that the player can devise a stratagem in the "battle scene". The CPU 21 for executing the processing corresponds to temporary order display control section for displaying the action execution order temporarily calculated by the execution order temporary calculation section on the screen. The temporary order display is produced until the command is decided. Upon completion of the processing, the subroutine is exited.

Accordingly, the CPU 21 repeatedly executes ST262 to ST266, and displays the temporary turn order for the selected command successively on the screen 16. When a different command is selected in response to an entry operation signal from the controller 4, the CPU 21 displays the temporary turn order corresponding to the different command. Thus, a different turn order may be displayed depending on the selected command and the player can be given an occasion to devise a stratagem.

Attack Target Range Display Processing

The "attack target range display processing" will be discussed with FIG. 82.

Figure 82:
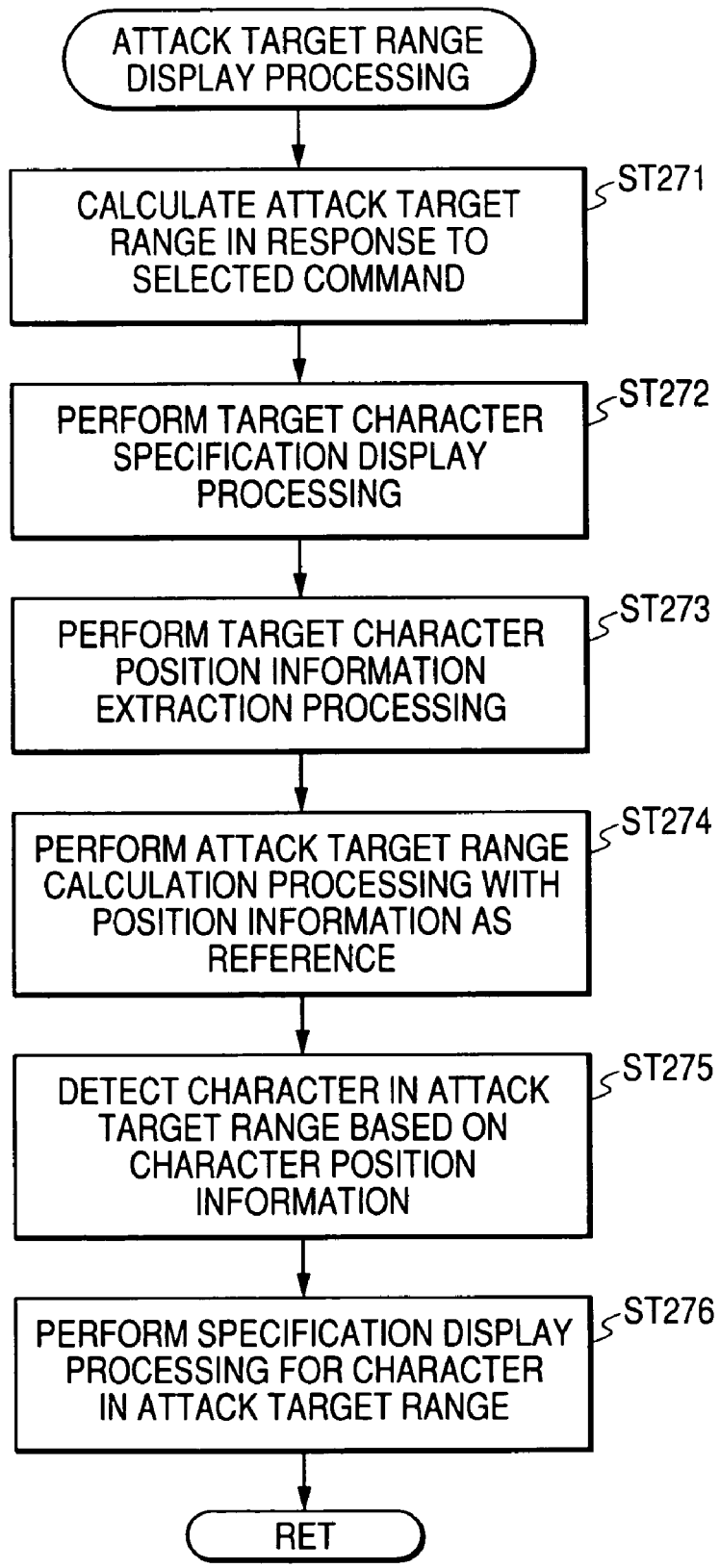
FIG. 82 is a flowchart to show a procedure of attack target range display processing.

As shown in FIG. 82, first, the attack target range is calculated in response to the selected command (ST271). In the processing, the CPU 21 calculates the attack target range based on the selected command. Specifically, the CPU 21 reads the attack target range based on the command from the DVD-ROM 31 or the predetermined area of the RAM 23 into which the attack target range is loaded from the DVD-ROM 31 for storage, as shown in FIG. 51. The CPU 21 reads the data indicating the shape of the attack target range based on the read attack target range and a table shown in FIGS. 80A through 80D. Accordingly, the CPU 21 calculates the attack target range based on the selected command. Upon completion of the processing, the process proceeds to ST272.

Different types of attack ranges are set in the tables shown in FIG. 80, which are stored in the DVD-ROM 31 or are loaded by the CPU 21 into the predetermined area of the RAM 23 from the DVD-ROM 31. The attack range is used as two-dimensional data, but may be formed as three-dimensional data.

At ST272, target character specification display processing is executed. In the processing, the CPU 21 displays the selection mark 46 indicating that the character is the attack reference for the selected attack target character as shown in FIGS. 75 to 78. Upon completion of the processing, the process proceeds to ST273.

At ST273, target character position information extraction processing is executed. In the processing, the CPU 21 reads position information as shown in FIG. 20 from the predetermined area of the RAM 23. The CPU 21 reads the position information of not only the character as the attack reference, but also all ally and enemy characters appearing in the "battle scene." The CPU 21 for executing the processing corresponds to attack range extraction section for extracting the attack range corresponding to the attack selected in response to player's entry operation through the operation unit from different types of attack ranges. Upon completion of the processing, the process proceeds to ST274.

At ST274, attack target range-calculation processing is executed with the position information as the reference. In the processing, the CPU 21 calculates the attack target range calculated at ST271 with the character pointed to by the selection mark 46 as the reference. Specifically, when the attack target range based on the command is small circle, the CPU 21 adopts as the attack target range, the range having a radius of R1 with the position information of the character pointed to by the selection mark 46 as the reference. The CPU 21 displays each attack target range 48 on the screen 16 as shown in FIGS. 75 to 78 based on the calculated attack target range and the target character selected as the attack reference (reference character) The CPU 21 for executing the processing corresponds to attack range display control section for displaying the attack range corresponding to the attack extracted by the attack range extraction section on the screen based on the reference character determined by reference character determination section. Upon completion of the processing, the process proceeds to ST275.

At ST275, a character in the attack target range is detected based on the character position information. In the processing, the CPU 21 detects whether or not a character exists in the attack target range calculated at ST274. Specifically, the CPU 21 compares the attack target range calculated at ST274 with the position information of all characters appearing in the "battle scene." The character position information indicates the center of the character and is indicated by the three position coordinates of X, Y, and Z as shown in FIG. 20. That is, the CPU 21 compares the position information stored for each character with the attack target range and determines whether or not a character exists in the attack target range. The CPU 21 detects the character in the attack target range based on the comparison result. Upon completion of the processing, the process proceeds to ST276.

At ST276, specification display processing is executed for the character in the attack target range. In the processing, the CPU 21 displays an attack target mark 47 indicating that the character is the attack target for each character detected being in the attack target range at ST275, as shown in FIGS. 75 to 78.

Figure 77:
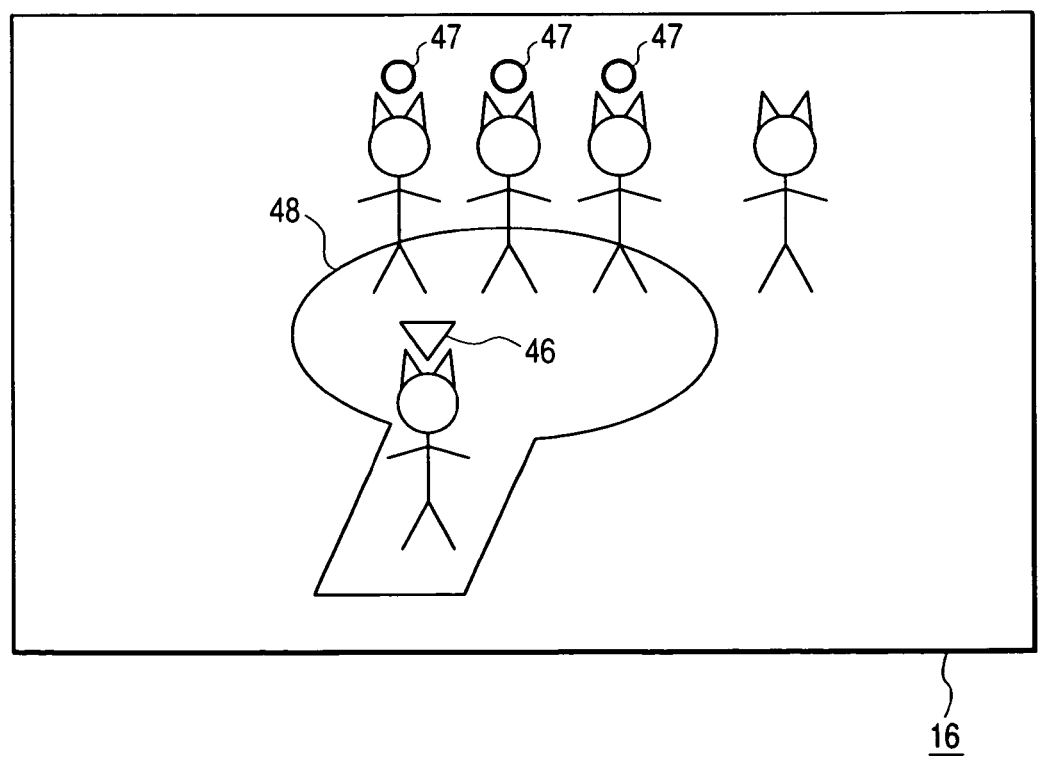
FIG. 77 is a drawing to show display mode of attack.
Figure 78:
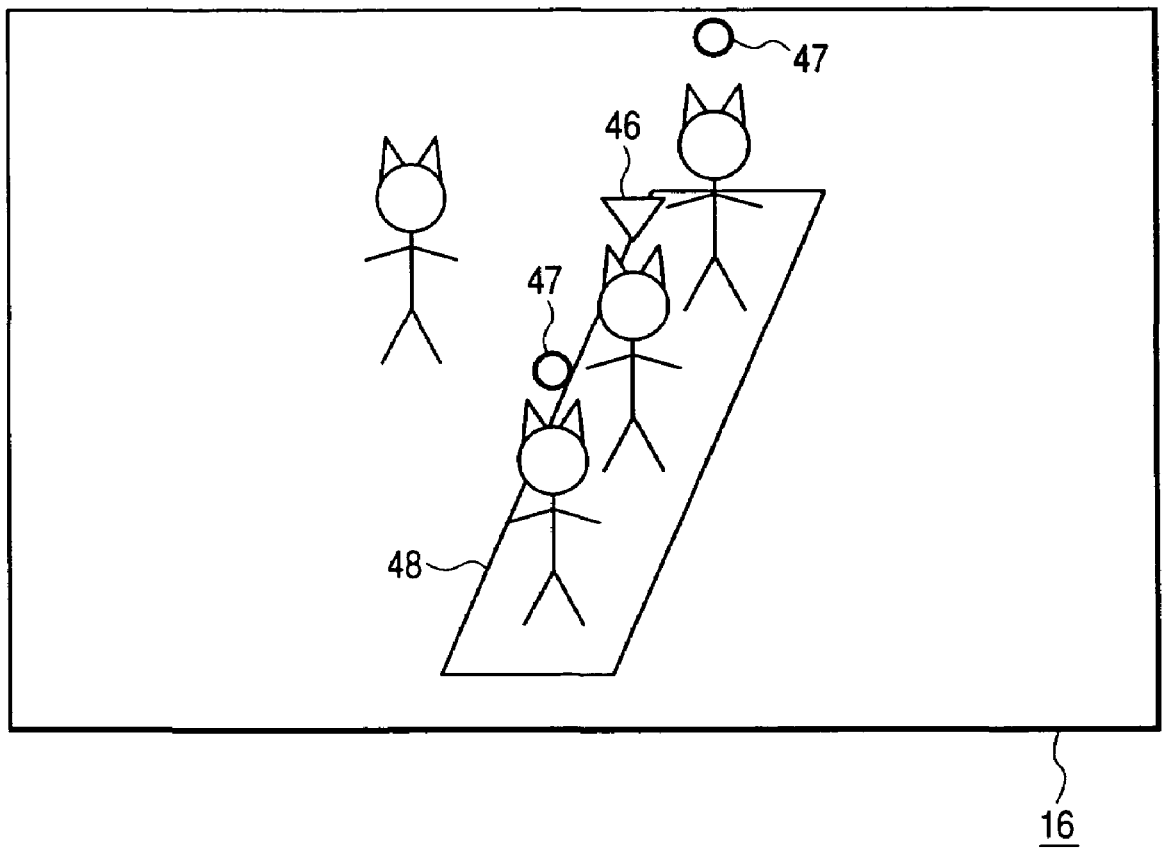
FIG. 78 is a drawing to show display mode of attack.

The attack target range indicates the attack target range with the enemy character to be attacked as the reference. There are different types of specific attack target range shapes. For example, a circle shown in FIG. 75, a sector shown in FIG. 76, a straight line shown in FIG. 78, and a through shape shown in FIG. 77 are set. The circular attack target range is shaped like a circle with the reference character as the center. There are different types of circular attack target ranges (for example, large circle, medium circle, small circle) different in radius (for example, R11, R12, R13), as shown in FIG. 80A. The sector attack target range is shaped like a sector with the reference character as the center. There are different types of sector attack target ranges (for example, large sector, medium sector, small sector) different in radius and angle (for example, radius of R21, R22, R23 and angle of D1, D2, D3), as shown in FIG. 80B. Further, the linear attack target range is along the straight line connecting the character to be attacked and the reference character. There are different types of linear attack target ranges (for example, large straight line, medium straight line, small straight line) different in width (for example, W1, W2, W3), as shown in FIG. 80C. Further, the through-shape attack target range is a combination of a circle with the reference character as the center and a shape along the straight line connecting the character to be attacked and the reference character. That is, the through-shape attack target range is provided by combining the circular attack target range and the linear attack target range. There are different types of through-shape attack target ranges (for example, large through shape, medium through shape, small through shape) different in radius and width (for example, R21, R22, R23 and W1, W2, W3), as shown in FIG. 80D. The CPU 21 for executing the processing corresponds to target character display control section for displaying an image for enabling the player to distinguish between the reference character determined by the reference character determination section and the target character as the attack target contained in the attack range. Upon completion of the processing, the subroutine is exited.

Description of Judgment Ring

Figure 30:
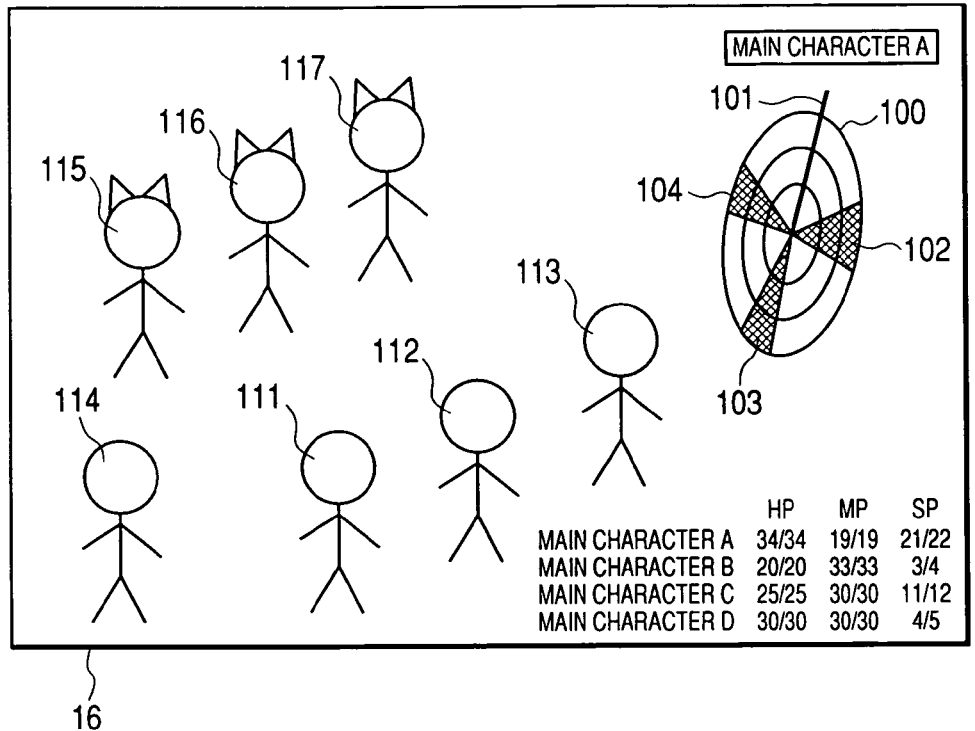
FIG. 30 is a drawing to show a display screen at the command determination time.

Just before the ally character takes action against the target character based on the selected command, a judgment ring 100 as a variable display area is displayed as shown in FIG. 30 and the necessary parameters for determining the effect are determined using the judgment ring 100. The CPU 21 for thus displaying the variable display area corresponds to variable display control section for displaying a variable display area with the display mode changing with the passage of the time on the screen.

As shown in FIG. 30, the judgment ring 100 as the reference area is displayed in a state in which it is inclined in a slanting direction. Displayed on the judgment ring 100 is a rotation bar 101 as a varying area for clockwise rotating like a clock hand with the center point of the judgment ring 100 as a support. This means that the rotation bar 101 as a varying area varies relatively to the reference area. The variable display area with the display mode changing with the passage of the time is made up of the reference area and the varying area varying relatively to the reference area.

Also displayed on the judgment ring 100 are timing areas colored in predetermined angle ranges, which will be hereinafter referred to as timing areas. The timing areas are "effective areas" relatively advantageous to the player. The areas except the "effective areas" in the judgment ring 100 become "non-effective areas" relatively disadvantageous to the player. Each of the timing areas contains a 120% area as a "special effective area" described later.

That is, the reference area is made up of the effective areas relatively advantageous to the player and the non-effective areas relatively disadvantageous to the player, and each of the effective areas contains the special effective area furthermore advantageous to the player. Accordingly, the action effect is determined to be any of the first effect relatively advantageous to the player, the second effect relatively disadvantageous to the player, or the third effect furthermore relatively advantageous to the player.

Then, the settings of the parameters are changed depending on whether or not the player can operate the O button 12 when rotation of the rotation bar 101 is started and the rotation bar 101 passes through any of the timing areas. The timing areas include three timing areas as shown in FIG. 30. The timing area through which the rotation bar 101 first passes is a "first timing area" 102, the timing area through which the rotation bar 101 next passes is a "second timing area" 103, and the timing area through which the rotation bar 101 last passes is a "third timing area" 104.

For example, when the player can well operate the O button 12 on any of the three timing areas, namely, the player can operate the O button 12 with the rotation bar 101 on any of the three timing areas, then the action taken by the main character against the enemy character becomes effective. When the FIGHT command is selected, three attacks are made on the enemy character to cause damage thereto by predetermined attack power. When the SPECIAL command is selected and recovery spell is used, spell having predetermined recovery power can be worked on an ally character three times for giving recovery power to the ally character.

In contrast, when the player upsets the operation timing of the O button 12 on one timing area, the advantage assigned to the timing area becomes ineffective. Particularly, when the player fails three times, the advantage becomes zero. In the embodiment, the player visually recognizes the effective areas of the judgment ring 100; the point is that the five senses of the player may be influenced to enable the player to recognize the operation timing. For example, it is also possible to adopt an auditory configuration wherein specific voice (sound) is generated for a predetermined time and the player is requested to operate in the generation section or a tactile configuration wherein the controller 4 or a portable terminal is vibrated and the player is requested to operate in the vibration generation section.

Figure 31:
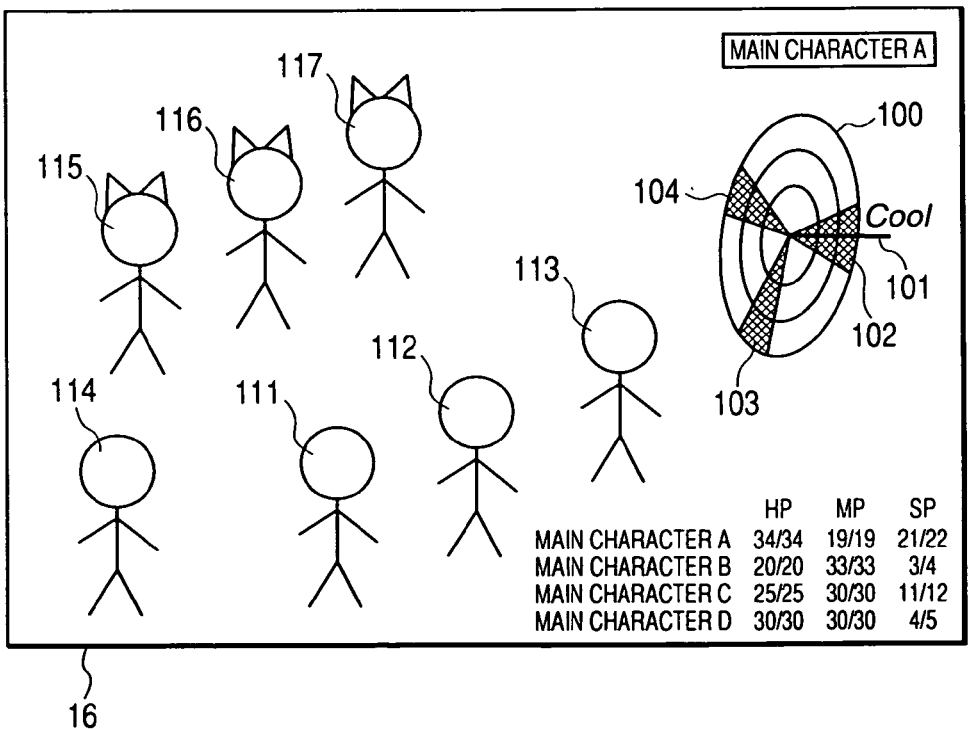
FIG. 31 is a drawing to show a screen displayed when an O button is operated when a rotation bar passes through a first timing area.

FIG. 31 shows a screen displayed when the O button 12 is operated when the rotation bar 101 passes through the first timing area 102. As shown in FIG. 31, when the player can well operate the O button 12 on the first timing area 102, a character string of COOL is displayed, for example.

Figure 32:
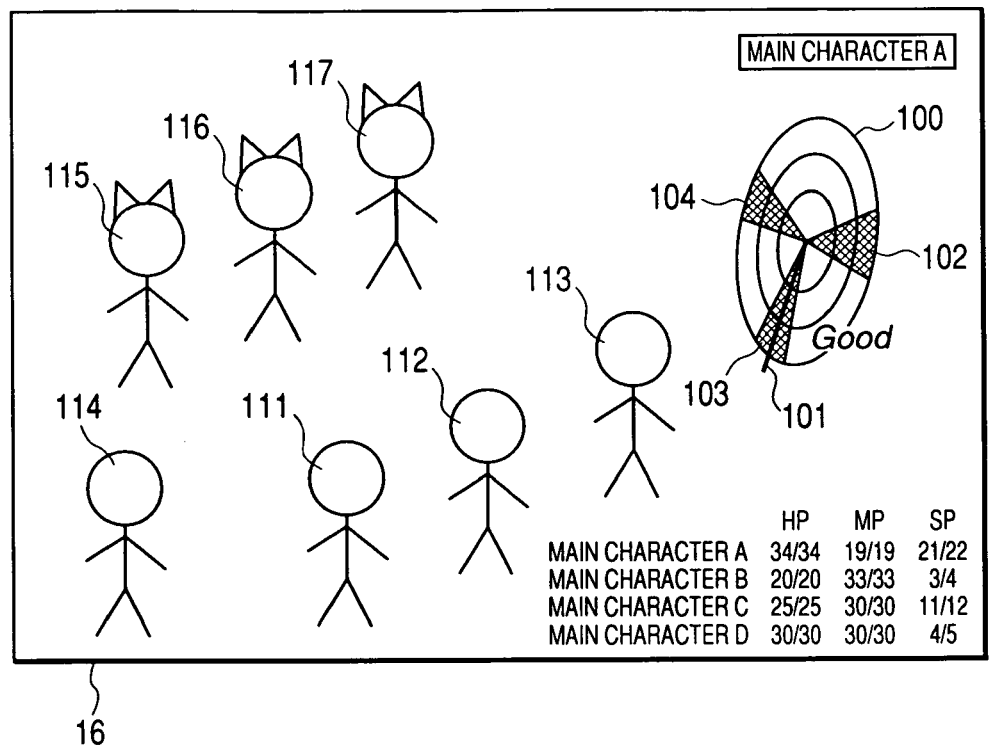
FIG. 32 is a drawing to show a screen displayed when the O button is operated when the rotation bar passes through a second timing area.

FIG. 32 shows a screen displayed when the O button 12 is operated when the rotation bar 101 passes through the second timing area 103. As shown in FIG. 32, if the player can well operate the O button 12 on the second timing area 103, a character string of GOOD is displayed, for example.

Figure 33:
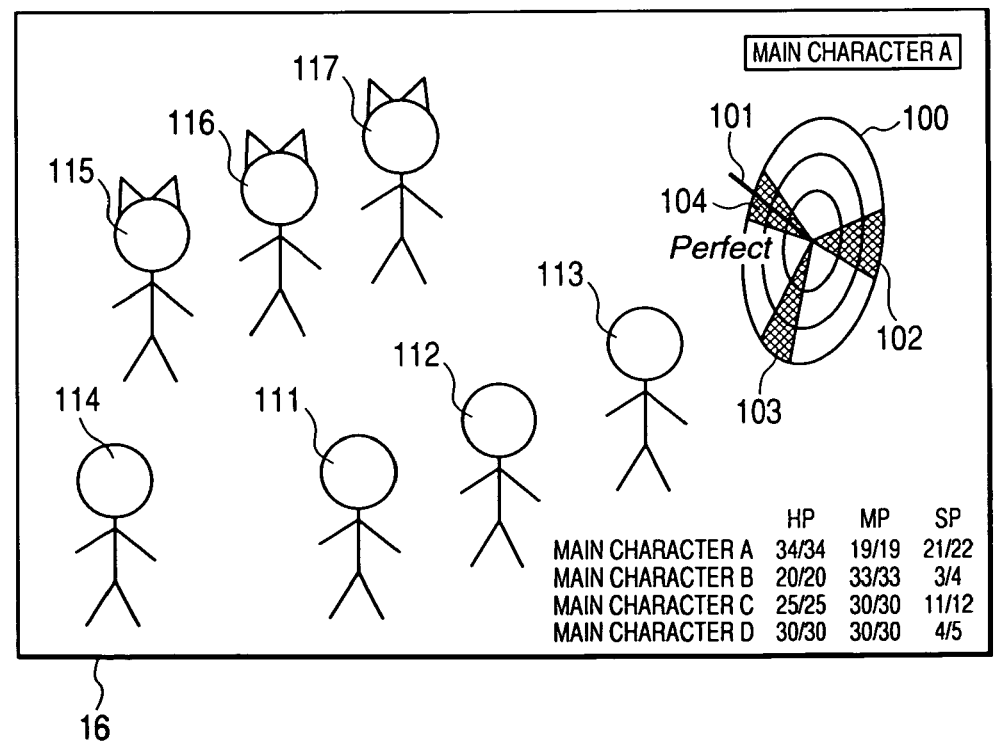
FIG. 33 is a drawing to show a screen displayed when the O button is operated when the rotation bar passes through a third timing area.

FIG. 33 shows a screen displayed when the O button 12 is operated when the rotation bar 101 passes through the third timing area 104. As shown in FIG. 33, if the player can well operate the O button 12 on the third timing area 104, a character string of PERFECT is displayed, for example.

Figure 34:
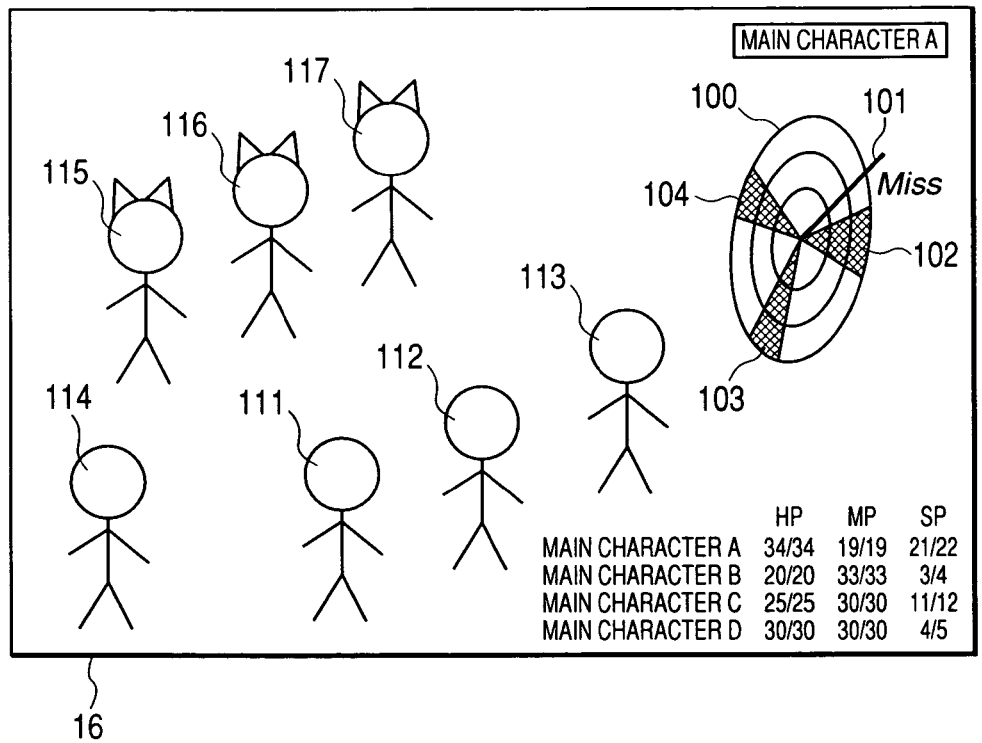
FIG. 34 is a drawing to show a screen displayed when a player fails in operating the O button on the timing area.

FIG. 34 shows a screen displayed when the O button 12 is operated before the rotation bar 101 enters the first timing area 102, namely, when the player fails in operating the O button 12 on the timing area. As shown in FIG. 34, if the player fails in operating the O button 12 on the timing area, a character string of MISS is displayed, for example.

Figure 35:
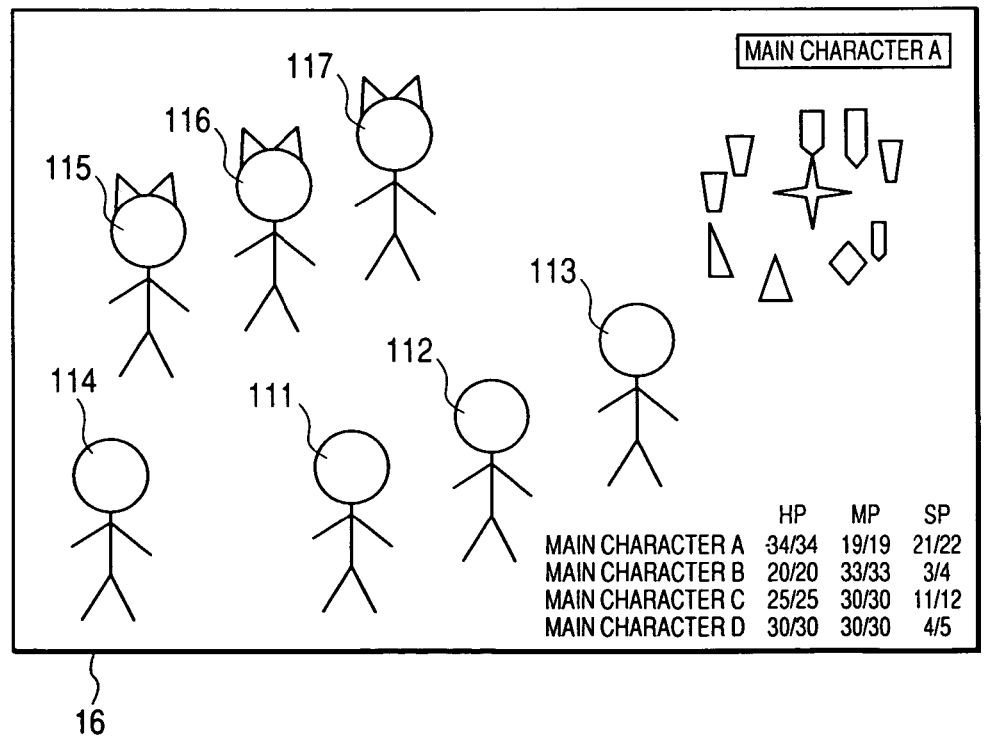
FIG. 35 is a drawing to show a screen displayed after rotation of the rotation bar stops when a player succeeds in operating the O button on all timing areas.

FIG. 35 shows a screen displayed after rotation of the rotation bar 101 stops when the player can well operate the O button 12 on the three timing areas, namely, when the player can operate the O button 12 when the rotation bar 101 exists on the three timing areas. As shown in FIG. 35, the judgment ring 100 is broken to pieces and the pieces scatter at the same time as rotation of the rotation bar 101 stops. Then, the ally character A 111 with the FIGHT command selected in FIG. 22 moves to the enemy character A 115 selected as the target character and attacks the enemy character. The attack power at this time (damage amount to enemy character) varies depending on the operation timing of the O button 12 in the judgment ring 100. That is, the matching between the timing of player's entry operation through the operation unit performed when the display mode of the variable display area changes and the display mode of the variable display area is determined and the action effect of the attack power, etc., changes with the determination result.

Figure 36:
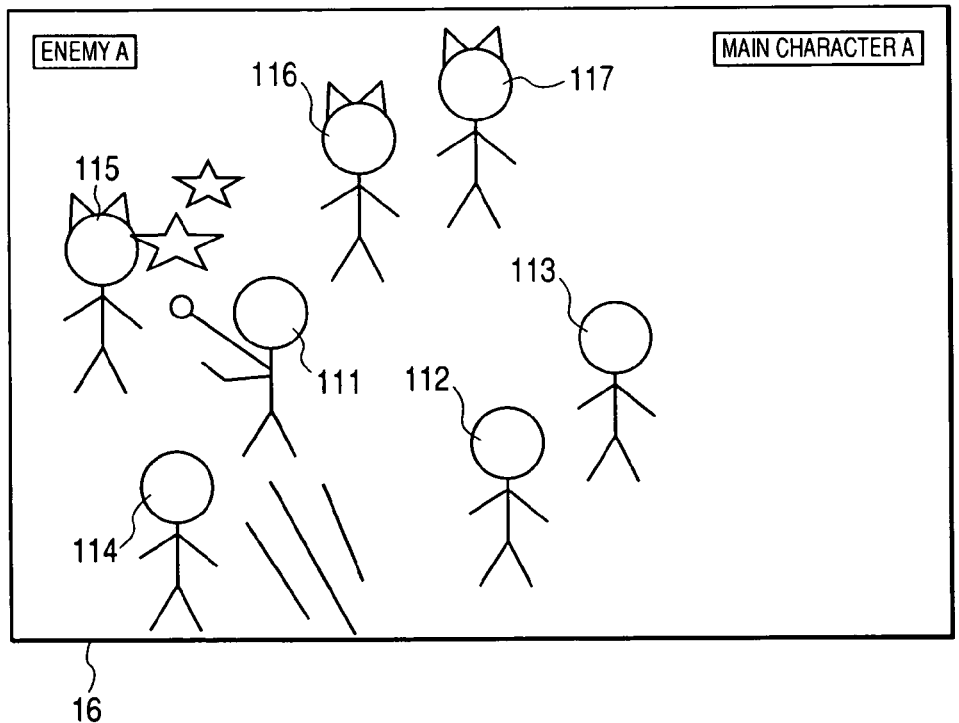
FIG. 36 is a drawing to show how the ally character A attacks an enemy character A.

FIG. 36 shows how the ally character A 111 takes action against the enemy character A 115 based on the selected command and the operation result during display of the judgment ring 100. Here, the FIGHT command is selected and the ally character A 111 attacks the enemy character A 115. When the player can well operate the O button 12 on the three timing areas during display of the judgment ring 100, the ally character A 111 makes three attacks on the enemy character A 115 by predetermined attack power on the screen, as described above.

In the embodiment, if the player fails the first operation, he or she can give a challenge to the second operation, but when the player fails the first operation, operation acceptance may be terminated.

Figure 37:
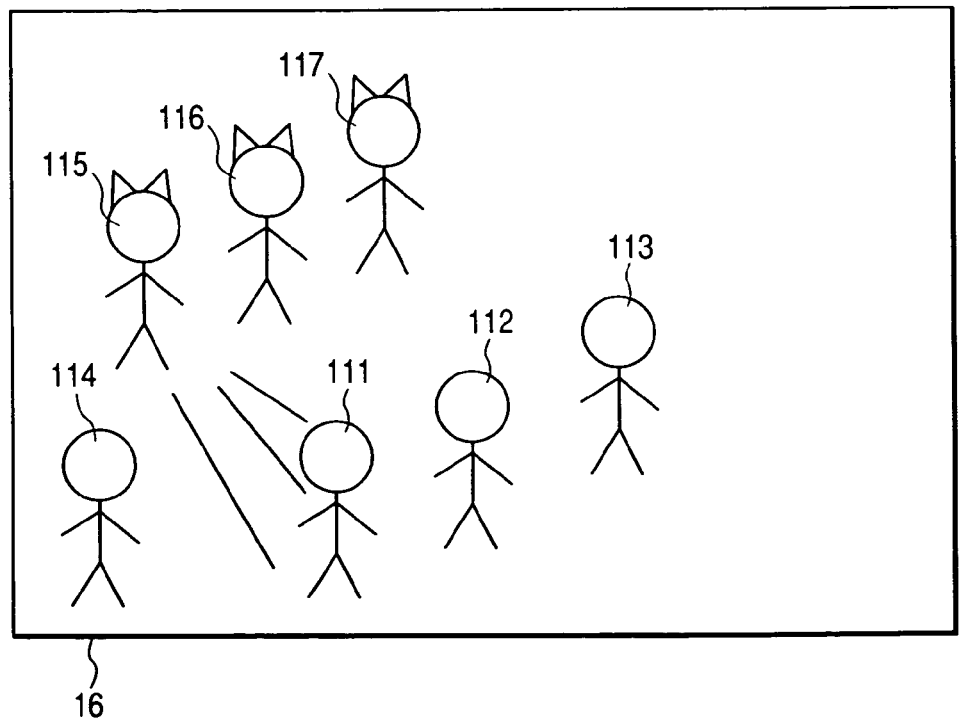
FIG. 37 is a drawing to show a screen displayed when the ally character A terminates the attack on the enemy character A and returns to the former position.

FIG. 37 shows a screen displayed when the ally character A 111 terminates the attack on the enemy character A 115 and returns to the former position. Here, the time period from the start of action of the character or an enemy character against the target character (the state shown in FIG. 36) to the termination of the action (the state shown in FIG. 37) is referred to as "a (one) turn" and display processing for the one turn is performed in the "effect image display processing" at ST232 (FIG. 27).

Judgment Ring Determination Processing

Figure 27:
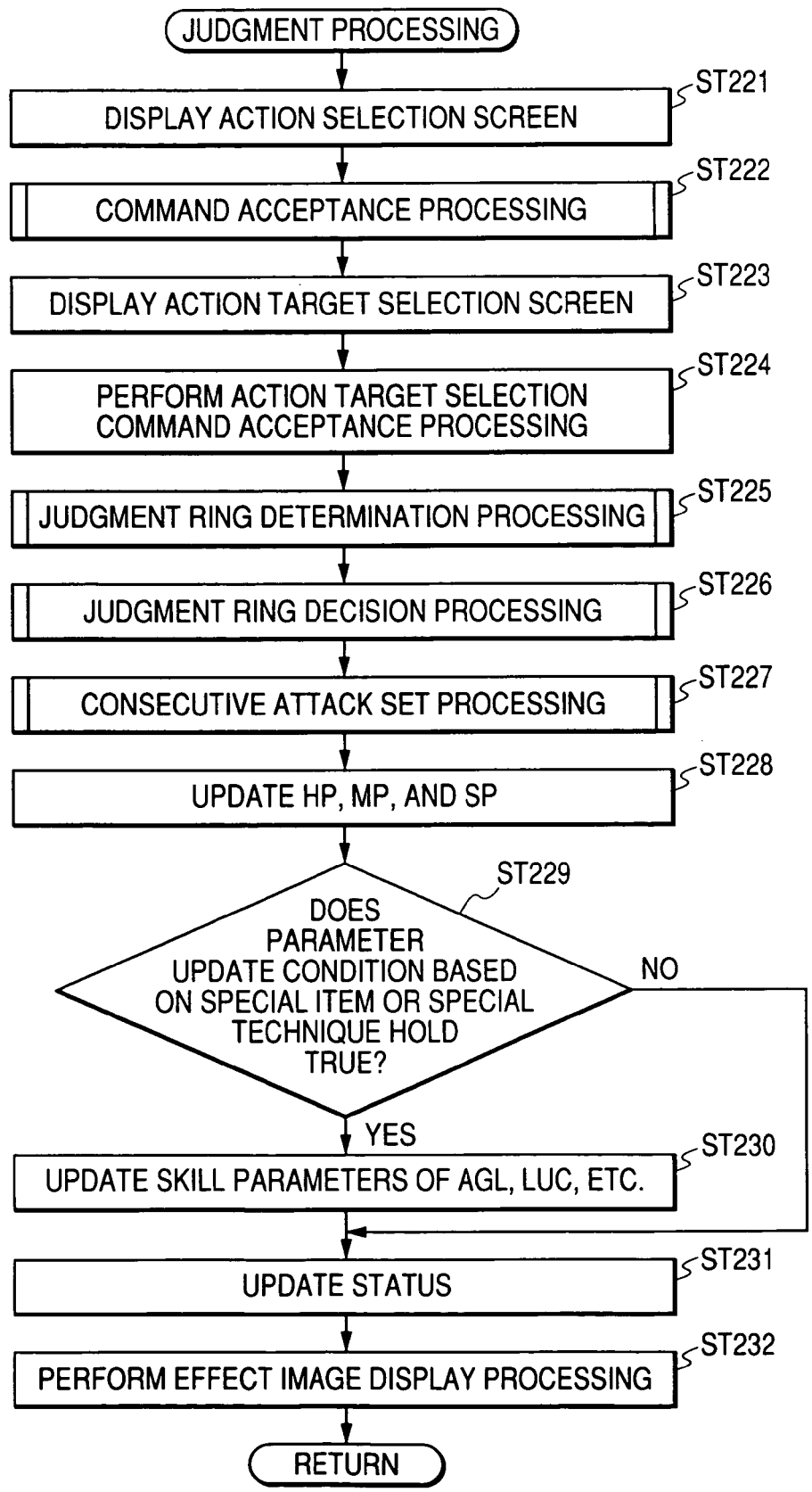
FIG. 27 is a flowchart to show a procedure of judgment processing.
Figure 38:
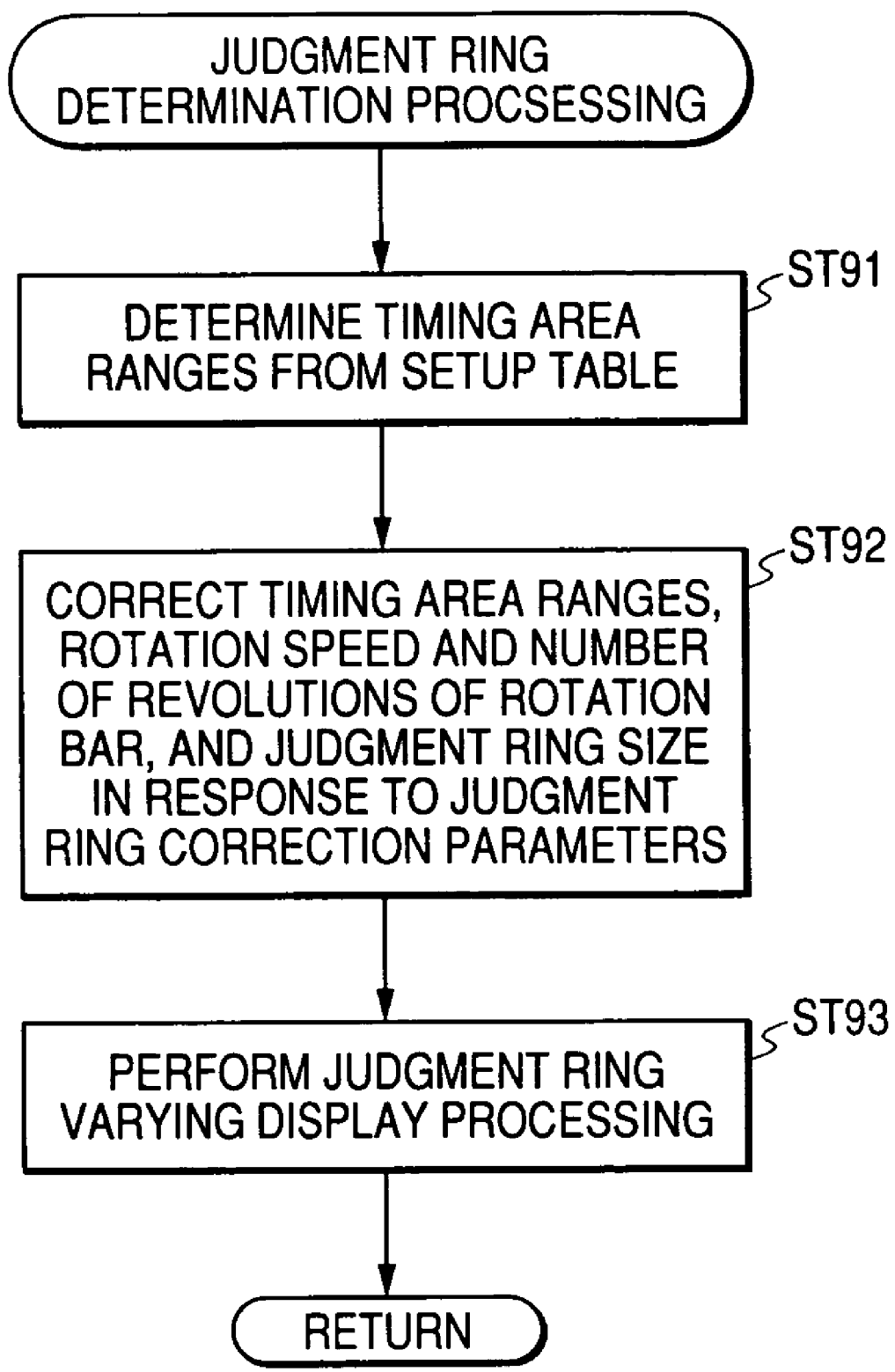
FIG. 38 is a flowchart to show a procedure of judgment ring determination processing.

FIG. 38 shows a procedure of the "judgment ring determination processing" at ST225 (FIG. 27). Here, first any of the "attack table" (FIGS. 39), the "special table" (FIG. 40), or the "item table" (FIG. 41) set in the RAM 23 is referenced and the timing area ranges are determined (ST91). Subsequently, the timing area ranges determined at ST91, predetermined rotation speed and the predetermined number of revolutions of the rotation bar, and the size of the judgment ring are corrected based on judgment ring correction parameters described later (ST92). The rotation speed of the rotation bar is set to 1.5 seconds per round (revolution) as the basic speed, and the number of revolutions of the rotation bar is set to one as the basic number of revolutions. The judgment ring 100 is displayed in the timing area ranges finally determined at ST92 and rotation display of the rotation bar 101 is produced based on the determined rotation speed and the determined number of revolutions of the rotation bar 101 as judgment ring varying display processing (ST93). The timing areas and the judgment ring correction parameters are as follows:

FIG. 39 shows the "attack table." The "attack table" is a table set when the player selects the FIGHT command. As shown in FIG. 39, the attacks that can be used are defined according to the type of ally character, and the attack skill and the range of each timing area are set in response to the type of attack (for example, soft hit, normal hit, or hard hit).

The attack skill is used to calculate the damage amount to an enemy character (opposite character damage amount). The greater the numeric value of the attack skill, the larger the damage amount to the enemy character.

The range of each timing area is indicated by the angle range surrounded by the "start angle" and "end angle" with rotation start position of the rotation bar 101, 100a, as 0 degrees, as shown in FIG. 39. The "start angle" and "end angle" are set to different values in response to the type of used arm, as shown in FIG. 39. For example, when the main character is the main character A 111 and the used arm is an arm A1, the range of the first timing area 102 is set to the 90-degree angle range of the start angle 45 degrees to the end angle 135 degrees. The range of the second timing area 103 is set to the 67-degree angle range of the start angle 180 degrees to the end angle 247 degrees. The range of the third timing area 104 is set to the 45-degree angle range of the start angle 292 degrees to the end angle 337 degrees.

In the judgment ring 100, a "120% area" is set as a special effective area in the predetermined range of each timing area; when the rotation bar passes through the area, if the player can operate the O button 12, the damage amount to the enemy character increases 20%, namely, becomes 1.2 times. The "120% area" is formed in the range of the angle position resulting from subtracting the angle of the "120% area" from the end angle to the end angle.

FIG. 42 shows a calculation expression for calculating the damage amount to the enemy character (opposite character damage amount).

"Assignment value" is set to 0.2 at the first attack time, 0.3 at the second attack time, and 0.5 at the third attack time, as shown in FIG. 42.

"SP remaining amount correction value" is 1 until the current SP falls below 25% of the maximum SP, namely, while "25−current SP/maximum SP×100≦0" is satisfied. When the current SP falls below 25% of the maximum SP, namely, when "25−current SP/maximum SP×100>0" is satisfied, 0.01 is added to the "SP remaining amount correction value" and the "SP remaining amount correction value" becomes 1.01. Then, whenever SP is decremented by one, 0.01 is added to the "SP remaining amount correction value." That is, whenever SP is decremented by one, the opposite character damage amount is increased 1%.

"Character individual skill" means the STR (physical attack power) shown in FIGS. 7, and "used item individual skill" is a value set in response to the types of main character and arm shown in FIG. 39.

"Judgment ring correction value" is 1.2 if the player operates the O button 12 when the rotation bar 101 is on the 120% area of any timing area; 1 if the player operates the O button 12 when the rotation bar 101 is on any other area than the 120% area of any timing area; or 0 if the player does not operate the O button 12 when the rotation bar 101 is on any timing area.

For example, when the FIGHT command is selected, when the player can well operate the O button 12 on the three timing areas, namely, when the player can operate the O button 12 when the rotation bar 101 is on the three timing areas, then the main character repeats an attack on the enemy character three times to give predetermined damage to the enemy character. For example, when the main character A 111 uses the arm Al to attack the enemy character, the opposite character damage amount at the first attack becomes "0.2×SP remaining amount correction value×STR×6×1 (1.2)" and as many points as the opposite character damage amount are subtracted from the HP of the enemy character. Likewise, the opposite character damage amount at the second attack becomes "0.3×SP remaining amount correction value×STR×6×1 (1.2)" and that at the third attack becomes "0.5×SP remaining amount correction value×STR×6×1 (1.2)." As many points as the opposite character damage amount are subtracted from the HP of the enemy character.

On the other hand, when the player upsets the operation timing of the O button 12 on one timing area, the later "judgment ring correction value" in the timing area becomes 0. For example, when the main character uses the arm Al to attack the enemy character, when the player can operate the O button 12 when the rotation bar 101 is on the first timing area, the opposite character damage amount at the first attack becomes "0.2×SP remaining amount correction value×STR×6×1 (1.2) ." However, when the player upsets the operation timing of the O button 12 on the second timing area, the "judgment ring correction value" at the second attack and that at the third attack become 0 and the opposite character damage amount also becomes 0.

When the HP of the enemy character becomes 0, it means that the main character beats the enemy character.

Figure 43:
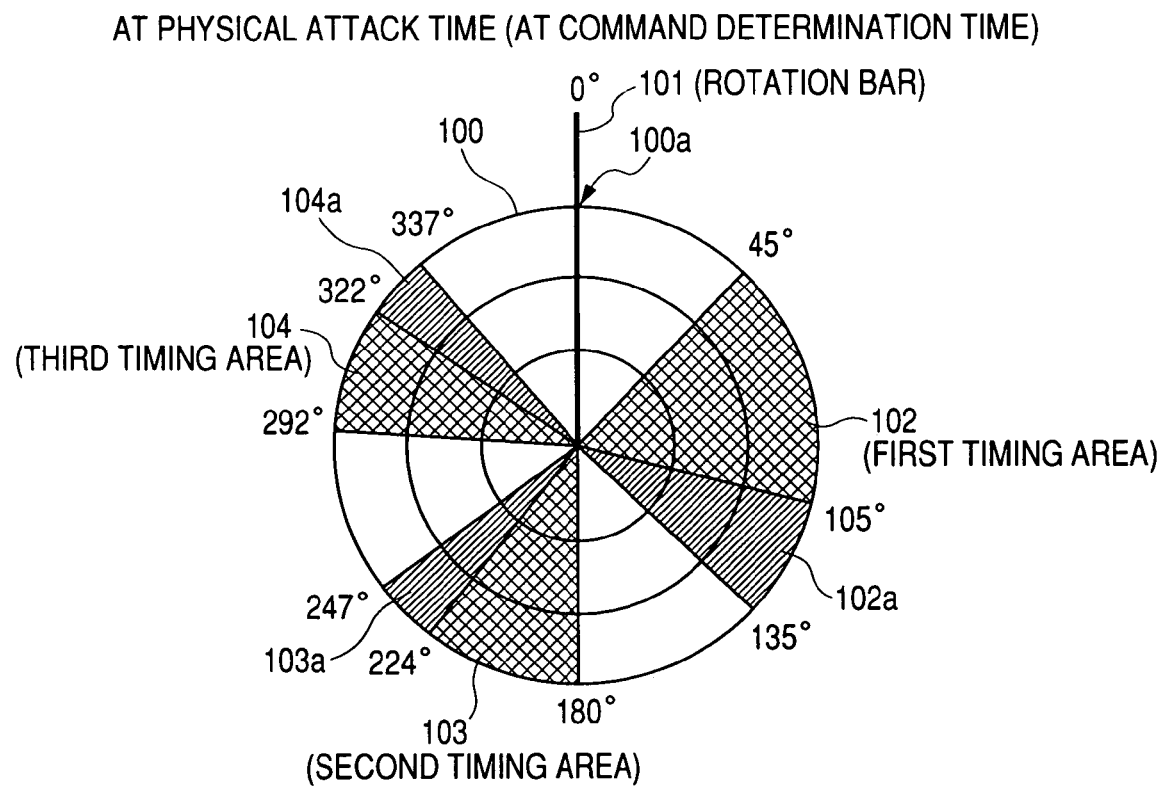
FIG. 43 is a drawing to show the display mode of a judgment ring displayed at the command determination time.

FIG. 43 shows the display mode of the judgment ring 100 displayed at the command determination time. It shows the judgment ring 100 displayed at the command determination time when the ally character is the main character A 111, and the SOFT HIT command is selected. The judgment ring 100 is formed according to the angle ranges of the timing areas set in the "attack table" shown in FIG. 39. When the main character is the ally character A 111, and the ATTACK command is selected, the start angle and the end angle of the first timing area 102 are 45 degrees and 135 degrees; those of the second timing area 103 are 180 degrees and 247 degrees; and those of the third timing area 104 are 292 degrees and 337 degrees. As shown in FIG. 43, the "120% area" in the first timing area 102 is a range 102a of 105 degrees resulting from subtracting 30 degrees from the end angle 135 degrees to the end angle 135 degrees; the "120% area" in the second timing area 103 is a range 103a of 224 degrees resulting from subtracting 23 degrees from the end angle 247 degrees to the end angle 247 degrees; and the "120% area" in the third timing area 104 is a range 104a of 322 degrees resulting from subtracting 15 degrees from the end angle 337 degrees to the end angle 337 degrees.

Figure 44:
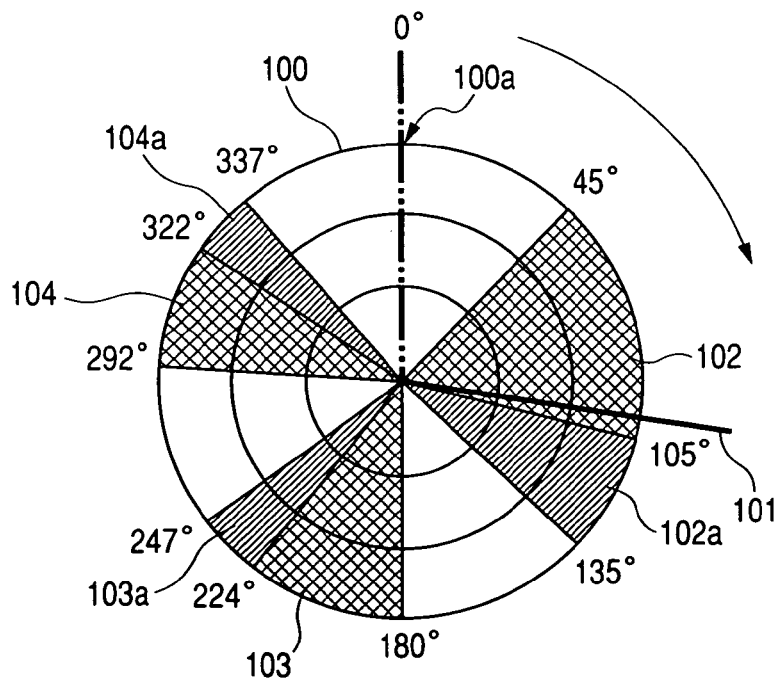
FIG. 44 is a drawing to show the display mode of the judgment ring after command determination.

FIG. 44 shows the display mode of the judgment ring 100 after the command determination. It shows a state in which the rotation bar 101 starts to rotate and passes through the first timing area 102.

The "120% areas" are not limited to those described above. For example, the "120% area" may be provided in the range of the start angle to a predetermined angle as shown in FIG. 45A or two "120% areas" may be provided in one timing area as shown in FIG. 45B. FIG. 45A shows the case where the range 102a of the start angle 45 degrees to the angle 65 degrees (45 degrees+20 degrees) is set as the "120% area". FIG. 45B shows the case where the range 102a of the start angle 45 degrees to the angle 65 degrees (45 degrees+20 degrees) and the range of the angle 105 degrees resulting from subtracting 30 degrees from the end angle 135 degrees to the end angle 135 degrees are set as the "120% areas".

FIG. 40 shows the "special table." The "special table" is a table set when the player selects the SPECIAL command. The SPECIAL command is a command using a special skill set for each character. For example, for the character A 111, the character is transformed into a fusion monster described later and it is made possible to use attack spell although attack spell cannot be used in the usual status. As shown in FIG. 40, the special skills that can be used are defined according to the type of main character, and the skill value and the range of each timing area are set for each special skill.

As shown in FIG. 40, when the ally character is the ally character A 111, attack spell 1 to attack spell 3 can be used as the special skills. The skill values set for them are used to calculate the opposite character damage amount to give damage to the enemy character using the attack spell 1 to the attack spell 3. In this case, the greater the skill value of the used special skill, the larger the damage amount to the enemy character, namely, the number of points to decrease the HP of the enemy character. It is made possible to use the attack spell 1 to the attack spell 3 when the character is transformed into a fusion monster described later.

On the other hand, when the ally character is the ally character B 112, recovery spell 1 to recovery spell 3 can be used as the special skills. The skill values set for them are used to calculate the recovery value to recover an ally character using the recovery spell 1 to the recovery spell 3. In this case, the greater the skill value of the used special skill, the larger the recovery value of the ally character, namely, the number of points to recover the decreased HP of the ally character receiving damage from the enemy character.

The range of each timing area is indicated by the angle range surrounded by the "start angle" and "end angle" with rotation start position of the rotation bar 101, 100a, as 0 degrees, as with the "arm table" (FIG. 39). The "start angle" and "end angle" are set to different values in response to the type of used special skill. In addition, in the "special table," only the first timing area 102 is set or only the first timing area 102 and the second timing area 103 are set depending on the type of used special skill. The main character C 113 is not provided with such special skills and neither the skill value nor the timing area range is set in the "special table."

FIG. 46A shows a calculation expression for calculating the opposite character damage amount when each of the attack spell 1 to the attack spell 3 is used as the special skill and FIG. 46B shows a calculation expression for calculating the recovery value when each of the recovery spell 1 to the recovery spell 3 is used as the special skill.

"Assignment value" is set to 0.2 at the first special skill use time, 0.3 at the second special skill use time, and 0.5 at the third special skill use time, as shown in FIG. 46.

"Character individual skill" used with the calculation expression for calculating the opposite character damage amount when each of the attack spell 1 to the attack spell 3 in FIG. 46A means the INT (spell attack power) shown in FIG. 7. "Skill value of used special skill" is a skill value set in response to the types of main character and used special skill shown in FIG. 40.

"Judgment ring correction value" is 1.2 if the player operates the O button 12 when the rotation bar 101 is on the 120% area of any timing area; 1 if the player operates the O button 12 when the rotation bar 101 is on any other area than the 120% area of any timing area; or 0 if the player does not operate the O button 12 when the rotation bar 101 is on any timing area.

For example, when the SPECIAL command is selected for the main character A 111 and attack spell is selected as the used special skill, when the player can well operate the O button 12 on all displayed timing areas, then the main character A attacks the enemy character using the selected attack spell to give predetermined damage to the enemy character. For example, when the main character A uses the attack spell 1 to attack the enemy character, the main character A attacks the enemy character using the attack spell only once because only one timing area is set. The opposite character damage amount at this time becomes "0.2×INT×99×1 (1.2)" from FIG. 46A and as many points as the opposite character damage amount are subtracted from the HP of the enemy character.

When the SPECIAL command is selected and recovery spell is selected as the used special skill, when the player can well operate the O button 12 on all displayed timing areas, then the main character works the selected recovery spell on an ally character for recovery. For example, when the main character B uses the recovery spell 1, the main character B 112 uses the recovery spell on the ally character only once because only one timing area is set. The recovery value of the ally character at this time becomes "0.2×19×1 (1.2)" from FIG. 46B and as many points as the recovery value are added to the HP of the ally character.

Comparing the timing area ranges in the tables by character, in the "attack table" in FIG. 39, the timing area ranges set for the ally character A 111 generally are wide as compared with those set for the ally character B 112. For example, the sum total of the timing area ranges with soft hit selected is the angle range of (135–45 degrees)+(247–180 degrees)+(337–292 degrees)=202 degrees, and the sum total of the timing area ranges set to normal hit is the angle range of (125–50 degrees)+(205–157 degrees)+(282–247 degrees)=185 degrees.

The reason why the difference exists is that the ally character A 111 is a male character set to great physical strength and high physical attack power on the story and accordingly excels in a physical attack. Therefore, the timing area ranges when the "attack table" is selected are set wide, and the degree of difficulty in operating the judgment ring 100 is low.

On the other hand, in the "special table" in FIG. 40, the timing area ranges set for the ally character B 112 are wider than those set for the ally character A 111.

The reason why the difference exists is that the ally character B 112 is a female character set to a sorcerer on the story; the timing area ranges when recovery spell is used, namely, when the special table is selected are set wide, and the degree of difficulty in operating the judgment ring 100 is low.

Thus, the features of the characters because of setting the story are involved in the execution condition of the judgment ring 100, so that not only the simple technical intervention element, but also the amusement of finding out commands matching the characteristics of the characters occur, and the interest in the game is furthermore increased.

FIG. 41 shows the "item table." The "item table" is a table set when the player selects the ITEM command. The used item individual skill and the range of each timing area are set in response to the type of used item. As shown in the "item table," items A to C can be used common to all main characters. Each of the items A to C is an item to recover the decreased HP of an ally character receiving damage from an enemy character. Therefore, the used item individual skill is used to calculate the recovery value to recover the ally character using each of the items A to C.

The calculation expression for calculating the recovery value when the main character uses each of the items A to C is the same as that in FIG. 46B, and "assignment value" is set to 0.2 at the first item use time and 0.3 at the second item use time.

FIG. 47 shows a "judgment ring correction parameter table." The "judgment ring correction parameter table" lists parameters for changing the display mode of the judgment ring 100 (ranges of timing areas, rotation speed and number of revolutions of rotation bar, and size of judgment ring), which will be hereinafter referred to as judgment ring correction parameters, and change in the display mode.

ITEM, ENEMY SPELL, and EVENT TYPE are included as the types of judgment ring correction parameters listed in the "judgment ring correction parameter table."

As listed in the "judgment ring correction parameter table," 10 types of items (item D to item M) are set in the judgment ring correction parameter ITEM, and it is made possible to obtain the items as the main character party clears a predetermined condition on each "sub-map." To use the items at a battle scene, a store, etc., the display mode of the judgment ring 100 differs from the usual state and the judgment ring 100 is displayed in a very advantageous state to the player.

The advantages produced when the items are used are as follows:

(1) When the item D or the item E is used, the range of each timing area is widened twice. That is, the O button 12 becomes easy to operate.

(2) When the item F or the item G is used, the rotation speed of the rotation bar 101 is halved. That is, the O button 12 becomes easy to operate.

(3) When the item H is used, the range of each timing area is doubled and the rotation speed is halved.

(4) When the item I is used, the rotation speed of the rotation bar 101 changes irregularly as it is increased or decreased. However, if the player can well operate the O button 12, the attack power, namely, the opposite character damage amount is tripled as a very advantageous state.

(5) When the item J is used, the whole range on the judgment ring 100 becomes the timing area. That is, the player achieves success regardless of where the player operates the O button 12 on the judgment ring 100.

(6) When the item K is used, the number of revolutions of the rotation bar 101, which usually is one, becomes a maximum of seven. In this case, the player can operate the O button 12 with care.

(7) When the item L is used, the advantage of the item I works, the number of revolutions increases, and the opposite character damage amount increases in response to the consumption number of the number of revolutions when the player succeeds in operating the O button 12.

(8) When the item M is used, no timing areas are displayed on the judgment ring 100, but the number of main characters for attacking and the attack power are determined at random in response to the operation timing of the O button 12.

In blanks in the "judgment ring correction parameter table," the same mode as at the usual time is applied.

As the player acquired the item D to the item M as the judgment ring correction parameters, it is made possible for the player to develop the game very advantageously and thus the items are set as rare items comparatively hard to acquire.

The ENEMY SPELL set as the judgment ring correction parameter means specific enemy spell of spell that the enemy character has (enemy spell). When the main character receives the enemy spell, the display mode of the judgment ring 100 becomes a disadvantageous state to the player. In the "judgment ring correction parameter table," six types of enemy spell (enemy spell A to enemy spell F) are set in the judgment ring correction parameter ENEMY SPELL.

The disadvantages produced when the main character receives the enemy spell are as follows:

(1) When the main character receives the enemy spell A, the range of each timing area on the judgment ring 100 is halved.

(2) When the main character receives the enemy spell B, the rotation speed of the rotation bar 101 is doubled.

(3) When the main character receives the enemy spell C, the size of the judgment ring 100 is halved.

(4) When the main character receives the enemy spell D, the size of the judgment ring 100 is doubled, but the range of each timing area on the judgment ring 100 is halved.

(5) When the main character receives the enemy spell E, the size of the judgment ring 100 is doubled, but the rotation speed of the rotation bar 101 changes irregularly as it is increased or decreased. In this case, if the player can well operate the O button 12, the attack power remains the usual attack power although it is tripled with the item I.

(6) When the main character receives the enemy spell F, the range of each timing area, the rotation speed of the rotation bar 101, and the size of the judgment ring 100 are determined at random in the range of half to double.

The EVENT TYPE set as the judgment ring correction parameter is an event that the main character party fights a battle with a specific enemy character. When the event occurs, the display mode of the judgment ring 100 becomes a disadvantageous state to the player. In the "judgment ring correction parameter table," four event types (intermediate bosses A to C and wrath boss) are set in the judgment ring correction parameter EVENT TYPE.

The advantages produced when the event types occur are as follows:

(1) The event type INTERMEDIATE BOSS A is an event that the main character party encounters INTERMEDIATE BOSS A, one type of enemy boss character, and fights a battle therewith. When the event occurs, the rotation speed of the rotation bar 101 is doubled.

(2) The event type INTERMEDIATE BOSS B is an event that the main character party encounters INTERMEDIATE BOSS B, one type of enemy boss character, and fights a battle therewith. When the event occurs, the range of each timing area is halved.

(3) The event type INTERMEDIATE BOSS C is an event that the main character party encounters INTERMEDIATE BOSS C, one type of enemy boss character, and fights a battle therewith. When the event occurs, the range of each timing area is halved and further the rotation speed of the rotation bar 101 changes irregularly as it is increased or decreased.

(4) The event type WRATH BOSS is an event that the main character party encounters WRATH BOSS, one type of enemy boss character, and fights a battle therewith. When the event occurs, the range of each timing area is halved.

The boss character is an enemy character for enabling the player to acquire a very large number of experience points as the player beats the boss character, as compared with the normal enemy character and therefore the display mode of the judgment ring 100 becomes a state in which the player is hard to operate the O button 12, as described above.

Judgment Decision Processing

Figure 48:
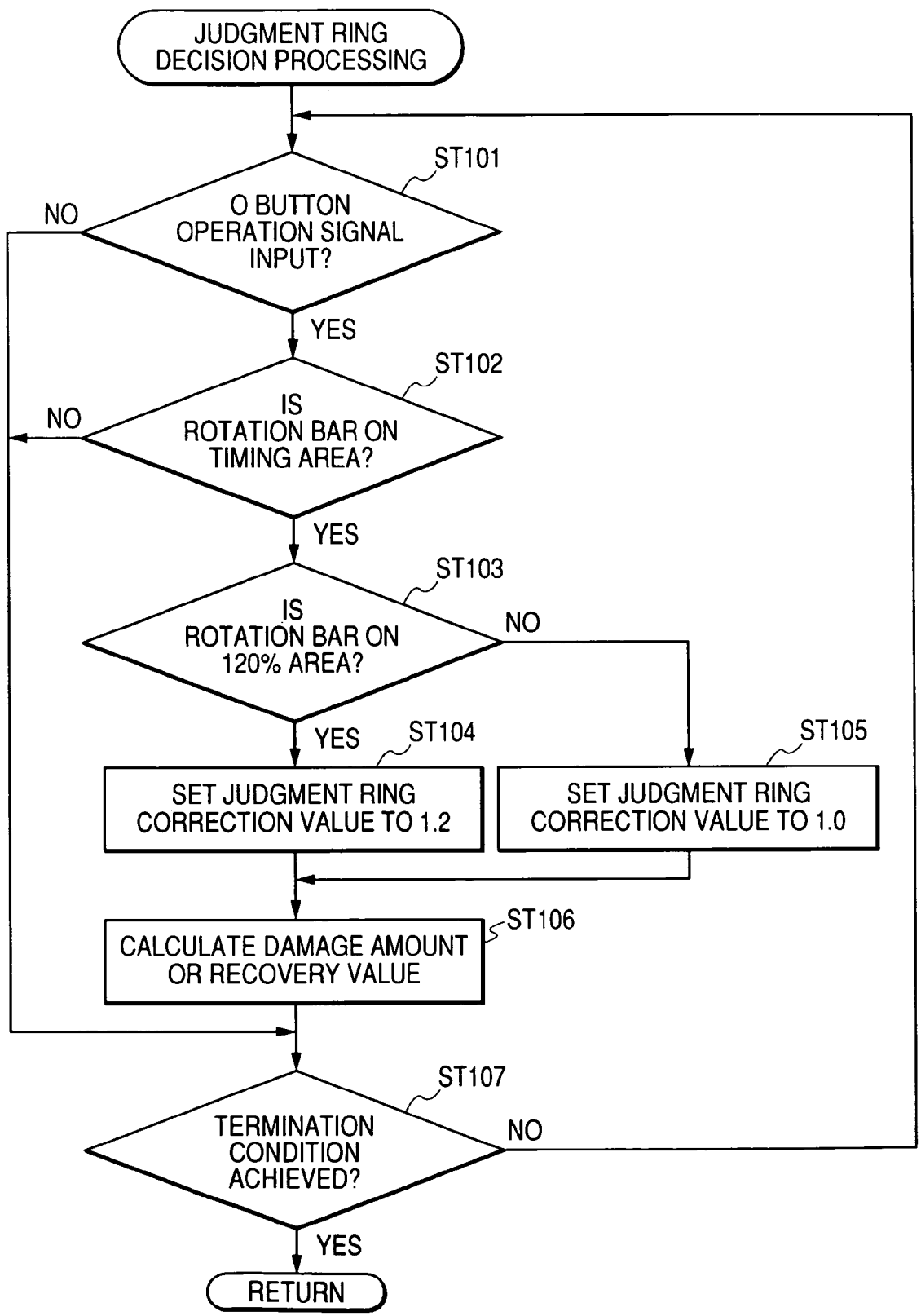
FIG. 48 is a flowchart to show a procedure of judgment ring decision processing.

The judgment decision processing will be discussed with FIG. 48.

First, the CPU 21 displays the judgment ring 100 determined at ST225 and the rotation bar 101 on the screen 16 as variable display area. The CPU 21 displays the rotation bar 101 so that the rotation bar 101 rotates (varies).

The CPU 21 determines whether or not a O button operation signal is input (ST101). In the processing, if the player operates the O button 12, the CPU 21 receives an entry operation signal of the O button 12 from the controller 4 and determines that the O button operation signal is input. If the CPU 21 determines that the O button operation signal is input, the process proceeds to ST102. On the other hand, if the CPU 21 does not determine that the O button operation signal is input, the process proceeds to ST107.

AT ST102, the CPU 21 determines whether or not the rotation bar 101 is on any of the timing areas. In the processing, the CPU 21 determines whether or not the display mode is a mode in which the rotation bar 101 is on any of the timing areas upon reception of the entry operation signal from the controller 4 at ST101. This means that the CPU 21 determines whether or not the timing at which the player operated the O button 12 is a specific timing. The CPU 21 for determining the processing corresponds to matching determination section for determining the matching between the timing of player's entry operation through the controller 4 performed when the display mode of the variable display area changes and the display mode.

If the CPU 21 determines that the rotation bar 101 is on any of the timing areas, the process proceeds to ST103. On the other hand, if the CPU 21 does not determine that the rotation bar 101 is on any of the timing areas, the process proceeds to ST107.

At ST103, the rotation bar 101 is on a 120% area is determined. In the processing, the CPU 21 determines whether or not the display mode is a mode in which the rotation bar 101 is on any of the 120% areas of the judgment ring 100 upon reception of the entry operation signal from the controller 4 at ST101. This means that the CPU 21 determines whether or not the timing at which the player operated the O button 12 is a specific timing.

If the CPU 21 determines that the rotation bar 101 is on any of the 120% areas, the CPU 21 sets the judgment correction value 1.2 in the predetermined area of the RAM 23 (ST104) and the process proceeds to ST106. On the other hand, if the CPU 21 does not determine that the rotation bar 101 is on any of the 120% areas, the CPU 21 sets the judgment correction value 1 in the predetermined area of the RAM 23 (ST105) and the process proceeds to ST106.

At ST106, the damage amount or the recovery value is calculated. In the processing, the CPU 21 calculates the damage amount or the recovery value according to the predetermined calculation expression based on the selected command, the type of ally character, and the used item, and sets the calculation result in a predetermined area of the RAM 23. The CPU 21 for executing the processing corresponds to attack effect calculation section, when consecutive attack hit determination section determines that attack hits the enemy character at consecutive times, for calculating the effect of damage from each of the attacks hitting the enemy character at consecutive times.

At ST107, whether or not the display termination condition of the judgment ring 100 is achieved is determined. The termination condition is (1) consumption of the specified number of revolutions (which is usually one; may increase in response to the judgment ring correction parameter) or (2) consumption of the specified number of observation push times (which is usually three; may change in response to various parameters). The CPU 21 detects and determines whether or not the termination condition is satisfied. If the CPU 21 determines that the termination condition is satisfied, the subroutine is exited. On the other hand, if the CPU 21 does not determine that the termination condition is satisfied, the process returns to ST101.

Consecutive Attack Set Processing

Figure 49:
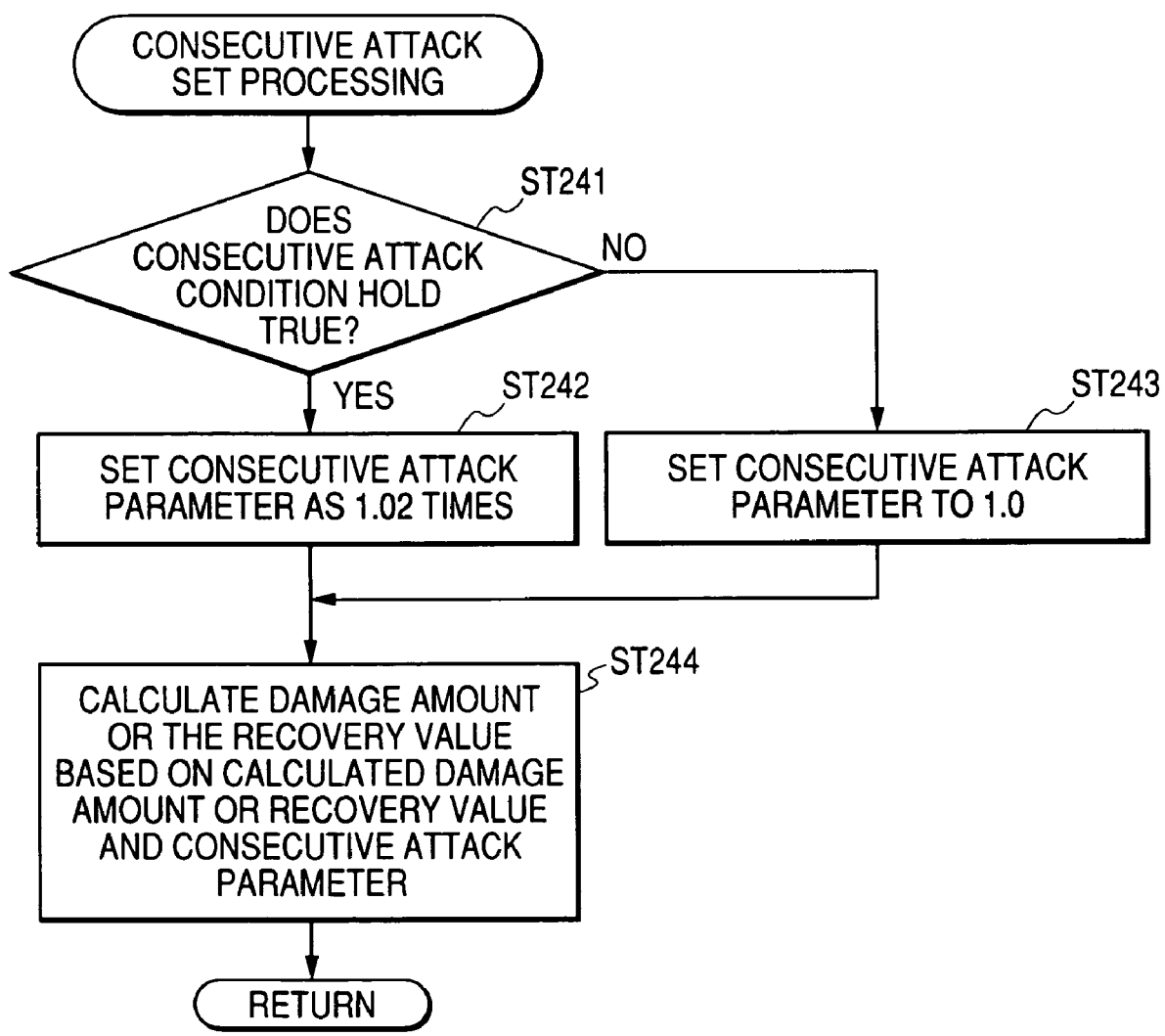
FIG. 49 is a flowchart to show a procedure of consecutive attack set processing.

The "consecutive attack set processing" will be discussed with FIG. 49.

First, a consecutive attack condition is satisfied is determined (ST241). In the processing, the CPU 21 determines whether or not the action executed according to the "judgment ring decision processing" becomes consecutive attack. If the attack at this time is executed consecutively with the preceding action ("combo attack"), the CPU 21 also determines that the consecutive attack condition (which is also combination condition) is satisfied. If the CPU 21 determines that the consecutive attack condition is satisfied, the process proceeds to ST242. On the other hand, if the CPU 21 does not determine that the consecutive attack condition is satisfied, the process proceeds to ST243.

At ST242, a consecutive attack parameter is set as 1.02 times. In the processing, the CPU 21 reads the consecutive attack parameter stored in a predetermined area of the RAM 23. The CPU 21 multiplies the read consecutive attack parameter by 1.02 for each of the consecutive attacks executed according to the "judgment ring decision processing" and stores the result in the predetermined area of the RAM 23.

Specifically, when a determination is made so as to make three consecutive attacks in combination attack of enemy characters, the CPU 21 reads the consecutive attack parameter before consecutive attack. When the read consecutive attack parameter is "1.0404" (the result of making two consecutive attacks by the enemy characters taking the preceding action), the CPU 21 calculates "1.0404"ד1.02"="1.061208" and stores the result in the predetermined area of the RAM 23 as the consecutive attack parameter for the first consecutive attack. Then, the CPU 21 calculates "1.061208"ד1.02"="1.08243216" and stores the result in the predetermined area of the RAM 23 as the consecutive attack parameter for the second consecutive attack. Subsequently, the CPU 21 calculates "1.08243216"ד1.02"="1.1040808032" and stores the result in the predetermined area of the RAM 23 as the consecutive attack parameter for the third consecutive attack. Upon completion of the processing, the process proceeds to ST244.

The multiplication result of multiplying the parameter by 1.02 is stored, but another mode may be adopted if increment operation is performed. For example, the multiplication result of multiplying the parameter by a predetermined value (greater than 1.0) rather than 1.02 may be stored or the addition result rather than the multiplication result may be stored.

At ST243, the consecutive attack parameter is set as 1.0. In the processing, the CPU 21 stores the consecutive attack parameter 1.0. That is, if the CPU does not determine at ST241 that the consecutive attack condition is satisfied, the CPU 21 stores the reference value 1.0 as the consecutive attack parameter. Upon completion of the processing, the process proceeds to ST244.

At ST244, the damage amount or the recovery value is calculated based on the calculated damage amount or recovery value and the consecutive attack parameter. In the processing, the CPU 21 reads the damage amount or the recovery value stored in the predetermined area of the RAM 23 at ST106. The CPU 21 reads the consecutive attack parameter stored at ST242 or ST243. The CPU 21 stores the multiplication result of multiplying the damage amount or the recovery value by the consecutive attack parameter in a predetermined area of the RAM 23 for each action. Accordingly, the effect of damage from the attack calculated can be increased. The CPU 21 for executing the processing corresponds to consecutive hit effect increase section for increasing the effect of damage from the attack calculated by the attack effect calculation section if the consecutive attack hit determination section determines that attack hits the enemy character at consecutive times. Upon completion of the processing, the subroutine is exited.

Action Selection Processing

The "action selection processing" will be discussed with FIG. 50.

Figure 50:
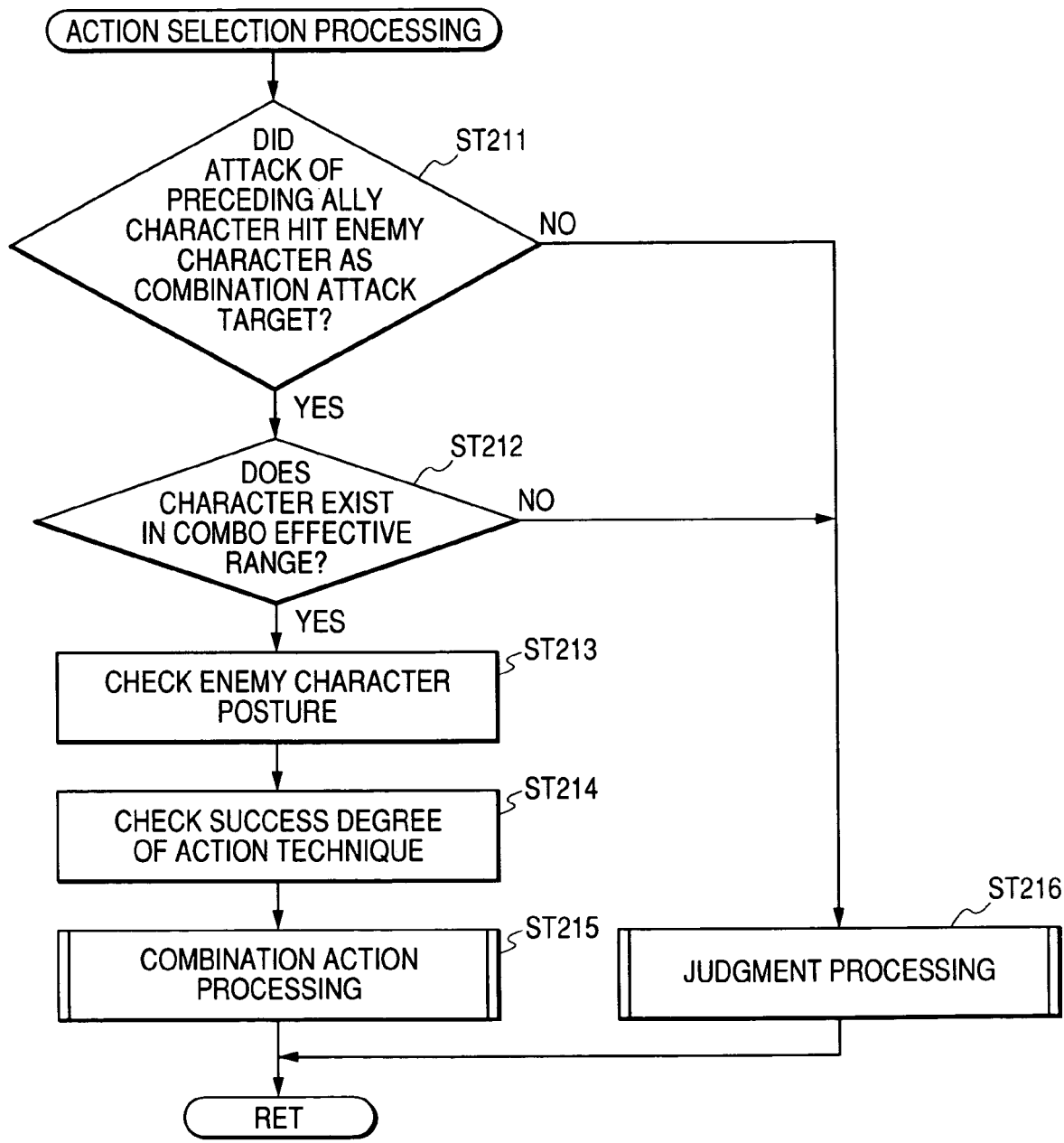
FIG. 50 is a flowchart to show a procedure of action selection processing.

As shown in FIG. 50, first, whether or not attack hit the enemy character as the combination attack target is determined (ST211). To make attack consecutively with the ally character making the preceding attack, the CPU 21 determines whether or not the attack of the ally character hit the enemy character as the combination attack target. If the CPU 21 determines that the attack hit the enemy character as the combination attack target, the process proceeds to ST212. On the other hand, if the CPU 21 does not determine that the attack hit the enemy character as the combination attack target, the process proceeds to ST216.

At ST212, whether or not an ally character exists in the combination attack effective range 120 is determined. In the processing, the CPU 21 reads the position information of the ally character from the predetermined area of the RAM 23. To make attack consecutively with the ally character making the preceding attack, the CPU 21 compares the position information of the ally character making the preceding attack with the position information of another ally character, thereby determining whether or not an ally character exists in the combination attack effective range 120. Predetermined combination condition may be satisfied according to the fact that an ally character is positioned in the combination attack effective range 120. If the CPU 21 determines that an ally character exists in the combination attack effective range 120, the process proceeds to ST213. On the other hand, if the CPU 21 does not determine that an ally character exists in the combination attack effective range 120, the process proceeds to ST216.

At ST213, the enemy character posture is checked. The posture check is the damage display mode responsive to the action of attack, etc., previously executed ("beaten posture"). The damage display mode is determined in response to the type of attack or the skill, the weight, etc., of the enemy character. Predetermined combination condition may be satisfied according to the fact that the damage display mode of the enemy character to be attacked is a predetermined damage display mode.

Description of Action for Changing Damage Display Mode

The types of actions for changing the damage display mode will be discussed with FIG. 51. FIG. 51 is a schematic representation to show actions set for the ally character A 111.

As shown in FIG. 51, specific attacks are set for the ally character A 111. The specific attacks include various attack types of physical attack, spell, fusion, etc. The attack target range, the damage display mode of target character, the damage display mode after attack, and the maximum number of hits are set for each specific attack.

The attack target range indicates the attack range with the enemy character of the attack target as the reference. The shapes of the attack target ranges include, for example, large circle (see FIG. 75), medium circle, small circle, large straight line (see FIG. 78), medium straight line, small straight line, large through shape (see FIG. 77), medium through shape, small through shape, large sector (see FIG. 76), medium sector, small sector, single unit, whole. Specifically, medium circle, large circle having larger radius than medium circle, small circle having smaller radius than medium circle, medium sector, large sector having larger radius and angle than medium sector, small sector having smaller radius and angle than medium sector, medium straight line, large straight line winder than medium straight line, small straight line narrower than medium straight line, medium through shape provided by combining medium circle and medium straight line, large through shape provided by combining large circle and large straight line, small through shape provided by combining small circle and small straight line, and the like are set as described above. That is, any of the different types of attack ranges is set for each of the different types of attacks and is stored. In FIGS. 75 to 78, the turn order and the ally character are not shown. The table is stored in the DVD-ROM 31 and is stored in the predetermined area of the RAM 23 by the CPU 21. That is, the CPU 21 for loading the table corresponds to attack range storage section for storing any of the different types of attack ranges for each of the different types of attacks.

The damage display mode of target character indicates the damage display mode of the enemy character to be attacked, and the execution possibility of attack varies depending on the damage display mode and the setting of the enemy character as the actual attack target.

The damage display mode after attack indicates the possible damage display mode of the attacked enemy character after execution of attack. As the damage display mode after attack, the attacked enemy character may become the damage display mode in response to the skill of the ally character executing attack and the skill, the weight, etc., of the enemy character.

The maximum number of hits means the maximum number of times a specific attack can hit in execution of the specific attack. Thus, the number of the timing areas of the judgment ring 100 is determined in response to the maximum number of hits. All attacks responsive to the maximum number of hits do not necessarily hit depending on the time during combo attack described later.

Thus, specific attack is set for the ally character A 111 and as the specific attack is executed, the damage display mode is determined in response to the position information of the ally character and combo attack can be developed advantageously.

Thus, to make attack consecutively with the previously attacking ally character, the CPU 21 reads the damage display mode of the enemy character subjected to the combination attack by the ally character ("beaten posture"). Upon completion of the processing, the process proceeds to ST214.

At ST214, the success degree of action technique is checked. In the processing, the CPU 21 reads the success degree of action technique. Specifically, the possibility of hit (execution) of each attack is represented in response to the damage display mode. Upon completion of the processing, the process proceeds to ST215.

At ST215, "combination action processing" is executed. In the processing, the CPU 21 selects combination attack and executes consecutive attack. The "combination action processing" is described later in detail. When the "combination action processing" is exited, the subroutine of the "action selection processing" is exited.

At ST216, "judgment processing" is executed. In the processing, the CPU 21 executes the "judgment processing." Accordingly, the CPU 21 selects action when combination attack is not applied, and executes the selected action. When the "judgment processing" is exited, the subroutine of the "action selection processing" is exited.

Combination Action Processing

The "combination action processing" will be discussed with FIG. 52. Steps similar to those of the "judgment processing" previously described with reference to FIG. 27 are denoted by the same step numbers in FIG. 52 to simplify the description of the "combination action processing."

Figure 52:
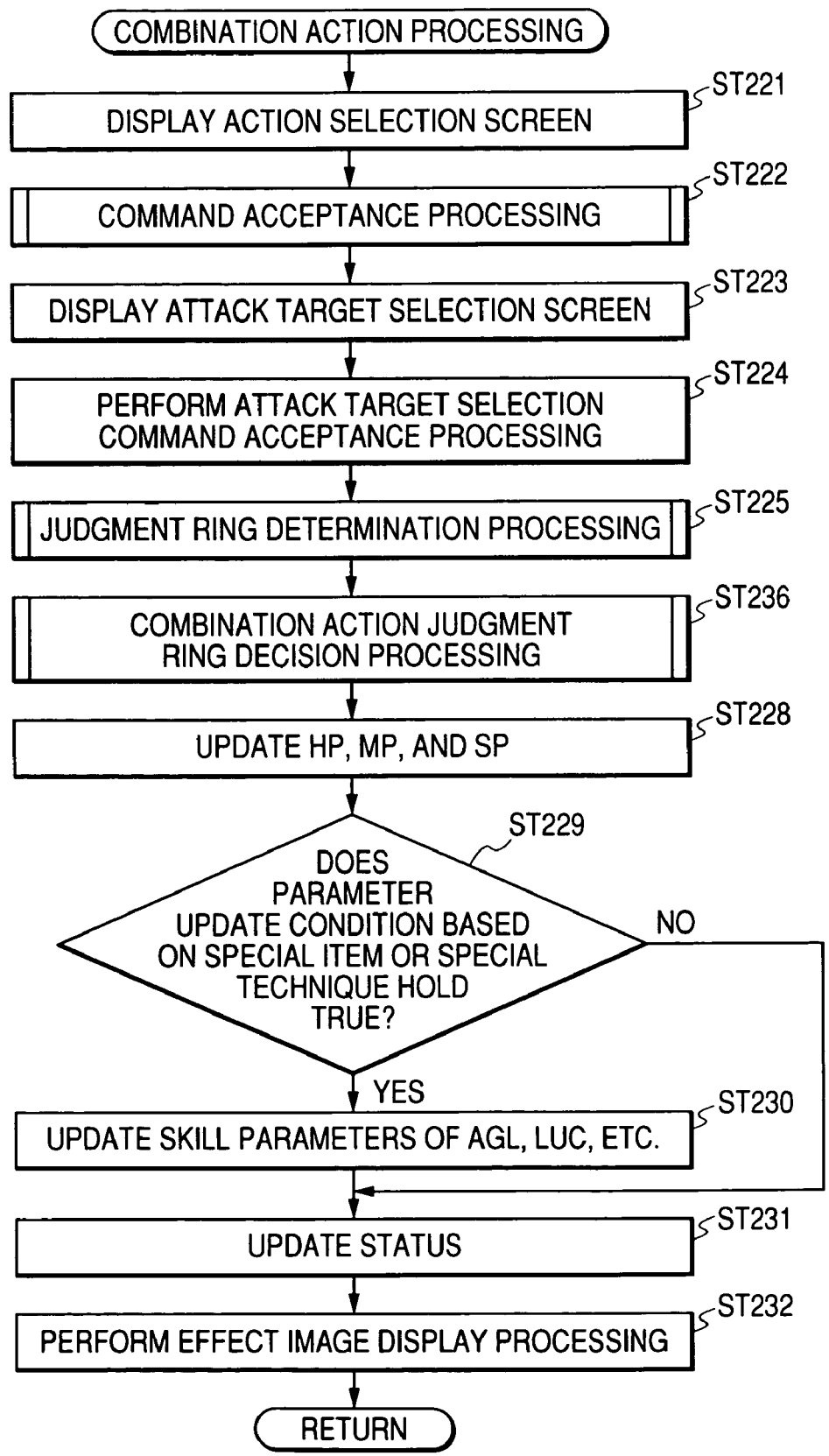
FIG. 52 is a flowchart to show a procedure of combination action processing.

As shown in FIG. 52, first, the CPU 21 displays an action selection on the screen 16 (ST221) and executes "command acceptance processing" (ST222). The CPU 21 displays an action target selection screen as shown in FIG. 28 on the screen 16 (ST223), and executes action target selection command acceptance processing (ST224). Subsequently, the CPU 21 executes "judgment ring determination processing" (ST225). When the processing is exited, the process is returned to ST236.

At ST236, "combination action judgment ring decision processing" is executed. In the processing, the CPU 21 determines the action of attack, etc., in response to player's entry operation through the controller 4. The "combination action judgment ring decision processing" is described later in detail. When the processing is exited, the process is returned to ST228.

At ST228, the CPU 21 updates HP, MP, and SP. Then, the CPU 21 determines whether or not a parameter update condition based on a special item or a special technique is satisfied (ST229). If the CPU 21 determines that the parameter update condition based on the special item or the special technique is satisfied, the CPU 21 updates the individual skill parameters of AGL, LUC, etc., (ST230), and the process proceeds to ST231. On the other hand, if the CPU 21 does not determine that the parameter update condition based on the special item or the special technique is satisfied, the process proceeds to ST231. At ST231, the CPU 21 updates the status. Then, the CPU 21 displays an effect image (ST213). Upon completion of the processing, the subroutine is exited.

Combination Action Judgment Ring Decision Processing

Figure 53:
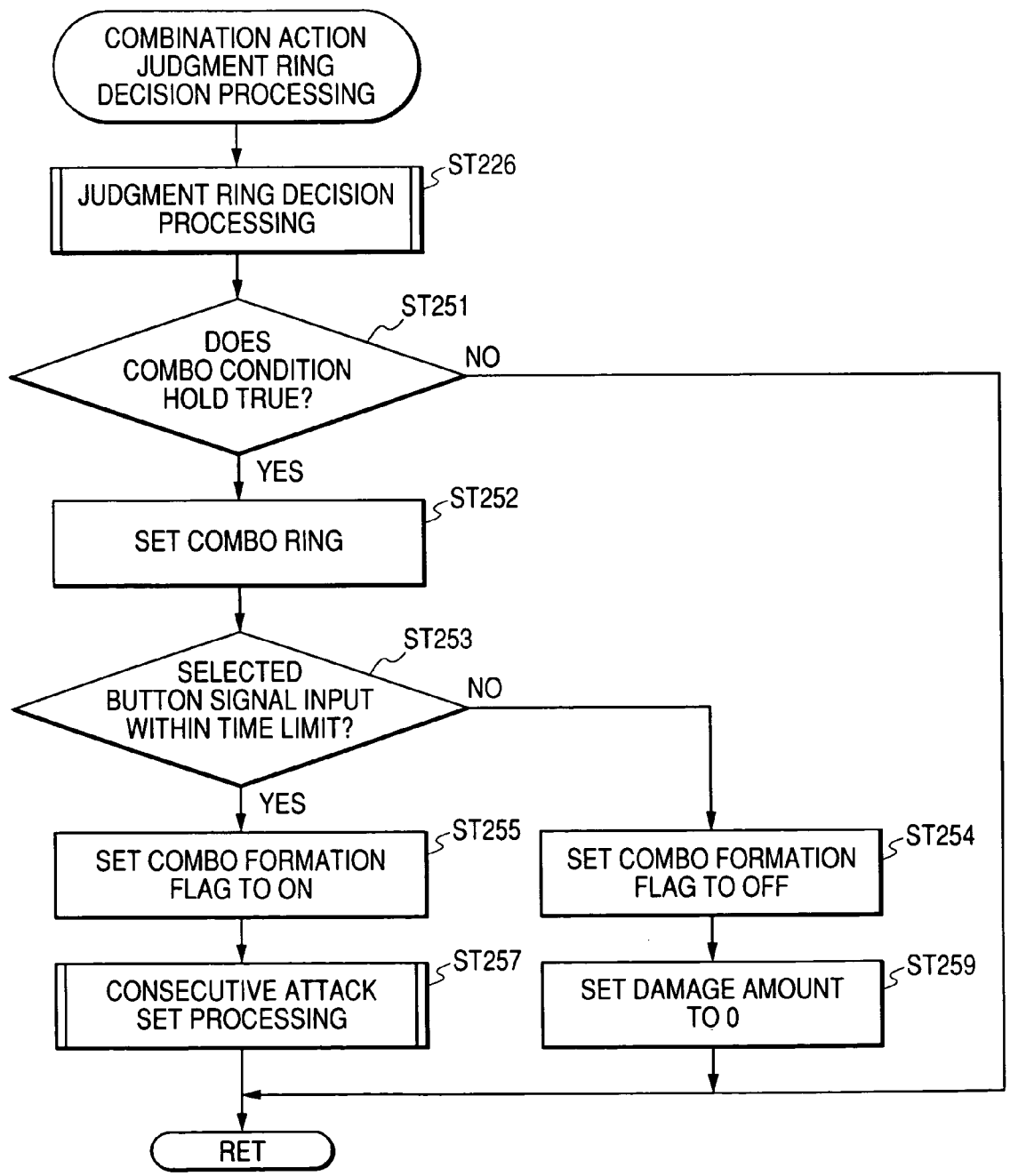
FIG. 53 is a flowchart to show a procedure of combination action judgment ring decision processing.

The "combination action judgment ring decision processing" will be discussed with FIG. 53.

First, "judgment ring decision processing" is executed (ST226). In the processing, the CPU 21 executes the above-described "judgment ring decision processing." The CPU 21 for executing the processing corresponds to consecutive attack execution section for another ally character to attack the enemy character. When the processing is exited, the process is returned to ST251.

At ST251, whether or not a combo condition (consecutive and combination action execution condition, namely, consecutive condition and combination condition) is satisfied is determined. In the processing, the CPU 21 determines that the combo condition is satisfied if the rotation bar 101 is displayed in every timing area (effective area) in the judgment ring 100 in response to an entry operation signal of the controller 4 based on the result of the "judgment ring decision processing" executed at ST226. That is, the CPU 21 determines whether or not the timing of player's entry operation through the operation unit performed while the display mode of the variable display area for consecutive attack changes is a predetermined timing. The CPU 21 for executing the processing corresponds to the consecutive attack hit determination section for determining whether or not attack hits the enemy character at consecutive times based on the determination result of the matching determination section. The consecutive attack hit determination section has a function of determining whether or not attack executed by one or more characters hits the enemy character at consecutive times based on the determination result of the matching determination section. If the CPU 21 determines that the combo condition is satisfied, the process proceeds to ST252. On the other hand, if the CPU 21 does not determine that the combo condition is satisfied, the process proceeds to ST254.

At ST252, a combo ring is set. In the processing, the CPU 21 sets a combo ring in response to the type of selected action (combo). Specifically, the CPU 21 sets the display mode of displaying the combo ring, such as the display time for displaying the combo ring and a button image displayed in the combo ring, in response to the type of selected action. Upon completion of the processing, the process proceeds to ST253.

Figure 54:
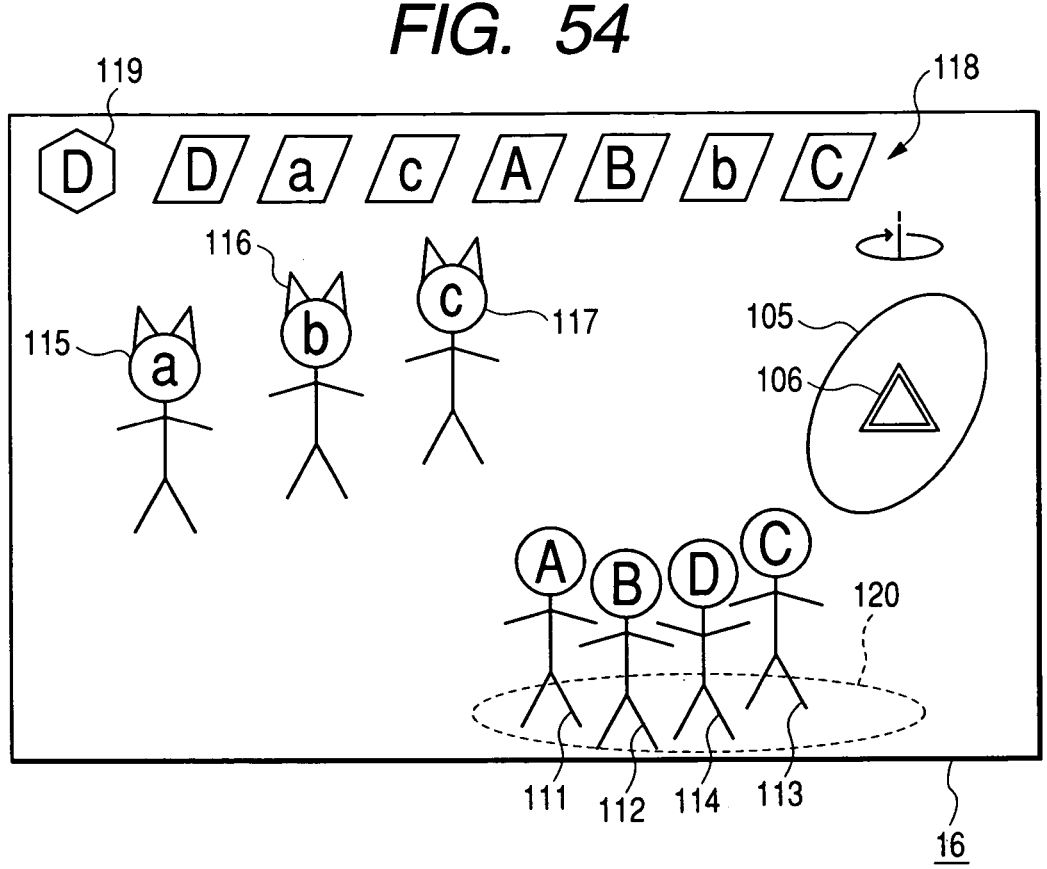
FIG. 54 is a drawing to show the display mode of a combo ring.

At ST253, whether or not a selected button signal has been input within the time limit is determined. In the processing, the CPU 21 displays the combo ring set at ST252, as shown in FIG. 54. If the CPU 21 determines that a selected button signal has been input within the time limit, the process proceeds to ST255. On the other hand, if the CPU 21 does not determine that a selected button signal has been input within the time limit, the process proceeds to ST254. That is, the CPU 21 for executing the processing corresponds to combination condition determination section for determining whether or not player's entry operation through the operation unit has been performed as predetermined entry operation displayed on the screen within the time limit. When the combination condition determination section determines that player's entry operation through the operation unit has been performed as predetermined entry operation displayed on the screen within the time limit, it means that predetermined combination condition is satisfied. That is, determining that player's entry operation through the operation unit has been performed as predetermined entry operation displayed on the screen within the time limit is an example of the predetermined combination condition.

At ST254, the combo formation flag is set to OFF. In the processing, the CPU 21 sets the combo formation flag stored in the predetermined area of the RAM 23 to OFF and stores the combo formation flag set to OFF. Then, the CPU 21 sets the damage amount calculated and stored in the predetermined area of the RAM 23 to 0 (ST259). Upon completion of the processing, the subroutine is exited.

At ST255, the combo formation flag is set to ON. In the processing, the CPU 21 sets the combo formation flag stored in the predetermined area of the RAM 23 to ON and stores the combo formation flag set to ON. The CPU 21 for executing the processing corresponds to section for setting so that another ally character attacks the enemy character. Upon completion of the processing, the process proceeds to ST257.

At ST257, "consecutive attack set processing" is executed. In the processing, the CPU 21 increases the damage amount according to the above-described "consecutive attack set processing." When the "consecutive attack set processing" is exited, the subroutine of the "combination action judgment ring decision processing" is exited.

Screen Display Description of Combination Action Processing

The screens displayed on the screen 16 when the "combination action processing" is thus executed will be discussed with FIGS. 11, 16, 28, and 54 to 74. In the description, a battle scene wherein the four ally characters (111 to 114) and the three enemy character (115 to 117) appear is taken as an example. The description is started at the battle state in which the three ally characters (111 to 114) gather in the combination attack effective range 120 as in FIG. 26.

Figure 11:
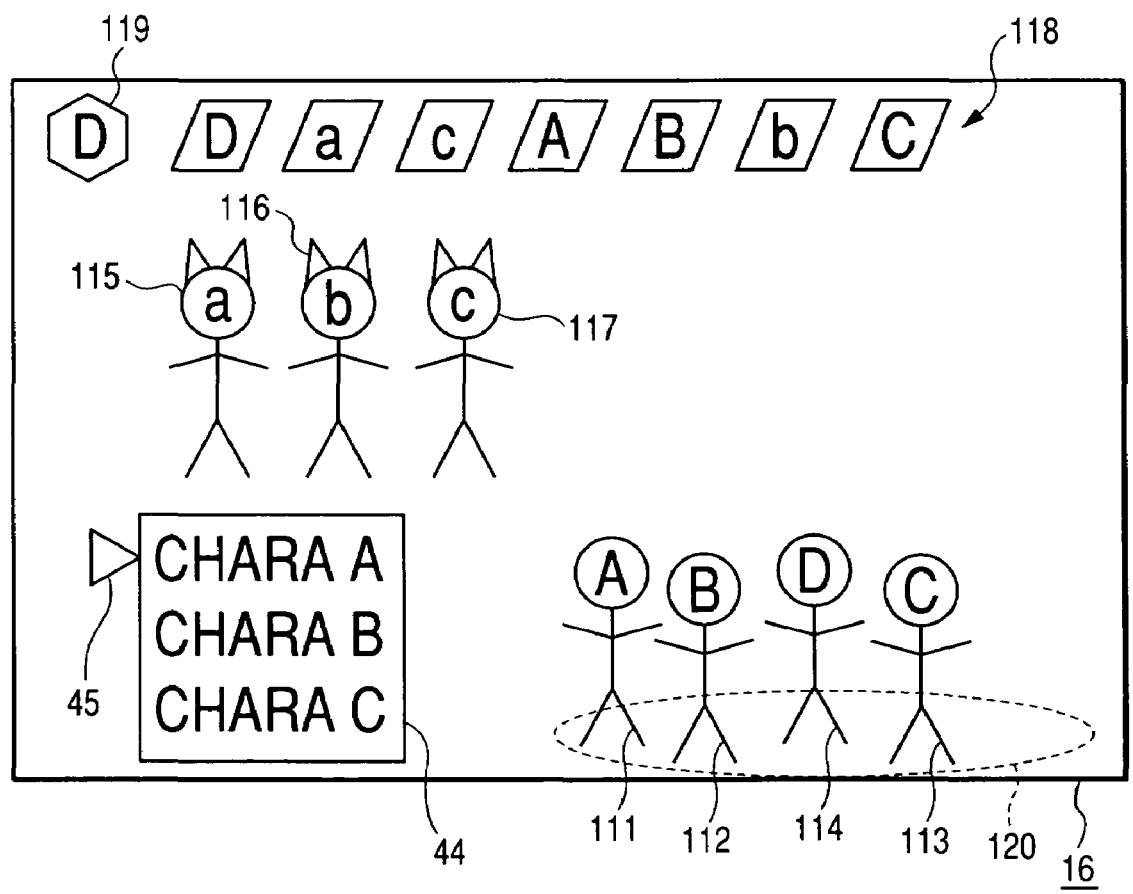
FIG. 11 is a drawing to show an action selection screen.
Figure 55:
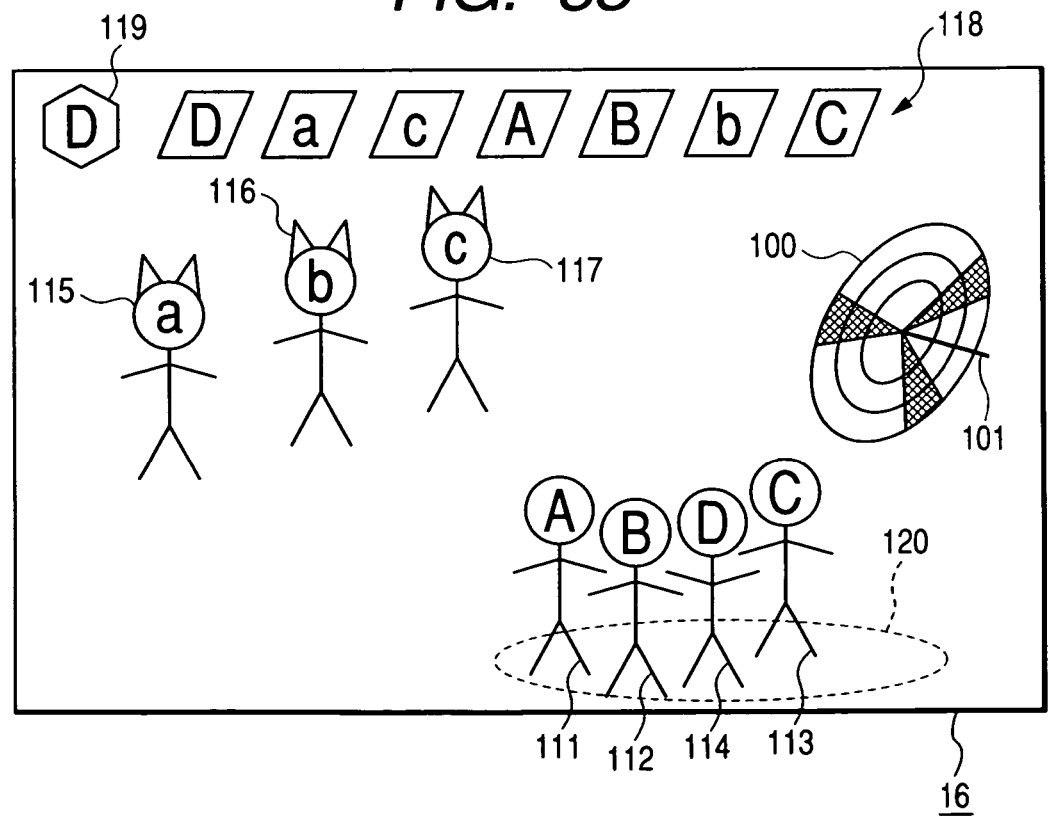
FIG. 55 is a drawing to show the display mode of the judgment ring after command determination.
Figure 56:
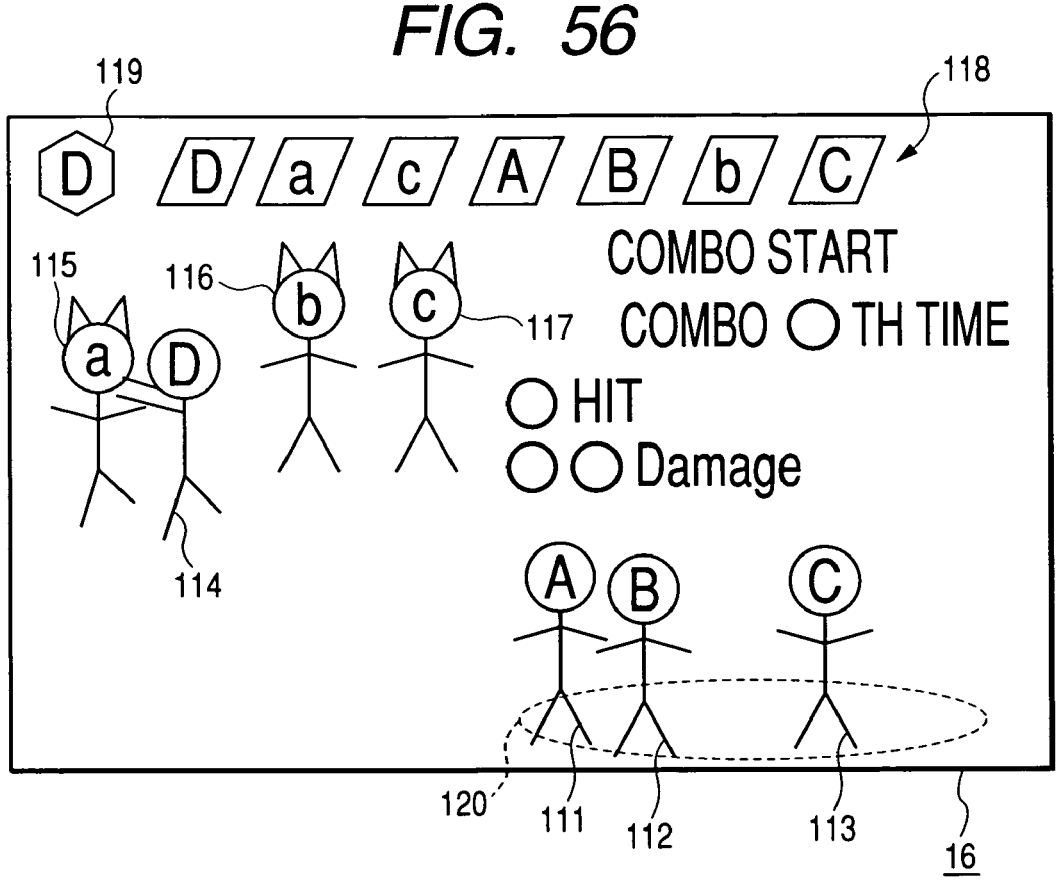
FIG. 56 is a drawing to show the display mode of combo attack.

An action command selection screen for the ally character D 114 is displayed as shown in FIG. 16. Action command selection is executed as the player operates the controller 4 (for example, a SPELL command is selected and then SPELL A is selected). An action target selection screen is displayed as shown in FIG. 28 and the target character as the action target is selected as the player operates the controller 4 (for example, ENEMY CHARACTER A is selected). Subsequently, as shown in FIG. 55, the judgment ring 100 and the rotation bar 101 are displayed in the variable display area of the screen 16, varying display of the rotation bar 101 is started, and action details (action success or failure, the number of action times, etc.,) are determined as the player operates the controller 4, as described above. A combo ring 105 for determining whether or not the combo is satisfied (is formed) is displayed so as to rotate in the variable display area of the screen 16, as shown in FIG. 54. A combo mark 106 to indicate the type of button provided on the controller 4 is displayed in the combo ring 105. When the player operates the button indicating the combo mark 106 within the time limit, the combo condition is satisfied and combo attack is executed as shown in FIG. 56. Next, when a plurality of ally characters exist in the proximity of the ally character D 114 executing the action, a screen for selecting the character to execute the next action from among the characters existing in the combination attack effective range 120 is displayed as shown in FIG. 11. The character to execute the next action is selected as the player operates the controller 4 (for example, ALLY CHARACTER A 111 is selected). As the attack is made, the damage display mode (a so-called "beaten posture", when attacked) of the enemy character A 115 is to be "float."

Figure 57:
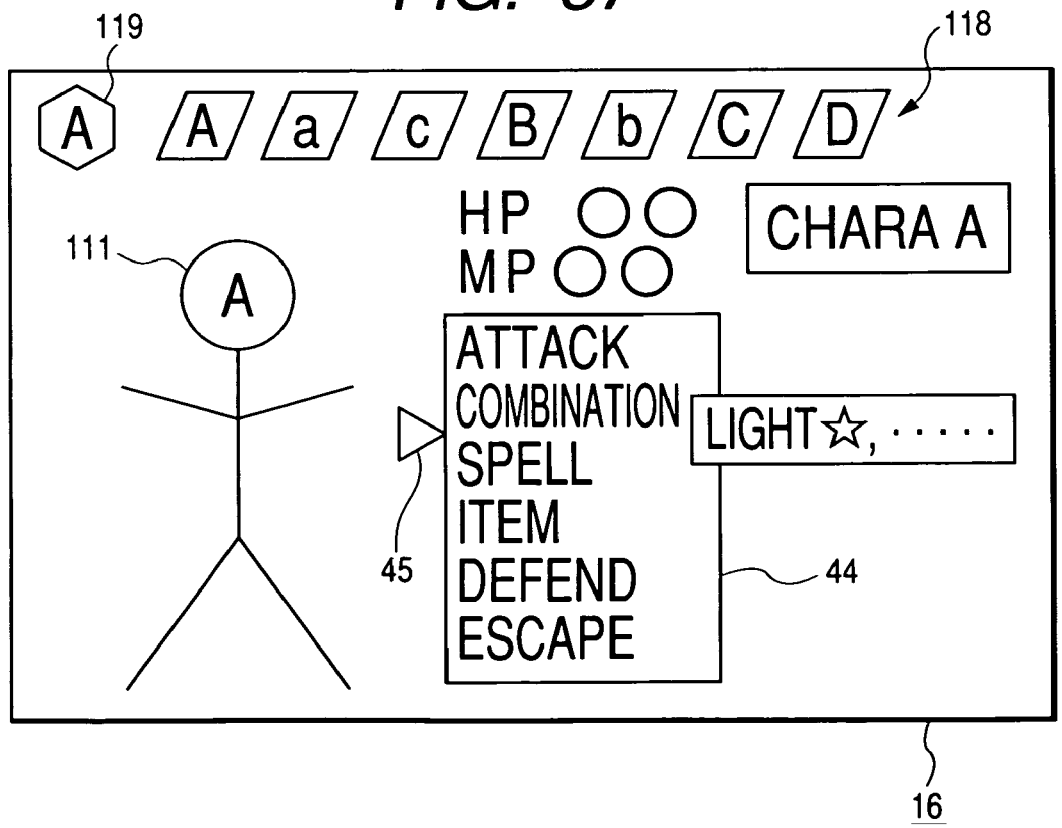
FIG. 57 is a drawing to show an action selection screen.
Figure 58:
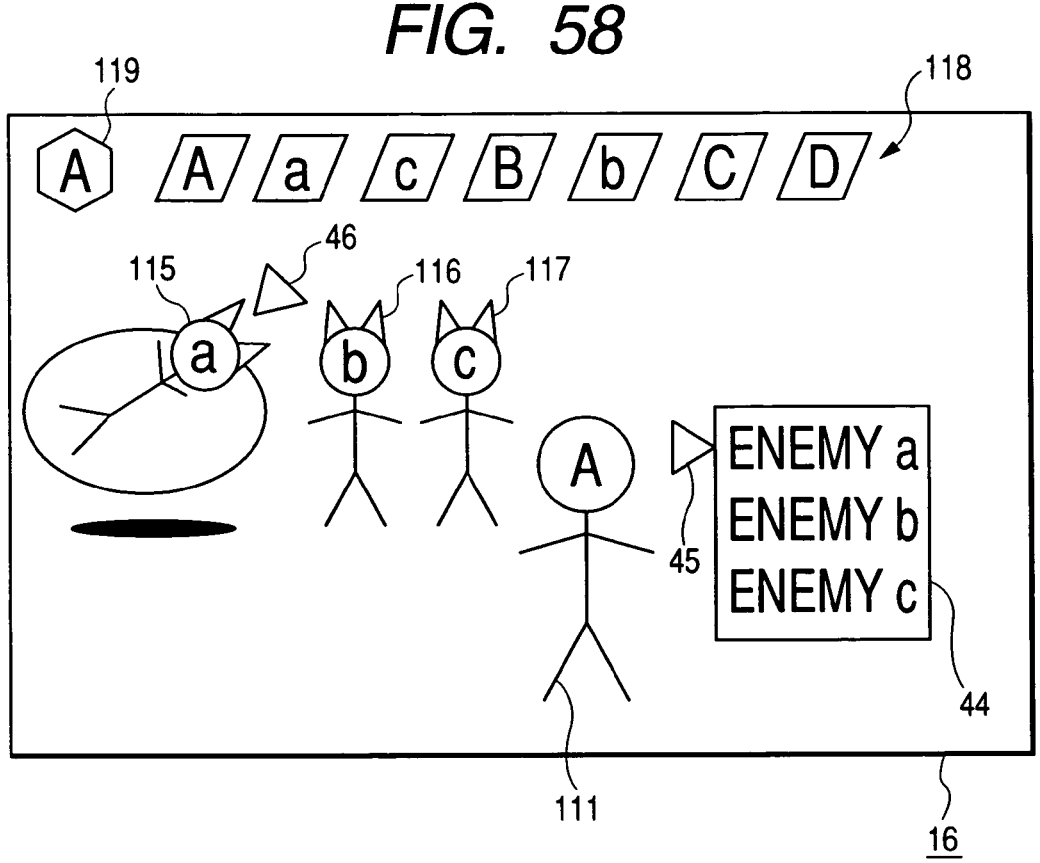
FIG. 58 is a drawing to show a move target selection screen.
Figure 59:
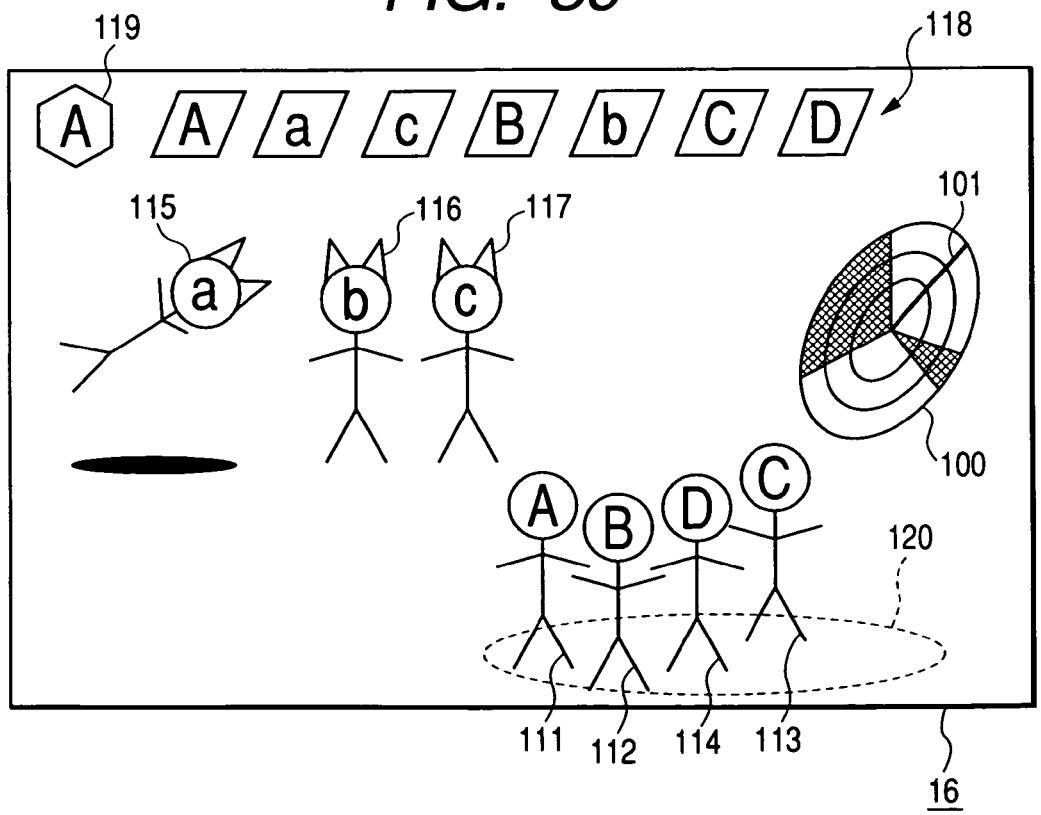
FIG. 59 is a drawing to show the display mode of the judgment ring after command determination.
Figure 60:
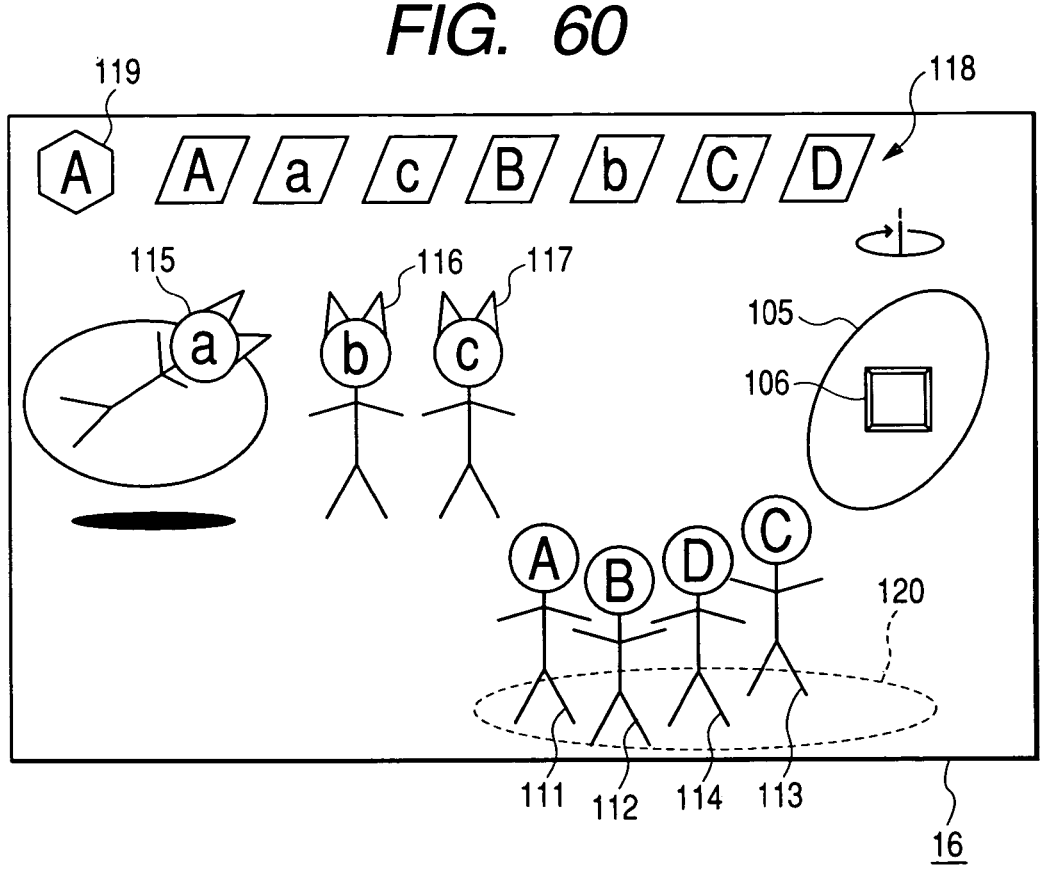
FIG. 60 is a drawing to show the display mode of the combo ring.
Figure 61:
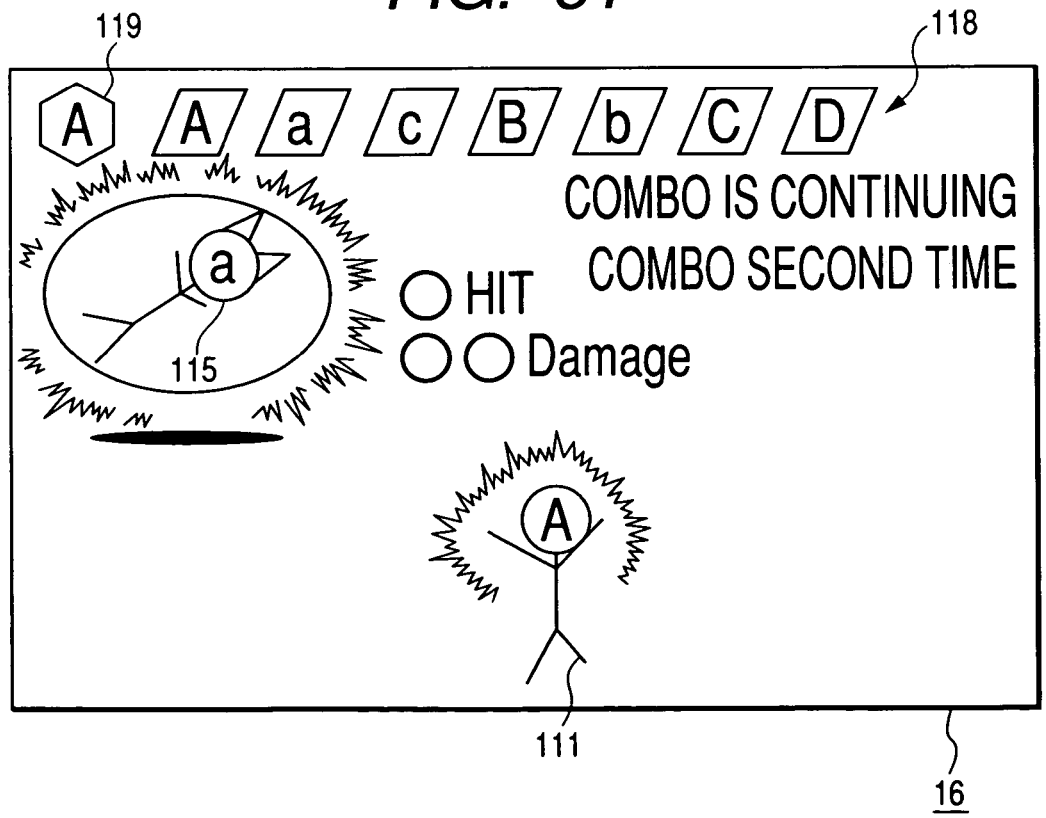
FIG. 61 is a drawing to show the display mode of combo attack.
Figure 62:
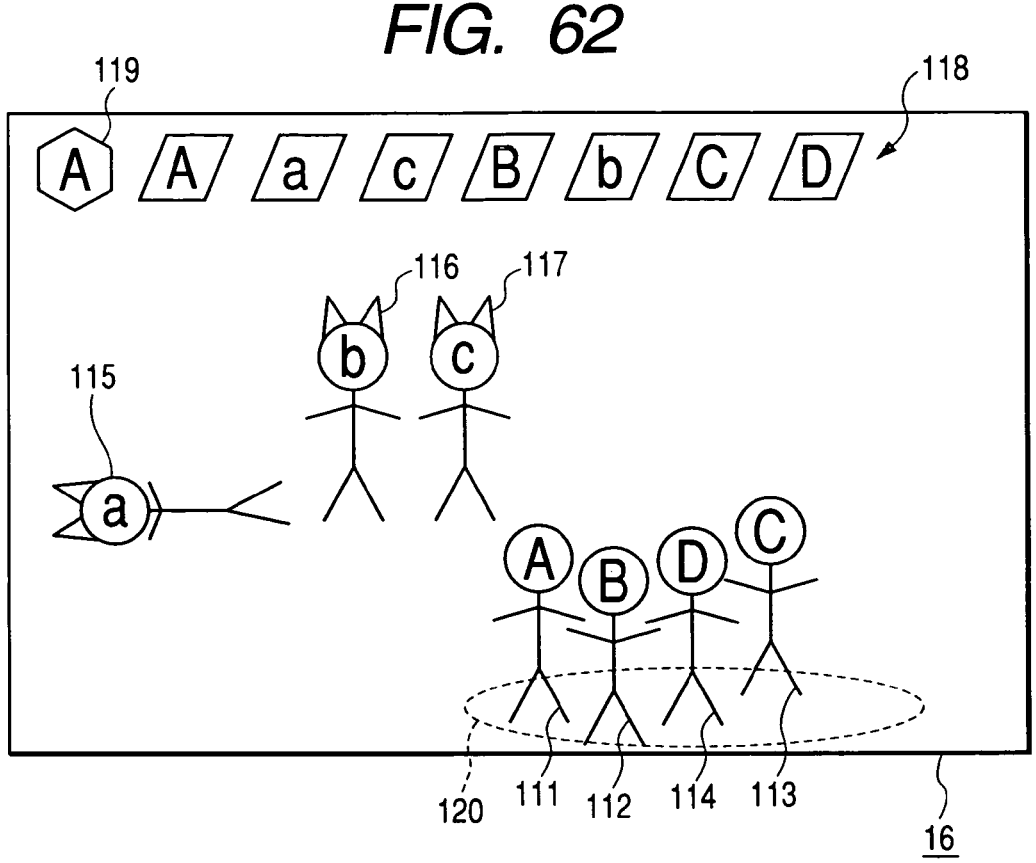
FIG. 62 is a drawing to show the display mode of combo attack.

An action command selection screen for the ally character A 111 is displayed as shown in FIG. 57. Action command selection is executed as the player operates the controller 4 (for example, a SPELL command is selected and then SPELL B is selected). Since the damage display mode of the enemy character A 115 is "float," the action corresponding to "anti-aircraft mode" becomes effective action. An action target selection screen is displayed as shown in FIG. 58 and the target character as the action target is selected as the player operates the controller 4 (for example, ENEMY CHARACTER A is selected). During combo attack, it is made possible to execute combo attack provided that action is applied to the enemy character A 115 previously attacked by the ally character D 114. Subsequently, as shown in FIG. 59, the judgment ring 100 and the rotation bar 101 are displayed in the variable display area of the screen 16, varying display of the rotation bar 101 is started, and action details (action success or failure, the number of action times, etc.,) are determined as the player operates the controller 4, as described above. The combo ring 105 for determining whether or not the combo is satisfied (is formed) is displayed so as to rotate in the variable display area of the screen 16, as shown in FIG. 60. When the player operates the button indicating the combo mark 106 within the time limit, the combo condition is satisfied and combo attack is executed as shown in FIG. 61. Next, when a plurality of ally characters exist in the proximity of the ally character A 111 executing the action, a screen for selecting the character to execute the next action from among the characters existing in the proximity of the ally character A 111 is displayed as shown in FIG. 62. The character to execute the next action is selected as the player operates the controller 4 (for example, ALLY CHARACTER C 113 is selected). As the attack is made, the damage display mode of the enemy character A 115 ("beaten posture") is "down."

Figure 63:
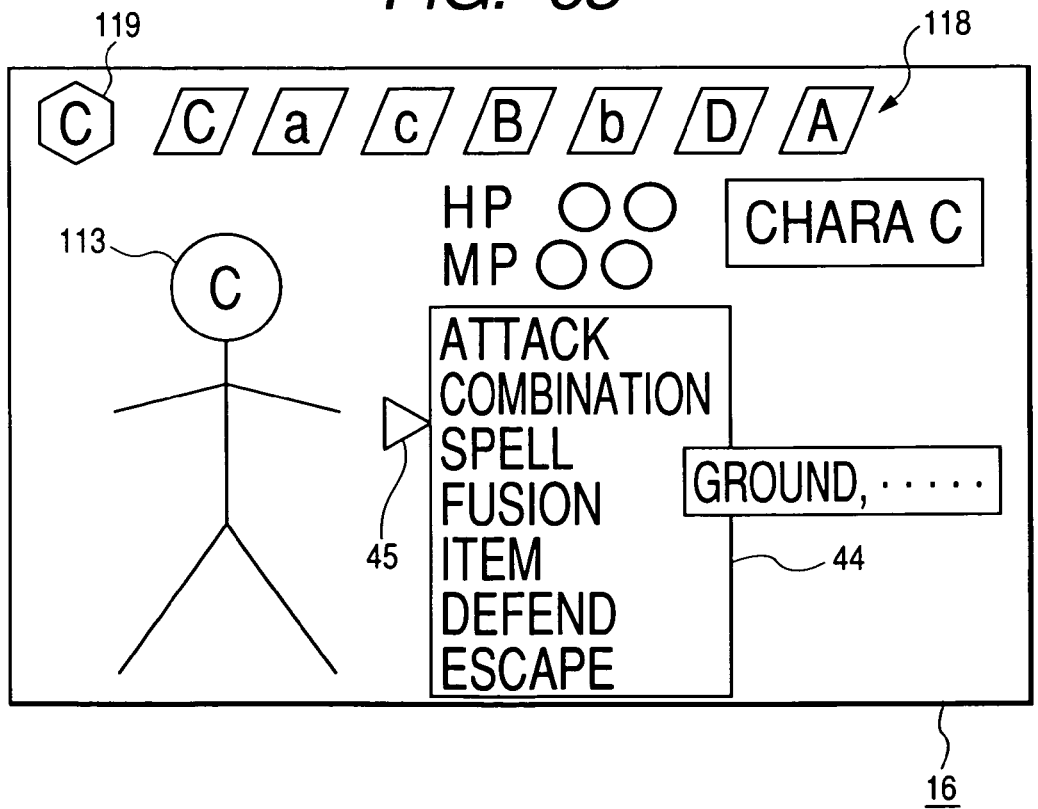
FIG. 63 is a drawing to show an action selection screen.
Figure 64:
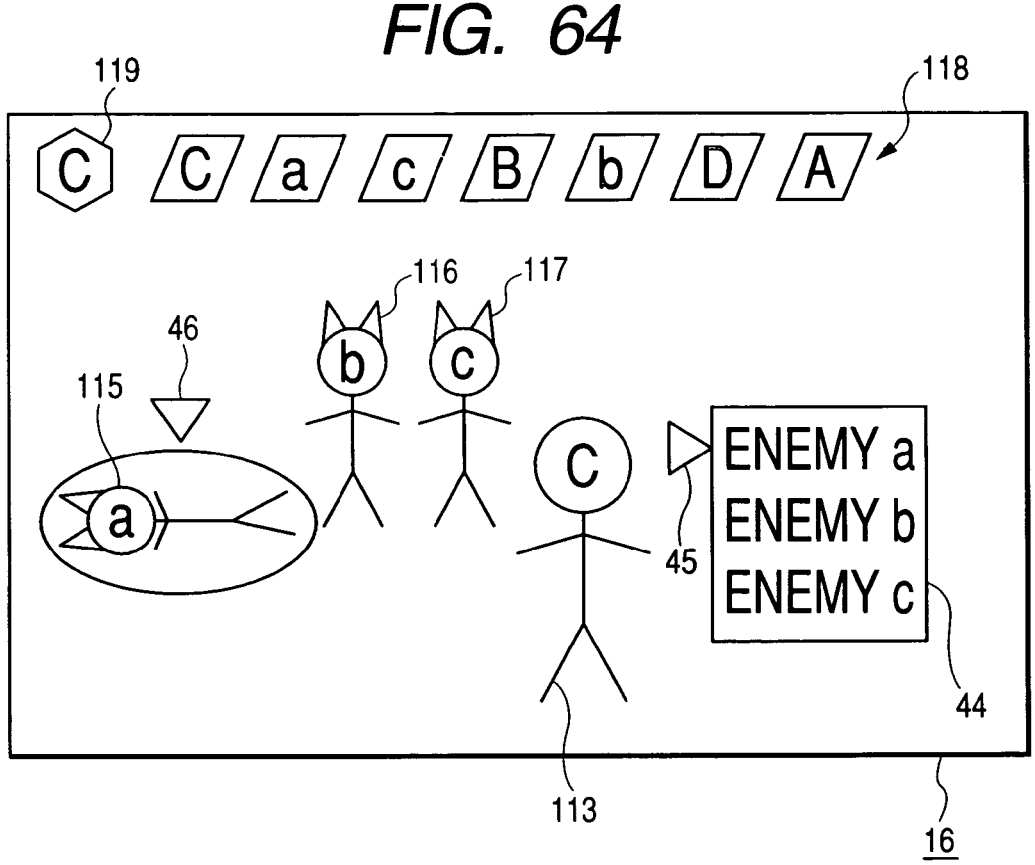
FIG. 64 is a drawing to show a move target selection screen.
Figure 65:
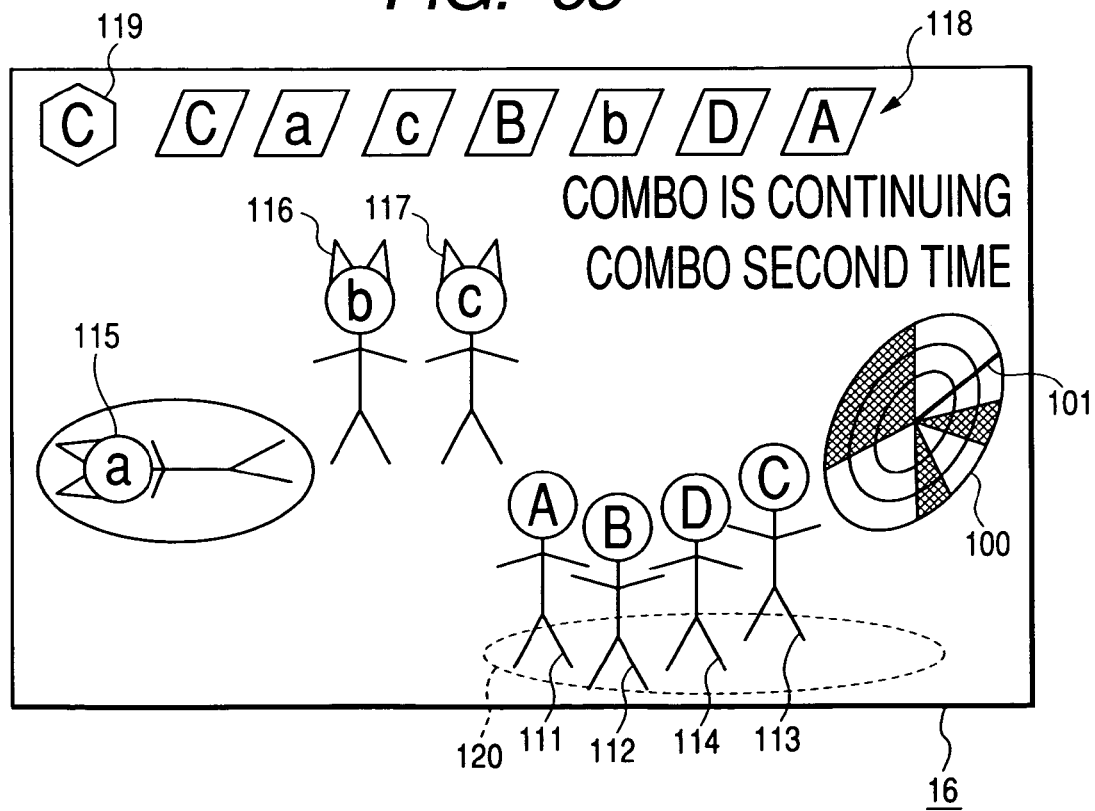
FIG. 65 is a drawing to show the display mode of the judgment ring after command determination.
Figure 66:
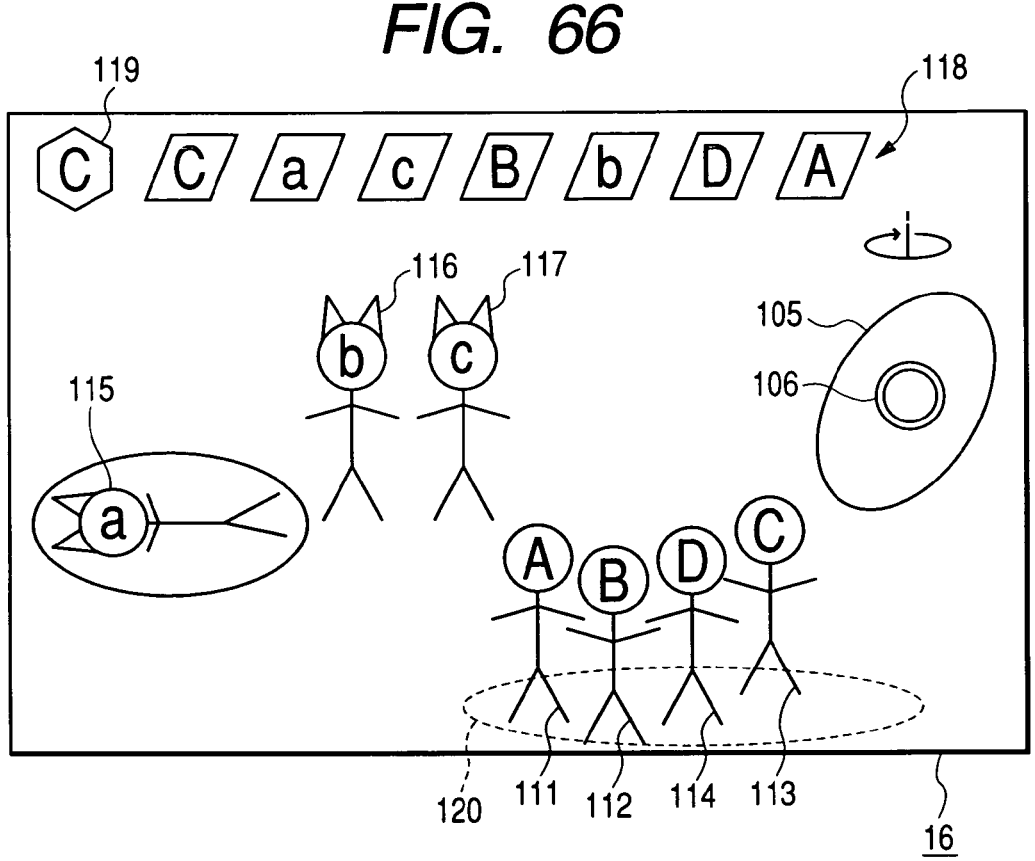
FIG. 66 is a drawing to show the display mode of the combo ring.
Figure 67:
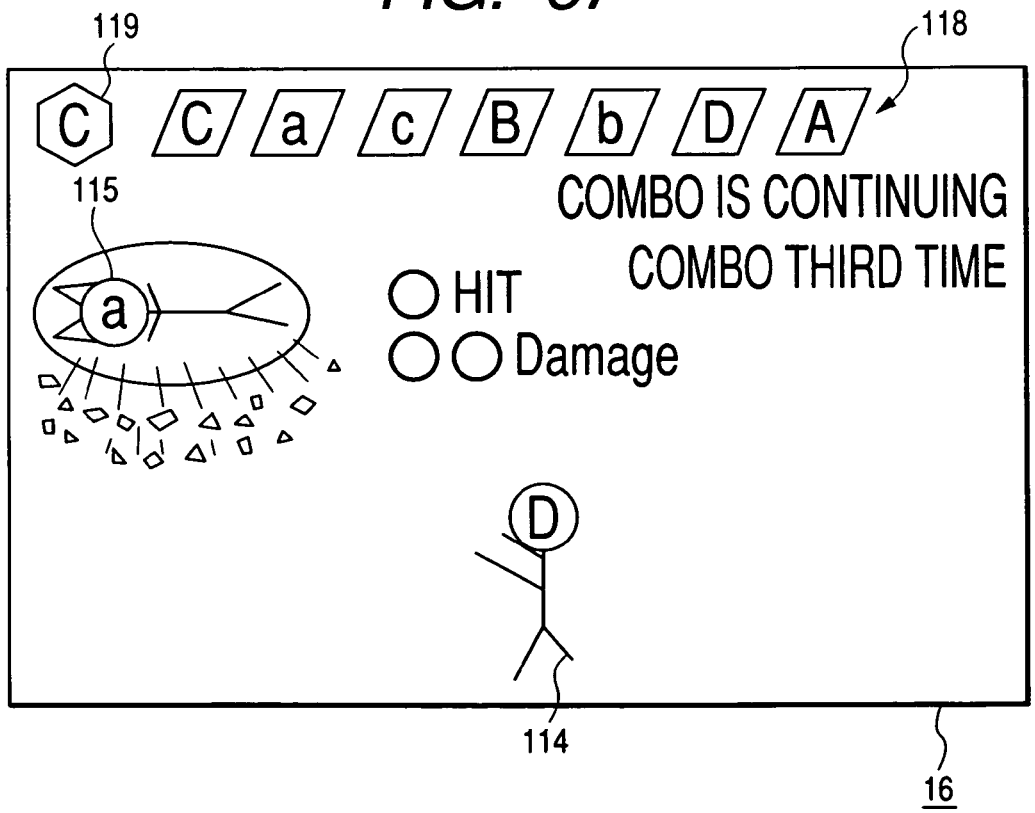
FIG. 67 is a drawing to show the display mode of combo attack.
Figure 68:
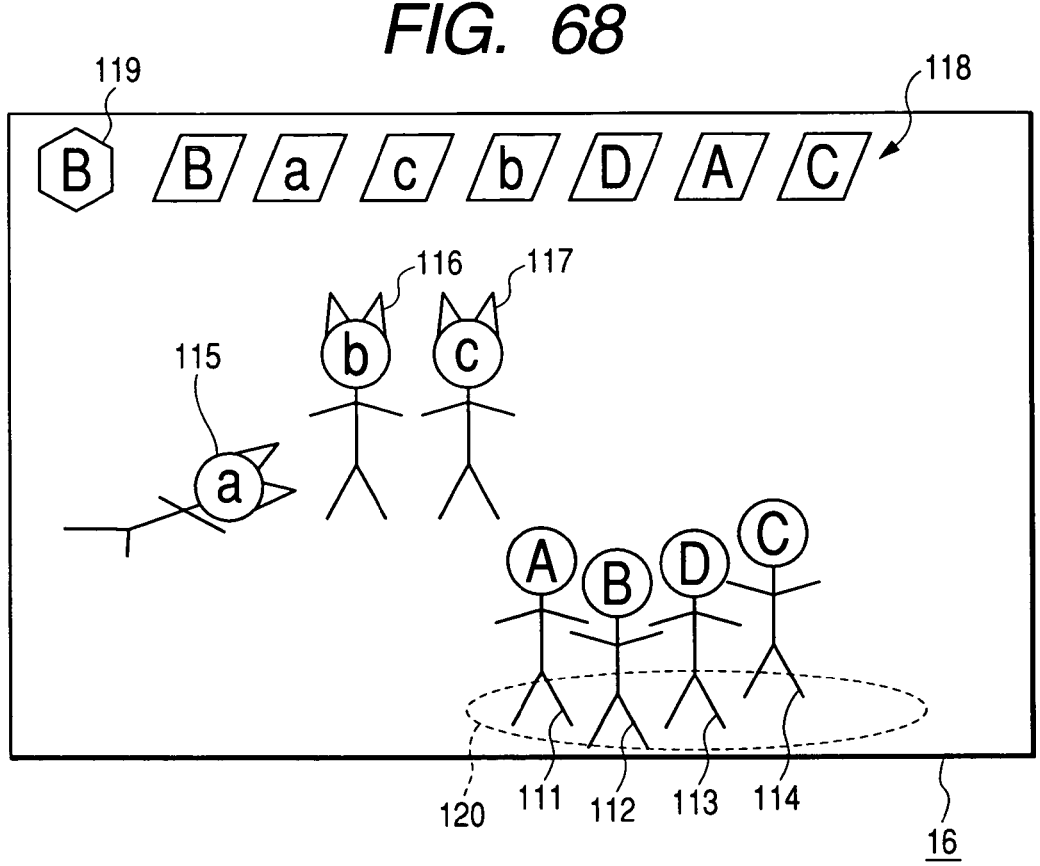
FIG. 68 is a drawing to show the display mode of combo attack.

An action command selection screen for the ally character C 113 is displayed as shown in FIG. 63. Action command selection is executed as the player operates the controller 4 (for example, a SPELL command is selected and then SPELL C is selected). Since the damage display mode of the enemy character A 115 is "down," the action corresponding to "ground mode" becomes effective action. An action target selection screen is displayed as shown in FIG. 64 and the target character as the action target is selected as the player operates the controller 4 (for example, ENEMY CHARACTER A is selected). During combo attack, it is made possible to execute combo attack provided that action is applied to the enemy character A 115 previously attacked by the ally character A 111. Subsequently, as shown in FIG. 65, the judgment ring 100 and the rotation bar 101 are displayed in the variable display area of the screen 16, varying display of the rotation bar 101 is started, and action details (action success or failure, the number of action times, etc.,) are determined as the player operates the controller 4, as described above. The combo ring 105 for determining whether or not the combo is satisfied (is formed) is displayed so as to rotate in the variable display area of the screen 16, as shown in FIG. 66. When the player operates the button indicating the combo mark 106 within the time limit, the combo condition is satisfied and combo attack is executed as shown in FIG. 67. Next, only the ally character B 112 exists in the proximity of the ally character C 113 executing the action, and is forcibly selected as the character to execute the next action. As the attack is made, the damage display mode of the enemy character A 115 ("beaten posture") is "down," as shown in FIG. 68.

Figure 69:
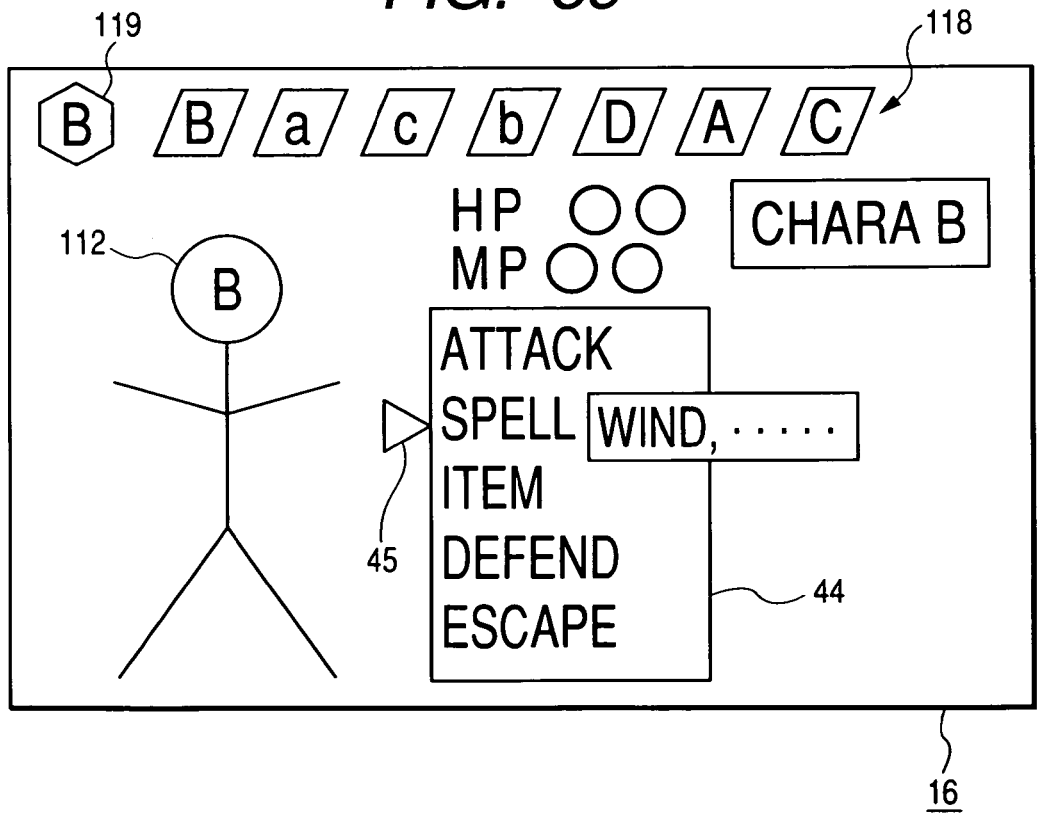
FIG. 69 is a drawing to show an action selection screen.
Figure 70:
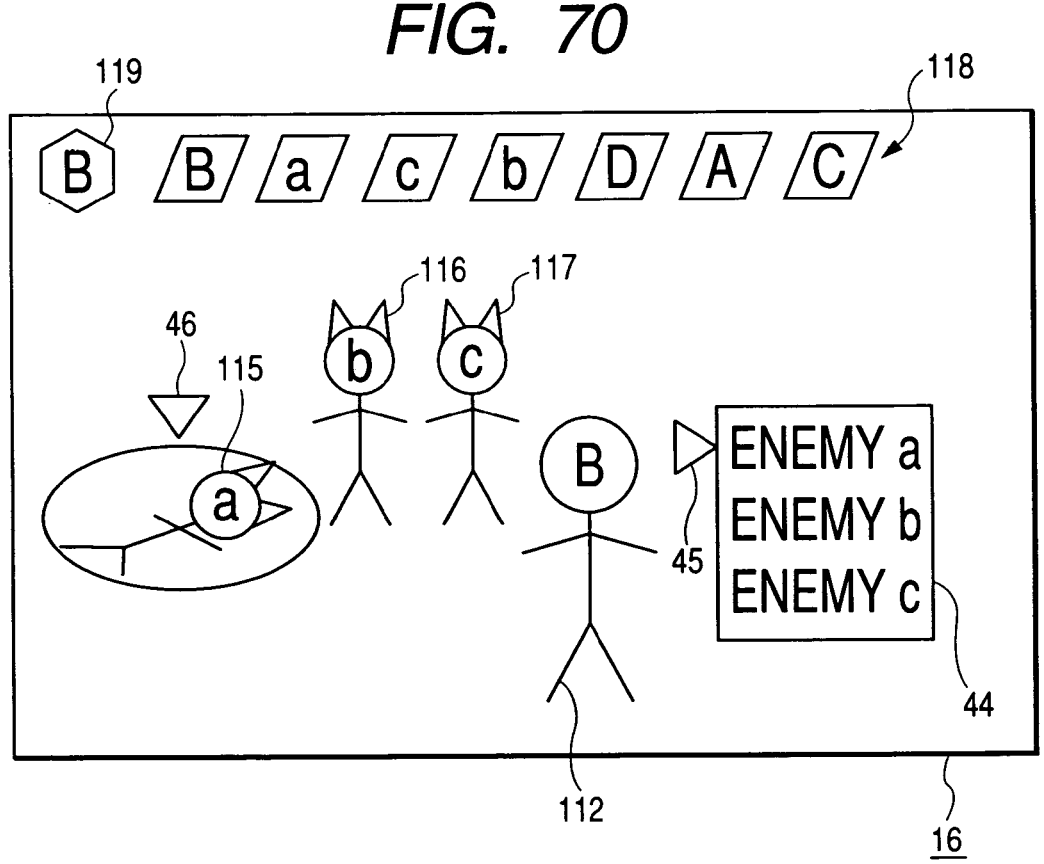
FIG. 70 is a drawing to show a move target selection screen.
Figure 71:
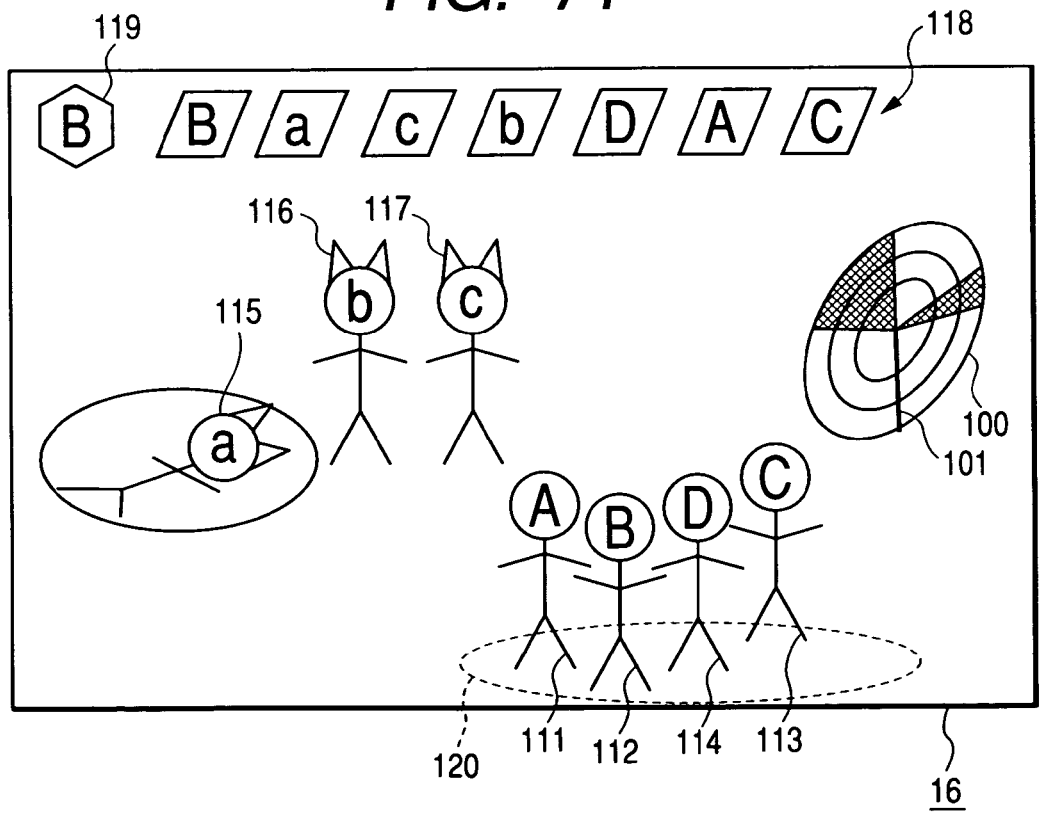
FIG. 71 is a drawing to show the display mode of the judgment ring after command determination.
Figure 72:
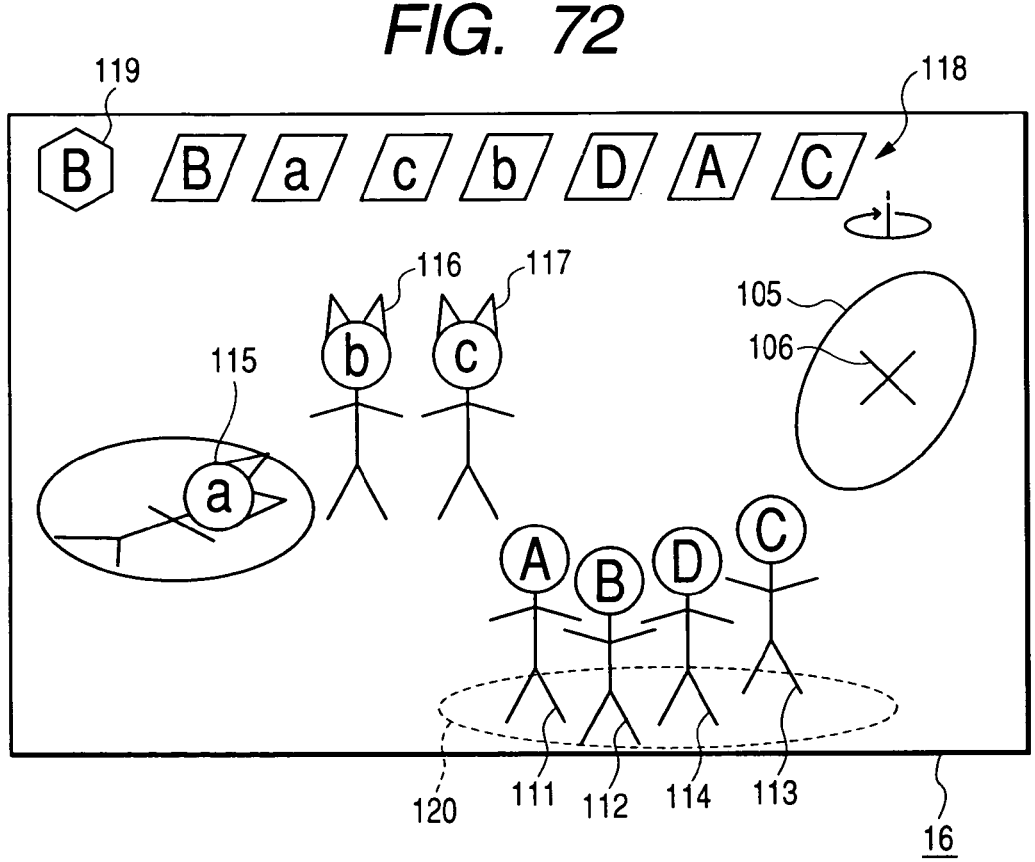
FIG. 72 is a drawing to show the display mode of the combo ring.
Figure 73:
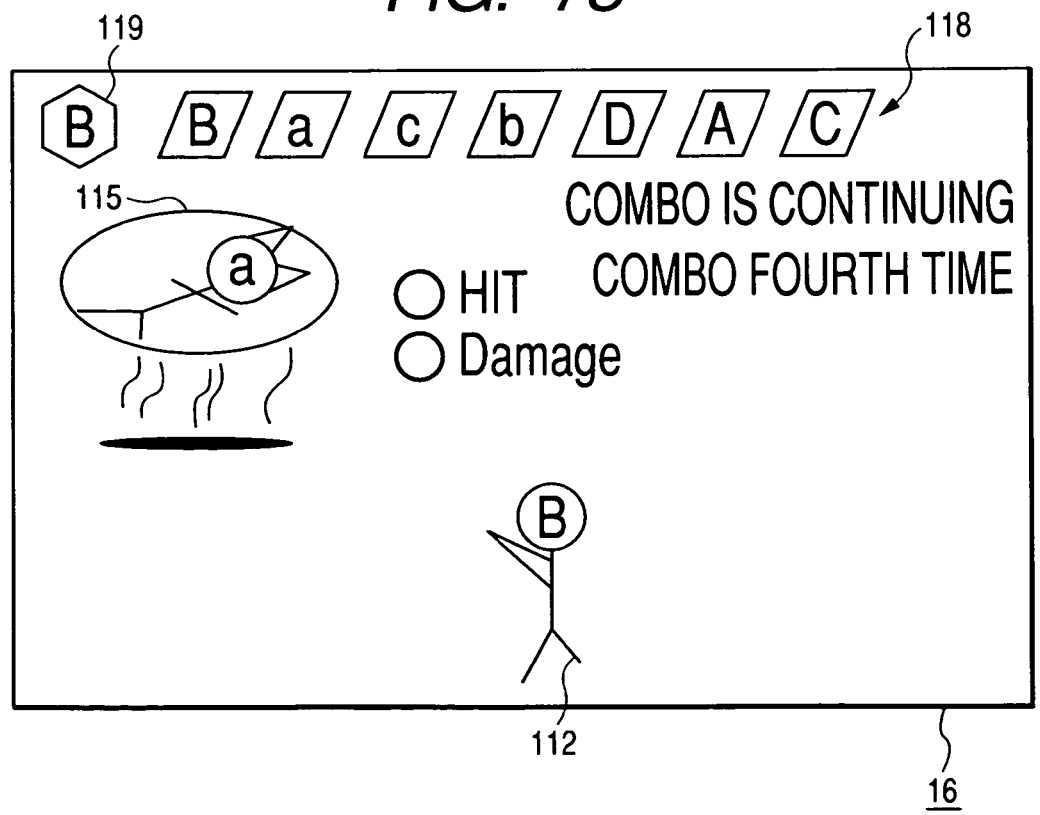
FIG. 73 is a drawing to show the display mode of combo attack.
Figure 74:
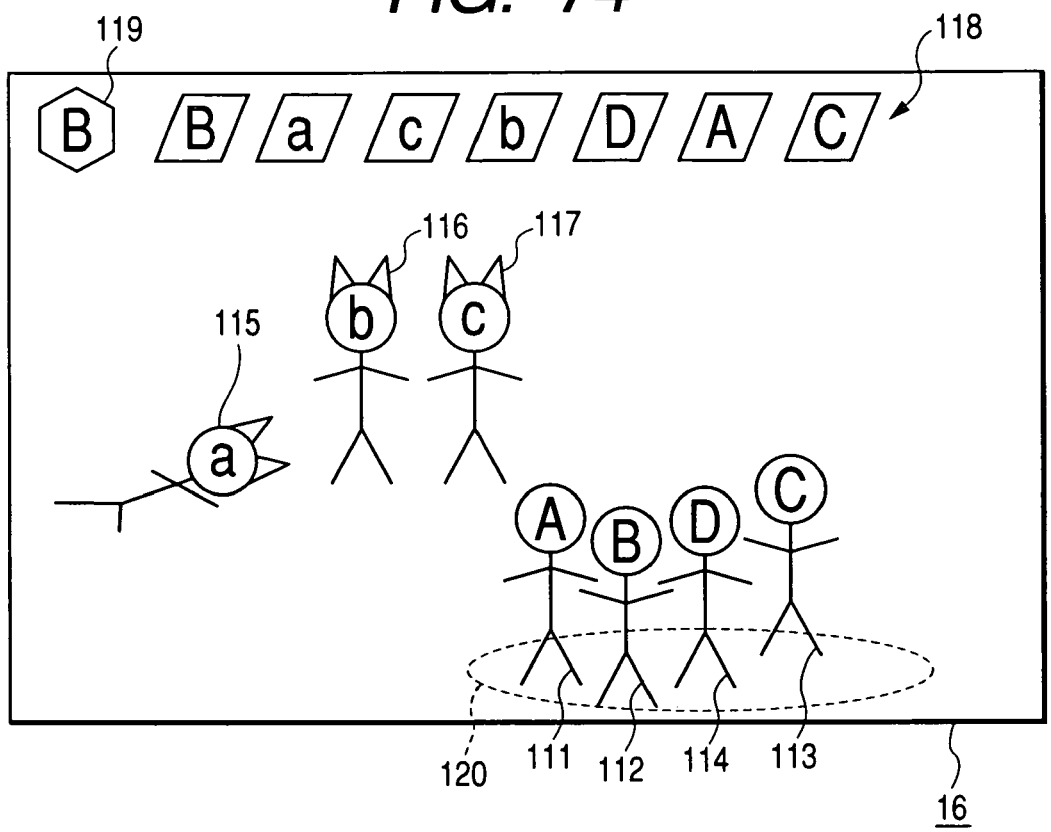
FIG. 74 is a drawing to show the display mode of combo attack.
Figure 75:
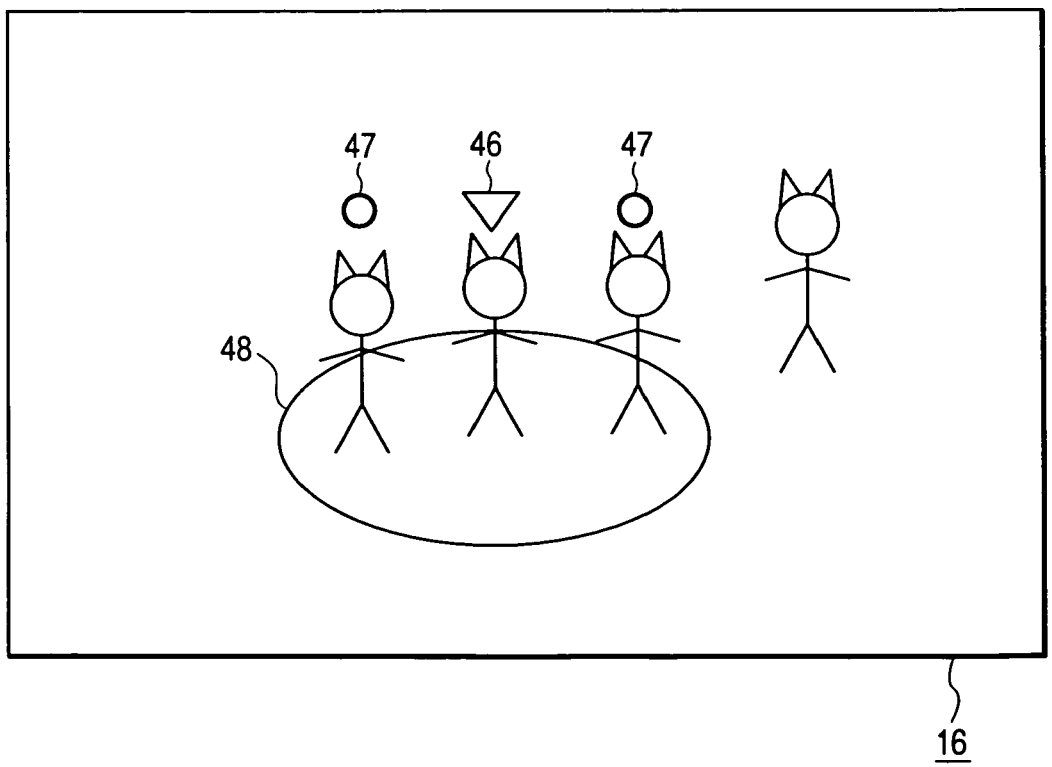
FIG. 75 is a drawing to show display mode of attack.
Figure 76:
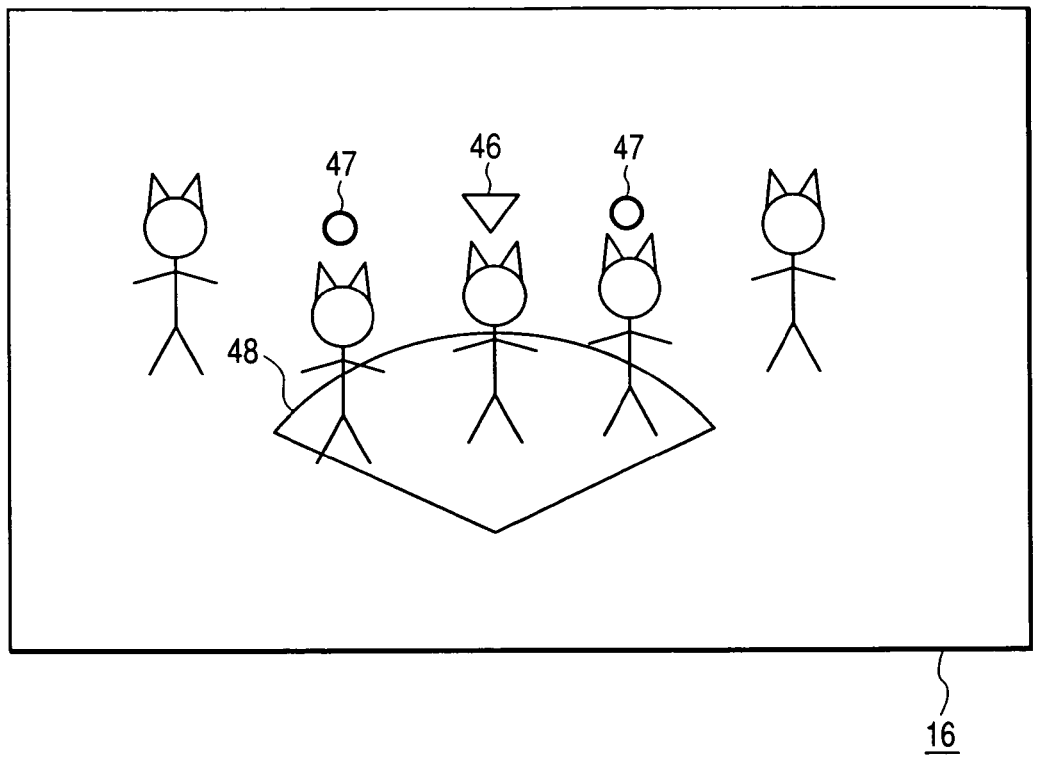
FIG. 76 is a drawing to show display mode of attack.

An action command selection screen for the ally character B 112 is displayed as shown in FIG. 69. Action command selection is executed as the player operates the controller 4 (for example, a SPELL command is selected and then SPELL D is selected). Since the damage display mode of the enemy character A 115 is "down," the action corresponding to "ground mode" becomes effective action. An action target selection screen is displayed as shown in FIG. 70 and the target character as the action target is selected as the player operates the controller 4 (for example, ENEMY CHARACTER A is selected). During combo attack, it is made possible to execute combo attack provided that action is applied to the enemy character A 115 previously attacked by the ally character B 112. Subsequently, as shown in FIG. 71, the judgment ring 100 and the rotation bar 101 are displayed in the variable display area of the screen 16, varying display of the rotation bar 101 is started, and action details (action success or failure, the number of action times, etc.,) are determined as the player operates the controller 4, as described above. The combo ring 105 for determining whether or not the combo is satisfied (is formed) is displayed so as to rotate in the variable display area of the screen 16, as shown in FIG. 72. When the player operates the button indicating the combo mark 106 within the time limit, the combo condition is satisfied and combo attack is executed as shown in FIG. 73. As the attack is made, the damage display mode of the enemy character A 115 ("beaten posture") is "down," as shown in FIG. 72. Thus, the combo attack is executed and is displayed.

Program

The gaming program described above will be discussed in detail. The gaming program specifically causes at least a computer to execute the following steps. In other words, the gaming program causes a computer to function as various means for the following steps. The gaming program causes a computer to implement functions for the following steps.

(A) Step of determining the action for any of the ally characters in response to player's entry operation through the operation unit.

(B) Step of assigning the attack order to the characters on the screen and displaying a battle image among the characters.

(C) Step of advancing a game on the screen based on the determined action.

(D) Variable display control step of displaying the variable display area with the display mode changing with the passage of the time on the screen.

(E) Matching determination step of determining the matching between the timing of player's entry operation through the operation unit performed when the display mode of the variable display area changes and the display mode.

(F) Consecutive attack hit determination step of determining whether or not attack hits the enemy character at consecutive times based on the determination result in the matching determination step.

(G) Attack effect calculation step, when it is determined in the consecutive attack hit determination step that attack hits the enemy character at consecutive times, of calculating the effect of damage from each of the attacks hitting the enemy character at consecutive times.

(H) Consecutive hit effect increase step of increasing the effect of damage from the attack calculated in the attack effect calculation step when it is determined in the consecutive attack hit determination step that attack hits the enemy character at consecutive times.

(I) Step of determining whether or not attack executed by a plurality of characters hits the enemy character at consecutive times based on the determination result in the matching determination step.

(J) Attack range storage step of storing any of the different types of attack ranges for each of the different types of attacks.

(K) Attack range extraction step of extracting the attack range corresponding to the attack selected in response to player's entry operation through the operation unit from different types of attack ranges stored in the attack range storage step.

(L) Reference character determination step of determining the reference character used as the attack range reference to the attack selected in response to player's entry operation through the operation step.

(M) Attack range display control step of displaying the attack range corresponding to the attack extracted in the attack range extraction step on the screen based on the reference character determined in the reference character determination step.

(N) Target character display control step of displaying an image for enabling the player to distinguish between the reference character determined in the reference character determination step and the target character as the attack target contained in the attack range.

(O) Execution order calculation step of calculating the execution order of actions of all characters.

(P) Order display control step of displaying the execution order calculated in the execution order calculation step on the screen.

(Q) Character parameter storage step of storing the skill parameters and the possessed item parameters for each character.

(R) The above-mentioned execution order calculation step of calculating the execution order of actions of all characters based on the skill parameters and the possessed item parameters stored in the character parameter storage step.

(S) Action execution step, when the action of an ally character is executed in response to player's entry operation through the operation unit, when a predetermined combination condition for a different ally character from the ally character whose action is executed is satisfied, the action execution step of executing the action of the ally character and executing the action of the different ally character without following the action execution order.

(T) Variable display control step of displaying a variable display area for consecutive attack with the display mode changing with the passage of the time on the screen when another ally character attacks the same enemy character following one ally character attacking the enemy character.

(U) Consecutive attack execution step in which another ally character attacks the enemy character when the timing of player's entry operation through the operation unit performed while the display mode of the variable display area for consecutive attack changes is a predetermined timing.

Storage Medium

A computer-readable record medium recording the gaming program may store the skill parameters and the possessed item parameters for each of the characters in addition to the gaming program described above.

In the embodiment, after all characters appearing in a "battle scene" execute action, the turn order for executing actions of all characters is again determined, but the invention is not limited to the mode and another mode may be adopted. For example, the character completing execution of action may execute the next action in response to the turn interval values before all characters execute action.

Another Embodiment

The turn interval values to adopt the mode will be discussed with FIG. 79.

The turn interval value is calculated as turn interval value= [{108.9−AGL+(LUC/10)}×28/108.9+4]×[execution command correction value], as described above.

When the turn interval values set for the characters have the relation that AA1<AB1<BC1<BA1=AD1<BB1<AC1, action is executed in the following order: The ally character A 111 with the turn interval value AA1, the ally character B 112 with the turn interval value AB1, the enemy character C 117 with the turn interval value BC1, the ally character D 114 with the turn interval value AD1, the enemy character A 115 with the turn interval value BA1, the enemy character B 116 with the turn interval value BB1, and the ally character C 113 with the turn interval value AC1. An order image to execute action in this order is displayed on the screen 16.

When the action of the ally character A 111 is executed according to the order, the turn interval value corresponding to the ally character A 111 is calculated as AA2 based on the action type and AA2 is stored as shown in FIG. 79B.

The turn interval value corresponding to each of the characters except the ally character A 111 is decremented by the turn interval value AA1 corresponding to the ally character A 111. For example, the turn interval value corresponding to the ally character B 112 results from subtracting the turn interval value AA1 corresponding to the ally character A 111 from the turn interval value AB1 (AB2).

Subsequently, to determine the second character for executing action, the turn interval values of the ally character B 112, the ally character C 113, the ally character D 114, the enemy character A 115, the enemy character B 116, and the enemy character C 117 containing the turn interval value AA2 corresponding to the ally character A 111 are all compared. Accordingly, the turn order is determined based on the turn interval values independently of the number of times each character has executed action.

When AB2 becomes the minimum, the ally character B 112 is selected. When the action of the ally character B 112 is executed, the turn interval value corresponding to the ally character B 112 is calculated as AA3 based on the action type and AA3 is stored as shown in FIG. 79c.

The turn interval value corresponding to each of the characters except the ally character B 112 is decremented by the turn interval value AB2 corresponding to the ally character B 112. For example, the turn interval value corresponding to the ally character C 113 results from subtracting the turn interval value AB2 corresponding to the ally character B 112 from the turn interval value AC2 (AC3).

As such processing is repeated, it is made possible to allow the character completing execution of action to execute the next action in response to the turn interval values before all characters execute action.

The above-described steps ST36, ST37, and ST71 are modified as described below for making it possible to allow the character completing execution of action to execute the next action in response to the turn interval values before all characters execute action: (It is made possible to skip ST57.)

At ST36, the turn order is updated each time action is taken. In the processing, the CPU 21 updates the turn interval value corresponding to the character taking action and also updates the turn order. The CPU 21 subtracts the turn interval value corresponding to the character before taking action from each of the turn interval values not taking action, and stores the result in the predetermined area of the RAM 23. Accordingly, the "turn order processing" is again performed, the turn orders are compared and the characters for which command selection is made effective to cause the characters to take action are determined. The CPU 21 updates the turn interval values for all characters, so that it is made possible to allow the character completing execution of action to execute the next action in response to the turn interval values before all characters execute action. For example, when the ally character C 113 executes action three times and the ally character B 112 executes action twice, the ally character C 113 may execute the fourth action. Upon completion of ST36, the process proceeds to ST37.

At ST37, turn order update display processing is executed. In the processing, the CPU 21 updates and displays the turn order for executing action in the next turn based on the turn order updated at ST37. Upon completion of ST37, the process proceeds to ST38.

At ST71, turn interval value comparison processing is executed. In the processing, the CPU 21 reads the turn interval values corresponding to all characters from the predetermined area of the RAM 23. Then, the CPU 21 compares the read turn interval values. The characters for which action command selection is made effective are set in the ascending order of the turn interval values. Upon completion of the processing, the process proceeds to ST72.

The embodiment of the invention has been described, but the invention is not limited to the specific embodiment. For example, the controller 4 operated by the player may be made integral with the machine main unit 1.

Further, the invention can also be applied to a portable gaming machine or a desk-top gaming machine including in one piece an operation unit that can be operated by a player, a display section for displaying an image and audio (sound), a storage section for storing a gaming program, and a control section for executing control processing following the gaming program.

Further, the invention can also be applied to a network game of the type wherein the above-mentioned gaming program is stored in a server connected to a network such as Internet 56 and a player can play a game by connecting to the server from a personal computer, a mobile telephone, a portable information terminal (PDA), etc.

Figure 83:
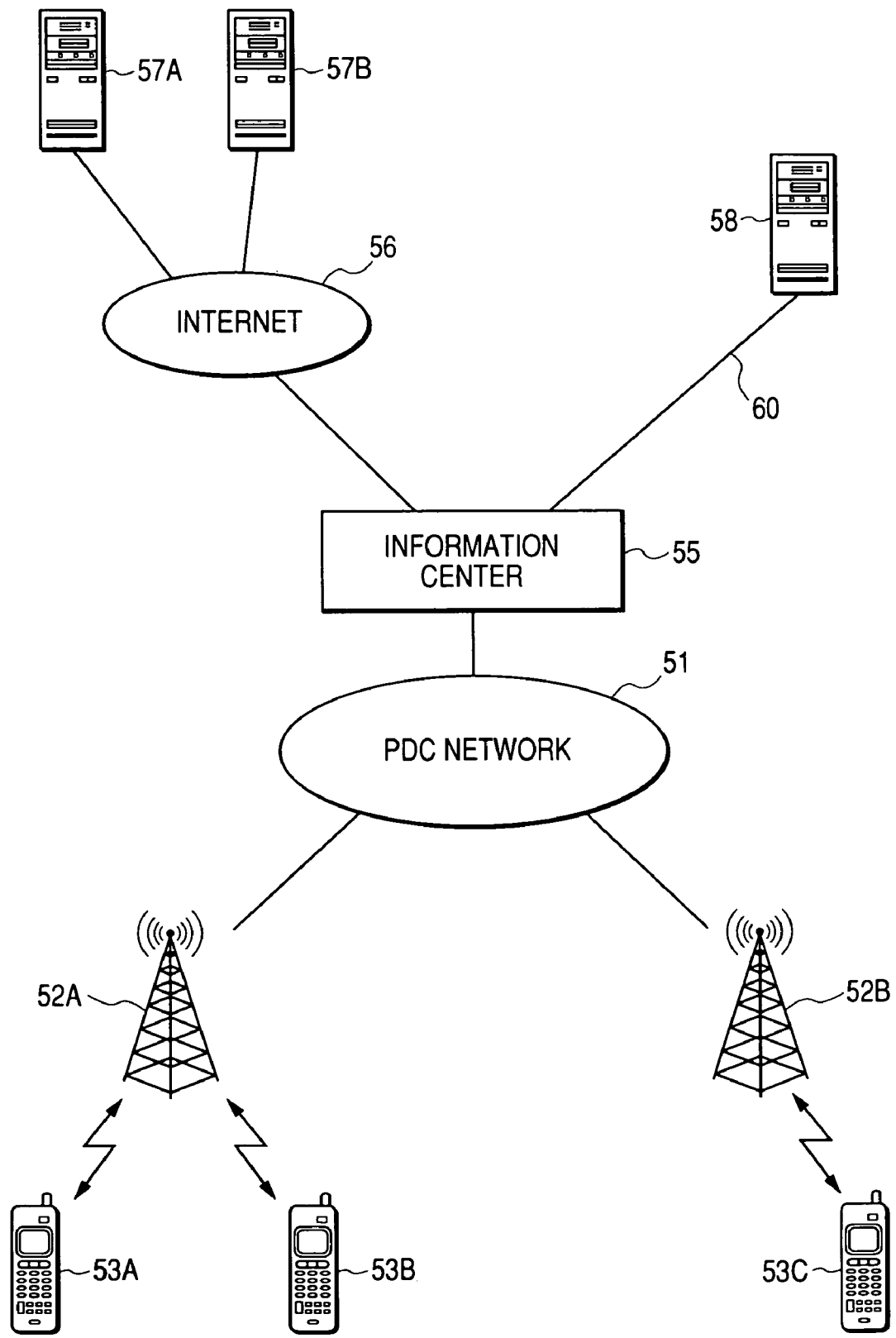
FIG. 83 is a drawing to show the configuration of a network game system.

A network game system will be discussed with FIG. 83 by way of example. In the network game system, mobile telephones 53A, 53B, and 53C as terminals for playing a game are connected to a PDC network 51 capable of conducting packet communications, for example, through base stations 52A and 52B, and an information center 55 is accessed through the PDC network 51 in response to player's operation and the game state. The information center 55 acquires various pieces of information through a network such as Internet 56 from servers 57A and 57B storing data required for games and the like as well as game programs in response to requests from the mobile telephones 53A, 53B, and 53C, and transmits information required for games to the mobile telephones 53A, 53B, and 53C. Like a server 58 in FIG. 83, the server storing the game data, etc., may be connected to the information center 55 by a private or leased communication line 60 not via the network such the Internet 56.

To play a game, the player previously downloads a game program from the server 57A, 57B into the mobile telephone 53A, 53B, 53C and executes the game program on the mobile telephone 53A, 53B, 53C. In addition, various systems are possible, such as a system wherein the mobile telephone 53A, 53B, 53C is assigned a role like a browser in such a manner that the game program is executed on the server 57A, 57B in accordance with an instruction from the mobile telephone 53A, 53B, 53C and the player views the game on the mobile telephone 53A, 53B, 53C. The players may share the network game system or may be able to fight a battle with each other by connecting the mobile telephones using the PDC network 51.

In the embodiment, the judgment ring 100 containing the reference areas and the rotation bar 101 as the varying area are provided, but the invention is not limited to the mode and another mode may be adopted. For example, the judgment ring may be made a varying area and the rotation bar may be made a reference area. That is, the reference area or the varying area is formed containing a plurality of effective areas relatively advantageous to the player and a non-effective area relatively disadvantageous to the player.

Further, the advantages described in the specification are only enumeration of the most favorable advantages produced from the invention, and the advantages of the invention are not limited to those described in the specification.

According to the invention, the execution order of actions of all characters is calculated and is displayed on the screen, so that it is made possible to visually recognize the action execution order, it is easy to devise a stratagem of action of attack, etc., and the interest in the game can be augmented.

As described above, according to one aspect of the invention, there are provided a gaming program, a computer-readable record medium recording the gaming program, and a gaming machine, characterized in that the execution order of actions of all characters is calculated and the calculated execution order is displayed on the screen.

More particularly, according to a number of aspects of the invention, the following are provided:

(1) A gaming program executed by operation unit that can be operated by a player and a computer for displaying a plurality of characters including an ally character and an enemy character on a screen of an existing display or a separate display, determining an action for any of the plurality of characters in response to entry operation through the operation unit, and advancing a game on the screen, the gaming program for causing the computer to function as execution order calculation section for calculating the execution order of actions of all the characters and order display control section for displaying the execution order calculated by the execution order calculation section on the screen.

(2) The gaming program as described in (1) for causing the computer to function as character parameter storage section for storing skill parameters and possessed item parameters for each of the plurality of characters and the execution order calculation section for calculating the execution order of actions of all the characters based on the skill parameters and the possessed item parameters stored by the character parameter storage section.

(3) The gaming program as described in (1) or (2) for causing the computer to function as action execution section, when the action of an ally character is executed in response to entry operation through the operation unit, when a predetermined combination condition for a different ally character from the ally character whose action is executed is satisfied, the action execution section for executing the action of the ally character and executing the action of the different ally character without following the action execution order.

(4) A computer-readable record medium recording a gaming program executed by operation unit that can be operated by a player and a computer for displaying a plurality of characters including an ally character and an enemy character on a screen of an existing display or a separate display, determining an action for any of the plurality of characters in response to entry operation through the operation unit, and advancing a game on the screen, the gaming program for causing the computer to function as execution order calculation section for calculating the execution order of actions of all the characters and order display control section for displaying the execution order calculated by the execution order calculation section on the screen.

(5) A gaming machine including operation unit that can be operated by a player and a machine main unit for displaying a plurality of characters including an ally character and an enemy character on a screen of an existing display or a separate display, determining an action for any of the plurality of characters in response to entry operation through the operation unit, and advancing a game on the screen, characterized in that the machine main unit has execution order calculation section for calculating the execution order of actions of all the characters and order display control section for displaying the execution order calculated by the execution order calculation section on the screen.

According to the aspects in (1), (4), or (5), the execution order of actions of all characters is calculated and is displayed on the screen, so that it is made possible to visually recognize the action execution order, it becomes easy to devise a stratagem of action of attack, etc., the interest in a battle scene can be increased, and the interest in the game can be augmented.

According to the aspect in (2), the action execution order of the characters is calculated based on the skill parameters and the possessed item parameters stored corresponding to the characters, so that it is made possible to devise a stratagem of action of attack, etc., varying from one character to another and the interest in a battle scene can be increased.

According to the aspect in (3), when a predetermined combination condition is satisfied, the action of the ally character is executed and the action of the different ally character is executed without following the calculated action execution order, so that it is made possible to devise a stratagem of action so that the predetermined combination condition is satisfied, and the interest in a battle scene can be still more increased.

The foregoing description of the preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable those skilled in the art to utilize the invention in various embodiments and with various modifications as are suited to the particular use contemplated. It is intended that the scope of the invention be defined by the claims appended hereto, and their equivalents.

What is claimed is:

1. A gaming machine for allowing a player to enter an action command of an ally character to proceed in a game, the gaming machine comprising:
    an operation unit that allows the player to enter the action command;
    a display control section that displays a plurality of characters including at least the one ally character and at least one enemy character on a display for displaying a progress of the game and displaying a battle between the ally character and the enemy character;
    an execution order calculation section that calculates an execution order of actions of a plurality of characters in the battle; and
    an action execution section that executes the actions of the plurality of characters based on the execution order calculated by the execution order calculation section,
    wherein the display control section displays the execution order calculated by the execution order calculation section on the display, and
    wherein, when a predetermined combination condition for a predetermined ally character and a different ally character from the predetermined ally character to take combination action is satisfied, when executing an action of the predetermined ally character, the action execution section also executes an action of the different ally character without following the execution order calculated by the execution order calculation section.

2. The gaming machine as claimed in claim 1, further comprising:
    an action determination section that determines an action of the ally character based on the action command entered by the player to the operation unit.

3. The gaming machine as claimed in claim 2, wherein the action determination section determines an action of the enemy character based on a predetermined algorithm.

4. The gaming machine as claimed in claim 1, further comprising:
    a character parameter storage section that stores character parameters including skill parameters indicating skills of the plurality of characters and possessed item parameters indicating items possessed by the plurality of characters,
    wherein the execution order calculation section calculates the execution order of actions of the plurality of characters based on the character parameters stored in the character parameter storage section.

5. The gaming machine as claimed in claim 1, wherein the execution order calculation section calculates the execution order of actions of the plurality of characters based on turn interval values set for the plurality of characters.

6. The gaming machine as claimed in claim 5, further comprising;
    a character parameter storage section that stores character parameters including skill parameters indicating skills of the plurality of characters and possessed item parameters indicating items possessed by the plurality of characters,
    wherein the execution order calculation section calculates the execution order of actions of the plurality of characters by correcting the turn interval values based on the character parameters stored in the character parameter storage section.

7. The gaming machine as claimed in claim 5, wherein, when a plurality of the plurality of characters have a same turn interval value, the execution order calculation section calculates the execution order of actions of the plurality of characters such that the ally character takes precedence over any other character.

8. The gaming machine as claimed in claim 5, wherein, when a plurality of the ally characters have a same turn interval value, the execution order calculation section calculates the execution order of actions of the plurality of characters according to a list order of the ally characters.

9. The gaming machine as claimed in claim 5, wherein, when one of the plurality of characters completes execution of action, the execution order calculation section updates a turn interval value set for the one of the plurality of characters completing execution of action.

10. The gaming machine as claimed in claim 9, wherein, when the one of the plurality of characters completes execution of action, the execution order calculation section updates the turn interval value set for the one of the plurality of characters completing execution of action based on an execution command correction value provided in response to an action type.

11. The gaming machine as claimed in claim 5, wherein the execution order calculation section excludes a character completing execution of action in each turn in the battle to calculate the execution order of actions of the plurality of characters.

12. A computer-readable program product for storing a gaming program for causing a computer to execute the steps of:
    allowing a player to enter an action command of an ally character to proceed in a game;
    displaying a plurality of characters including at least one ally character and at least one enemy character on a display for displaying the progress of the game and displaying a battle between the ally character and the enemy character;
    calculating an execution order of actions of the plurality of characters at a time of the battle; and
    displaying the execution order on the display;
    executing the actions of the plurality of characters based on the execution order; and
    wherein, when a predetermined combination condition for a predetermined ally character and a different ally character from the predetermined ally character to take combination action is satisfied, in executing an action of the predetermined ally character, an action of the different ally character is also executed without following the execution order.

13. The program product as claimed in claim 12, further causing the computer to execute a step of determining the an action of the ally character based on an operation command entered by the player.

14. The program product as claimed in claim 12, further causing the computer to execute a step of determining an action of the enemy character based on a predetermined algorithm.

15. The program product as claimed in claim 12, further causing the computer to execute a step of storing character parameters including skill parameters indicating skills of the plurality of characters and possessed item parameters indicating items possessed by the plurality of characters, wherein, in calculating the execution order, the execution order of actions of the plurality of characters is calculated based on the character parameters.

16. The program product as claimed in claim 12, wherein, in calculating the execution order, the execution order of actions of the plurality of characters is calculated based on turn interval values set for the plurality of characters.

17. The program product as claimed in claim 16, further causing the computer to execute a step of storing character parameters including skill parameters indicating skills of the plurality of characters and possessed item parameters indicating items possessed by the plurality of characters, wherein, in calculating the execution order, the turn interval values are corrected based on the character parameters.

18. The program product as claimed in claim 16, wherein, in calculating the execution order, when more than one of the plurality of characters possesses a specific turn interval value, the execution order of actions of the plurality of characters is calculated so that the ally character takes precedence over any other character.

19. The program product as claimed in claim 16, wherein, in calculating the execution order, when more than one of the ally characters possesses a specific turn interval value, the execution order of actions of the plurality of characters is calculated according to a list order of the ally characters.

20. The program product as claimed in claim 16, wherein, in calculating the execution order, when one of the plurality of characters completes execution of action, a turn interval value set for the one of the plurality of characters completing execution of action is updated.

21. The program product as claimed in claim 20, wherein, in calculating the execution order, when the one of the plurality of characters completes execution of action, the turn interval value set for the one of the plurality of characters completing execution of action is updated based on an execution command correction value provided in response to an action type.

22. The program product as claimed in claim 16, wherein, in calculating the execution order, a character completing execution of action in each turn in the battle is excluded to calculate the execution order of actions of the plurality of characters.

* * * * *